March 6, 1962 J. A. THOMAS 3,023,952
ACCOUNTING MACHINE WITH CARD PUNCH ADJUNCT
Filed July 7, 1958 26 Sheets-Sheet 1

INVENTOR
JAMES A. THOMAS.
BY
JPSanto
ATTORNEY.

March 6, 1962  J. A. THOMAS  3,023,952
ACCOUNTING MACHINE WITH CARD PUNCH ADJUNCT
Filed July 7, 1958  26 Sheets-Sheet 2
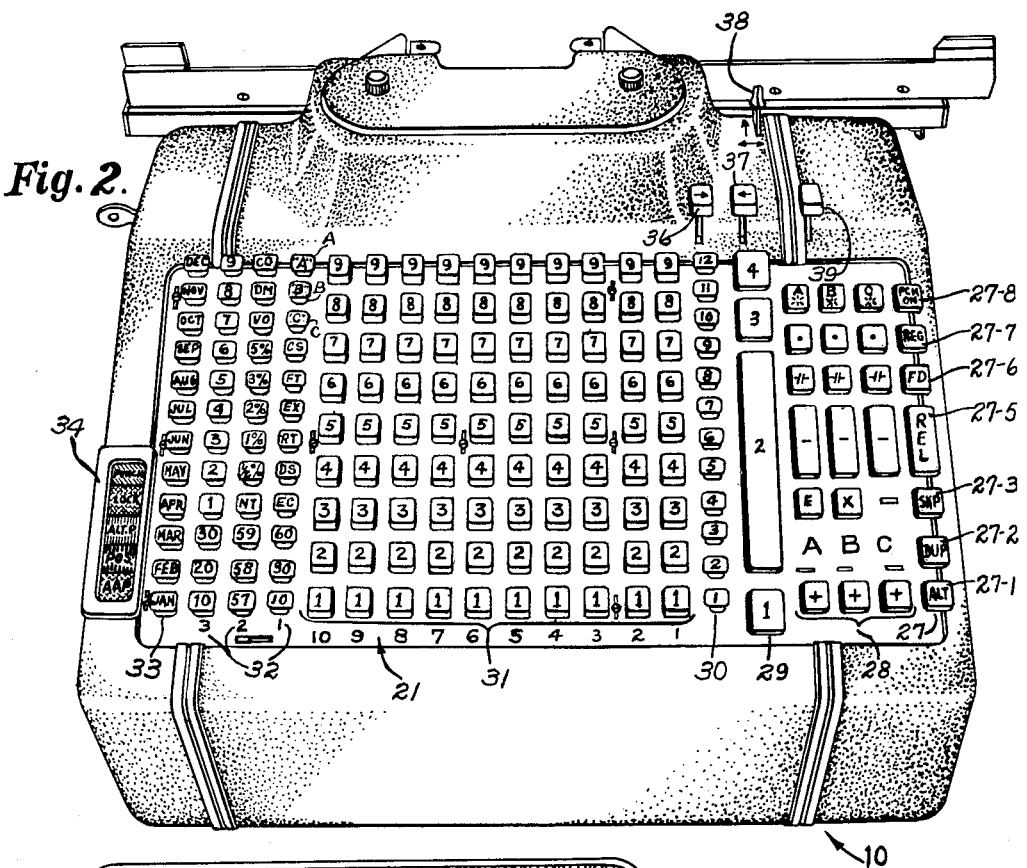
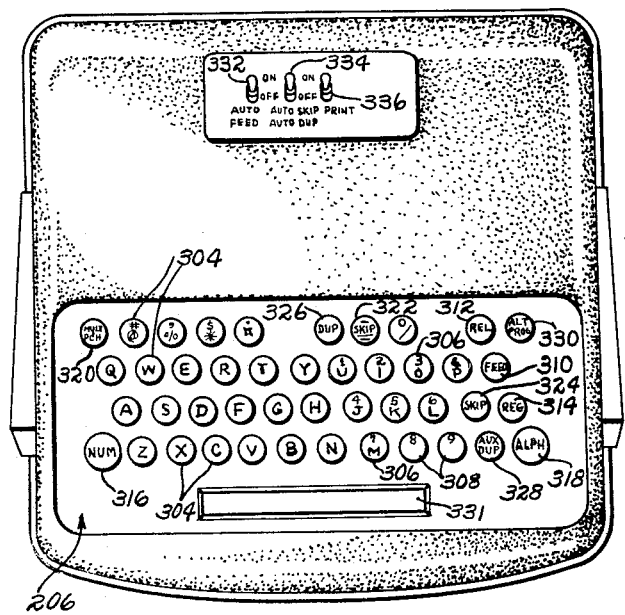
INVENTOR
JAMES A. THOMAS.
BY  JPSanto
ATTORNEY.

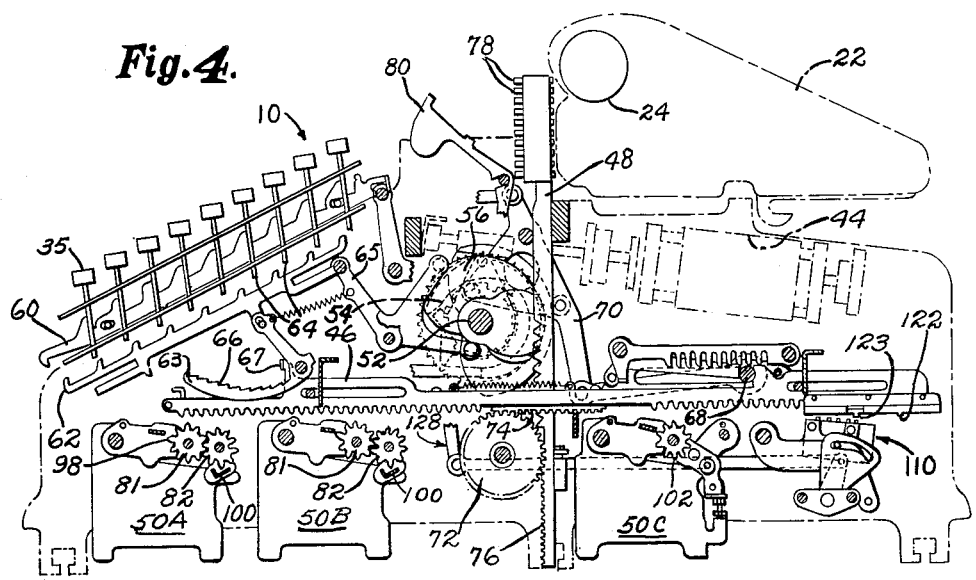
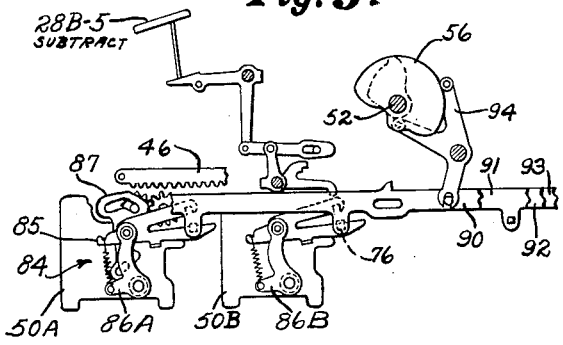
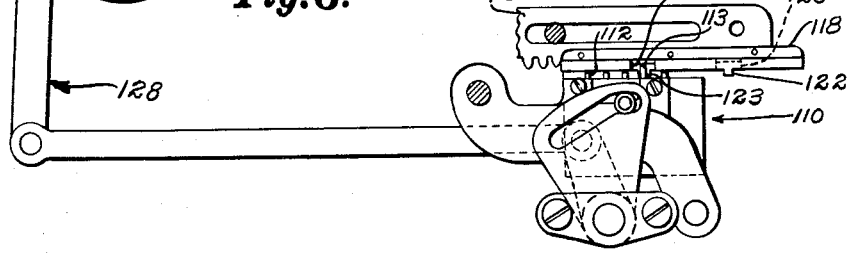

March 6, 1962 J. A. THOMAS 3,023,952
ACCOUNTING MACHINE WITH CARD PUNCH ADJUNCT
Filed July 7, 1958 26 Sheets-Sheet 4

INVENTOR.
JAMES A. THOMAS.
BY
ATTORNEY.

March 6, 1962 J. A. THOMAS 3,023,952
ACCOUNTING MACHINE WITH CARD PUNCH ADJUNCT
Filed July 7, 1958 26 Sheets-Sheet 5

INVENTOR
JAMES A. THOMAS.
BY
JP Santo
ATTORNEY.

March 6, 1962 — J. A. THOMAS — 3,023,952
ACCOUNTING MACHINE WITH CARD PUNCH ADJUNCT
Filed July 7, 1958 — 26 Sheets-Sheet 7

INVENTOR.
JAMES A. THOMAS
BY
JPSinto
ATTORNEY.

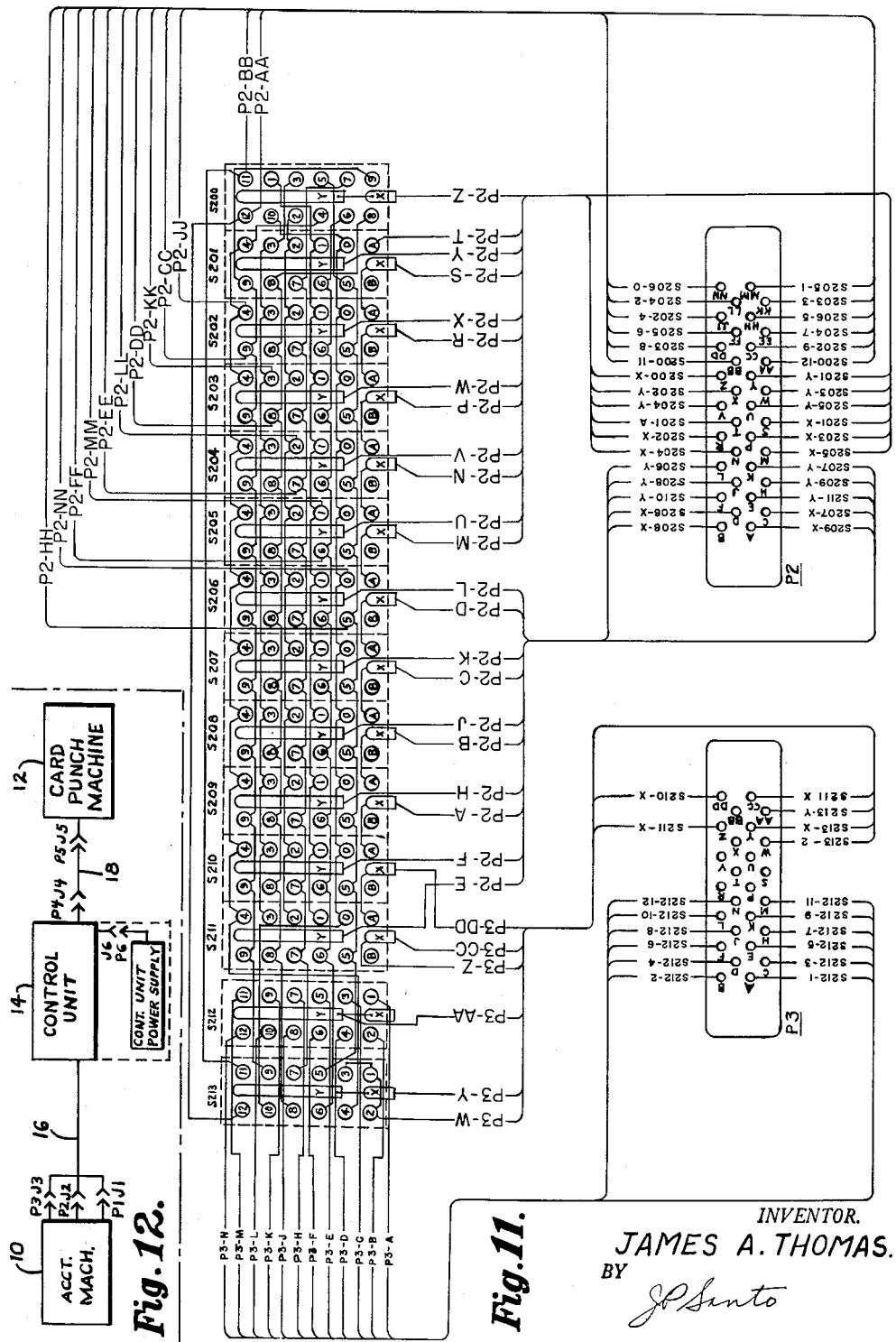

March 6, 1962     J. A. THOMAS     3,023,952
ACCOUNTING MACHINE WITH CARD PUNCH ADJUNCT
Filed July 7, 1958     26 Sheets-Sheet 10

INVENTOR.
JAMES A. THOMAS.
BY
ATTORNEY.

March 6, 1962 J. A. THOMAS 3,023,952
ACCOUNTING MACHINE WITH CARD PUNCH ADJUNCT
Filed July 7, 1958 26 Sheets-Sheet 11

INVENTOR.
JAMES A. THOMAS.
BY JPSanto
ATTORNEY.

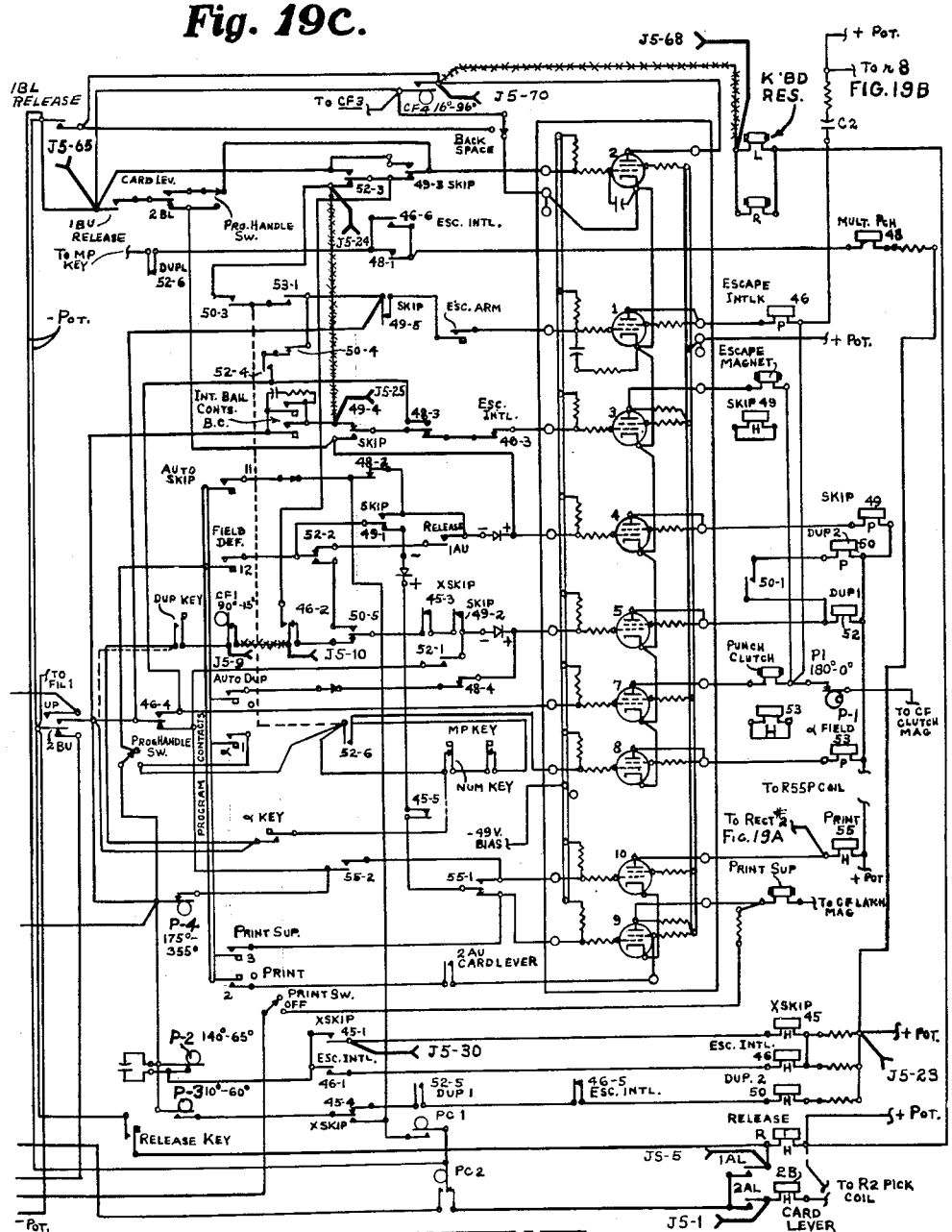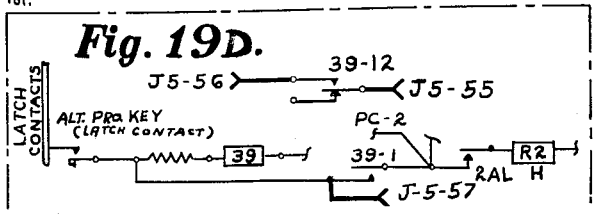

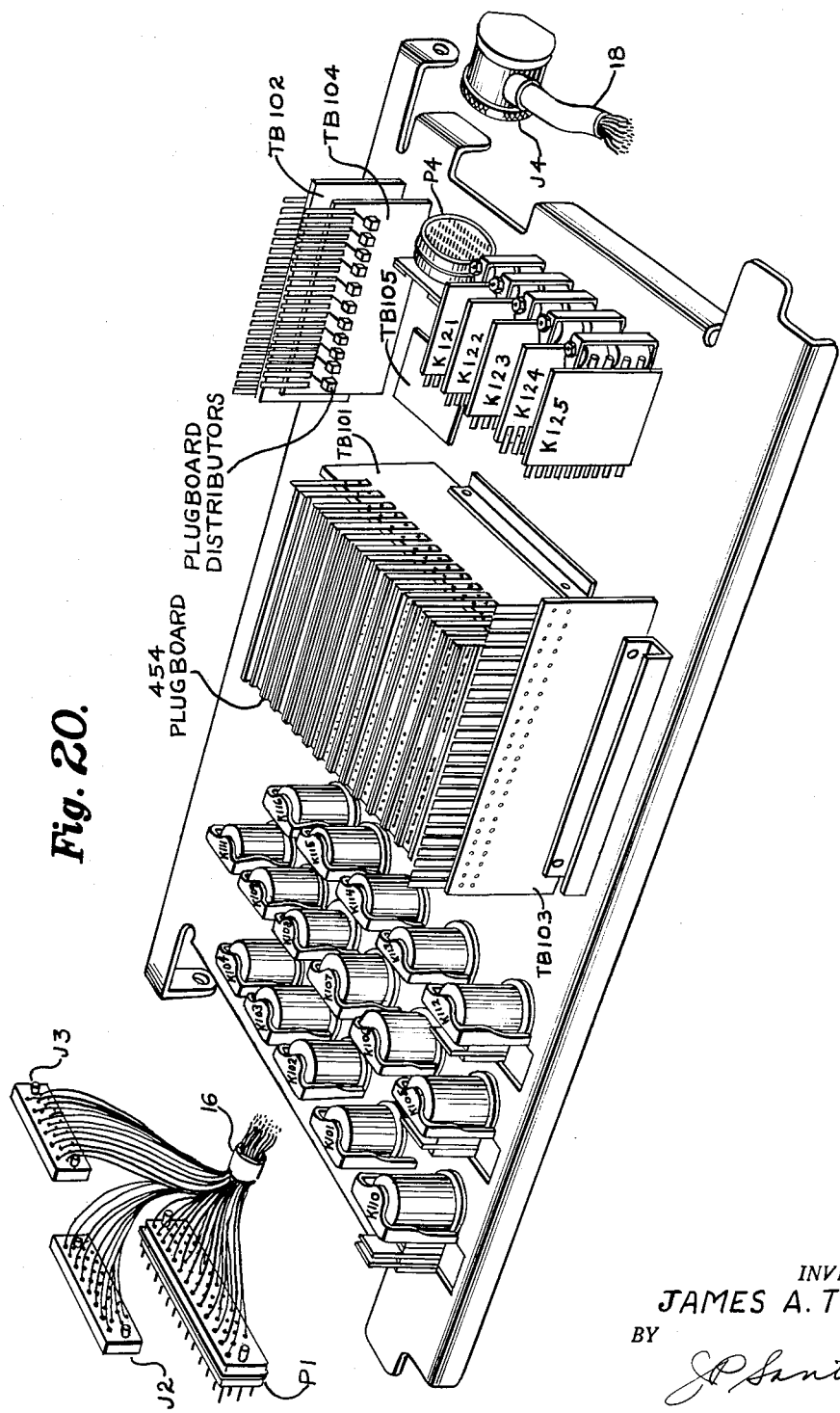

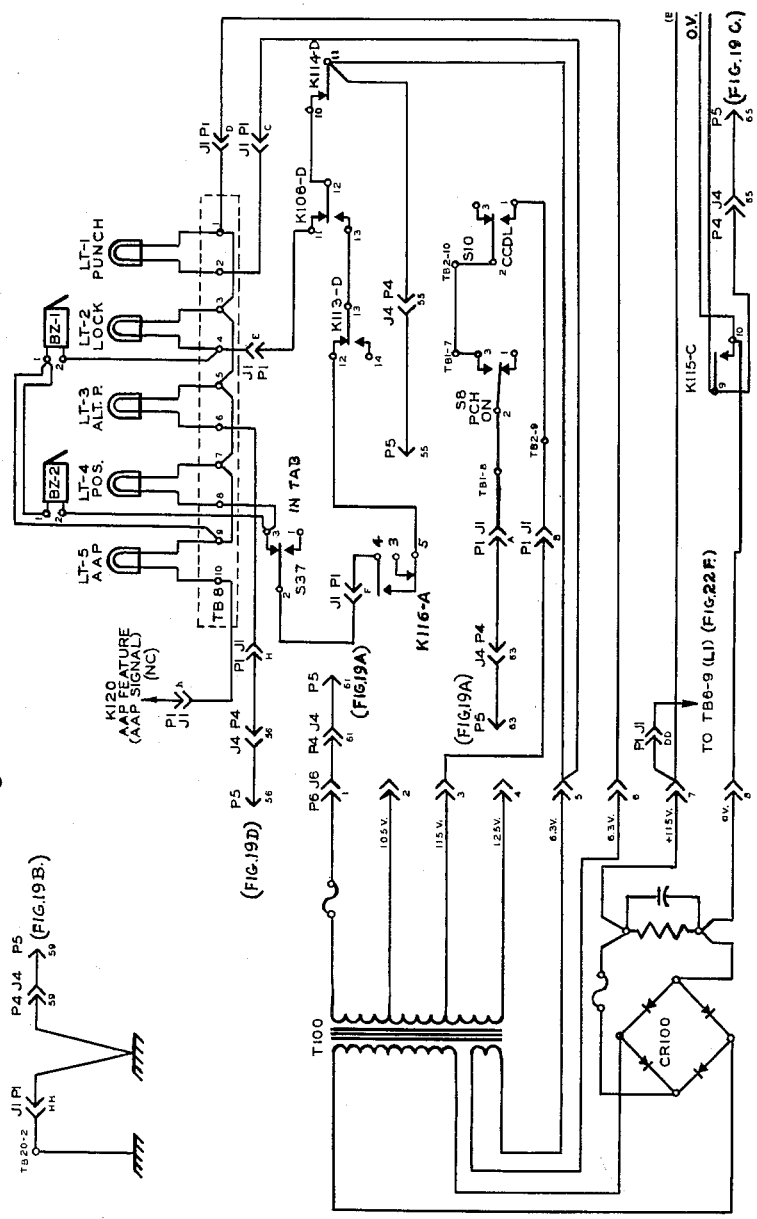

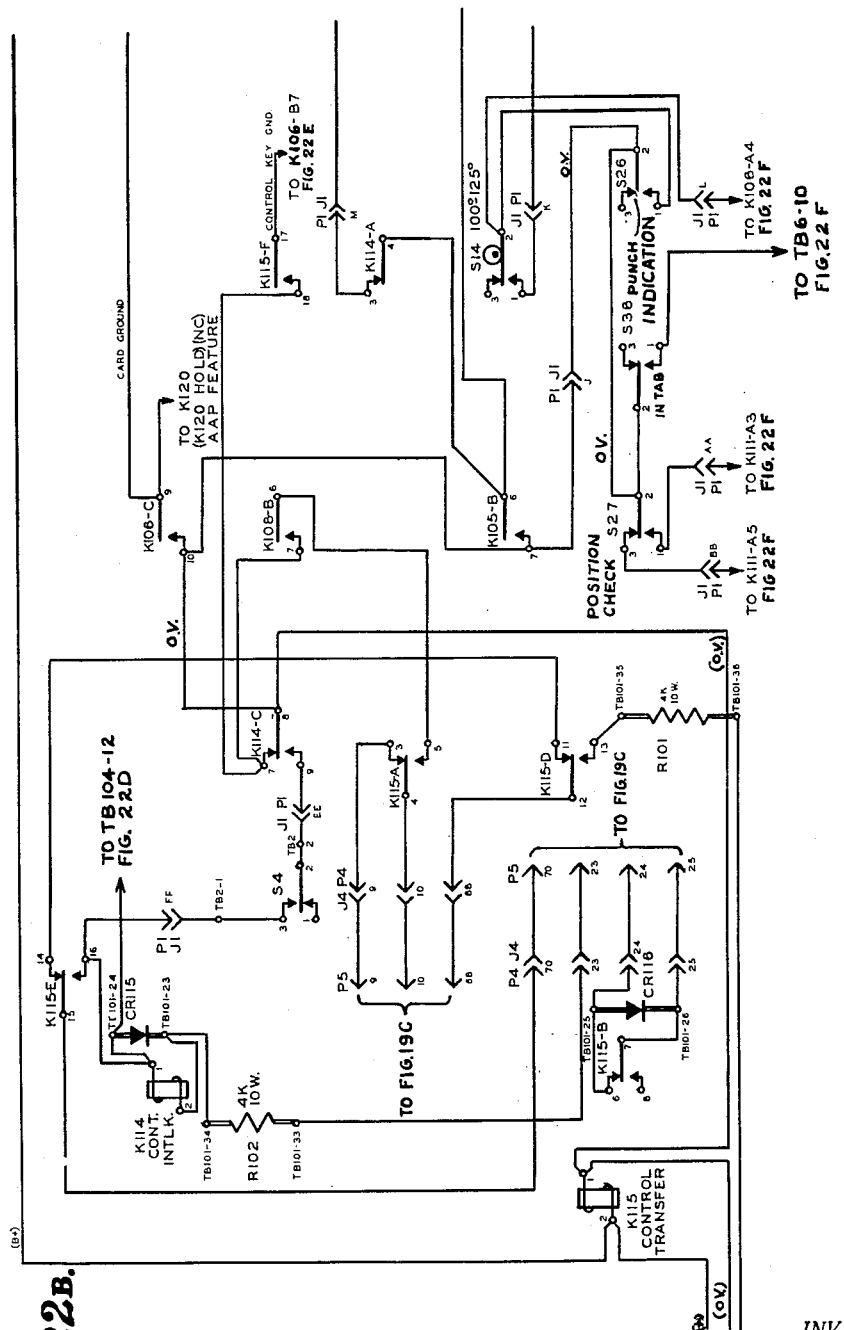

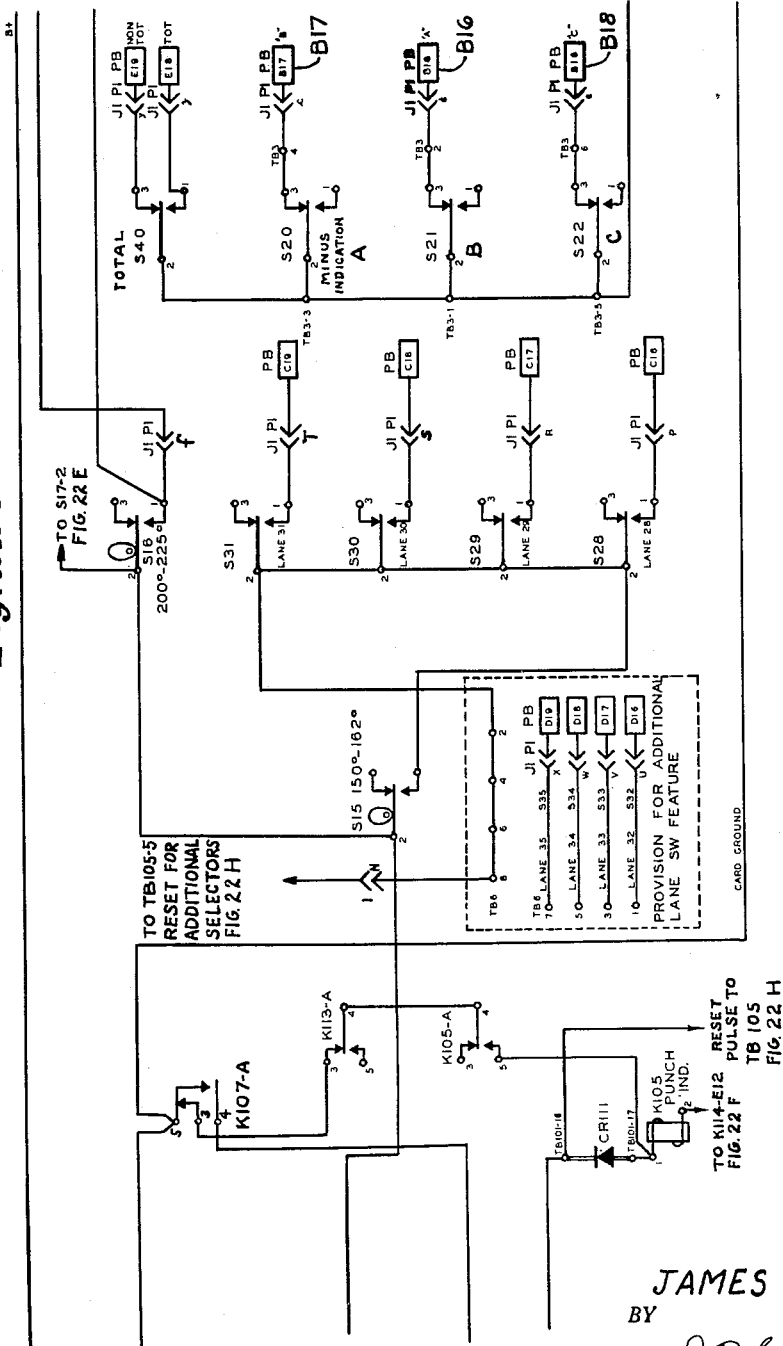

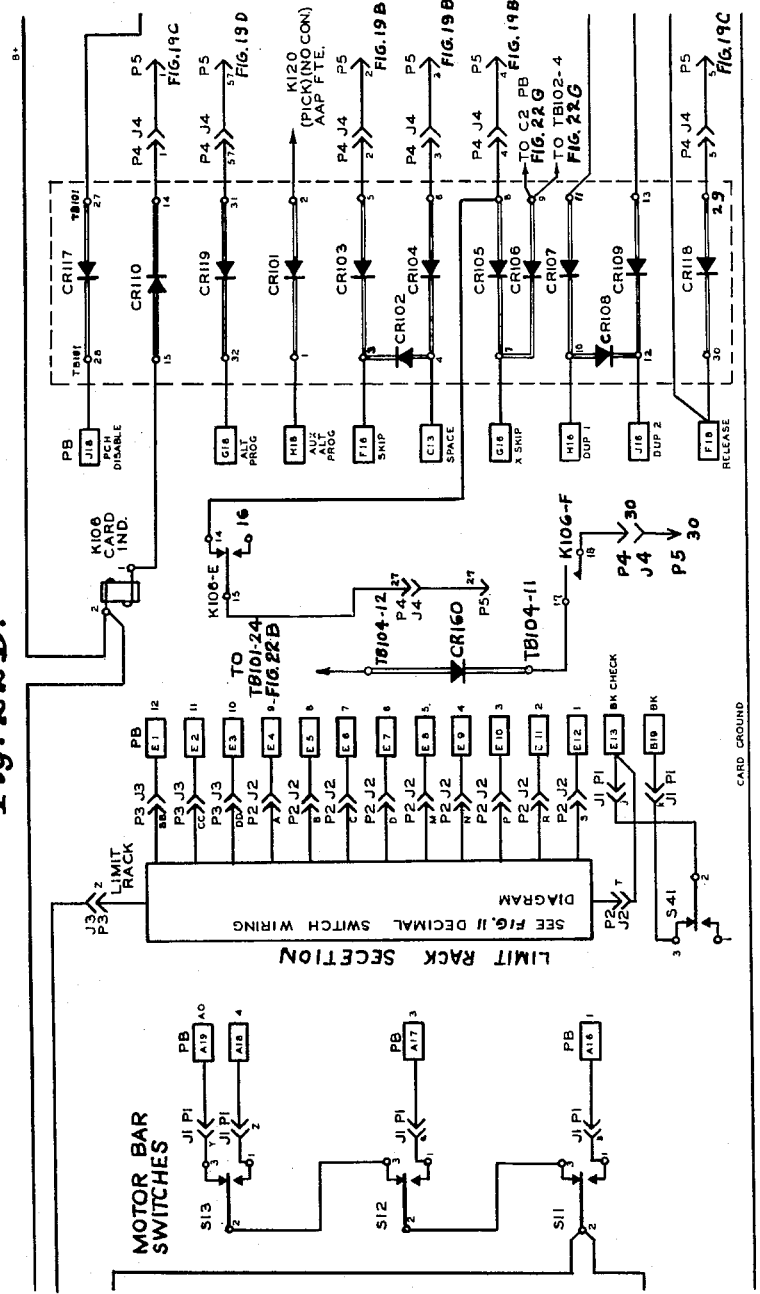

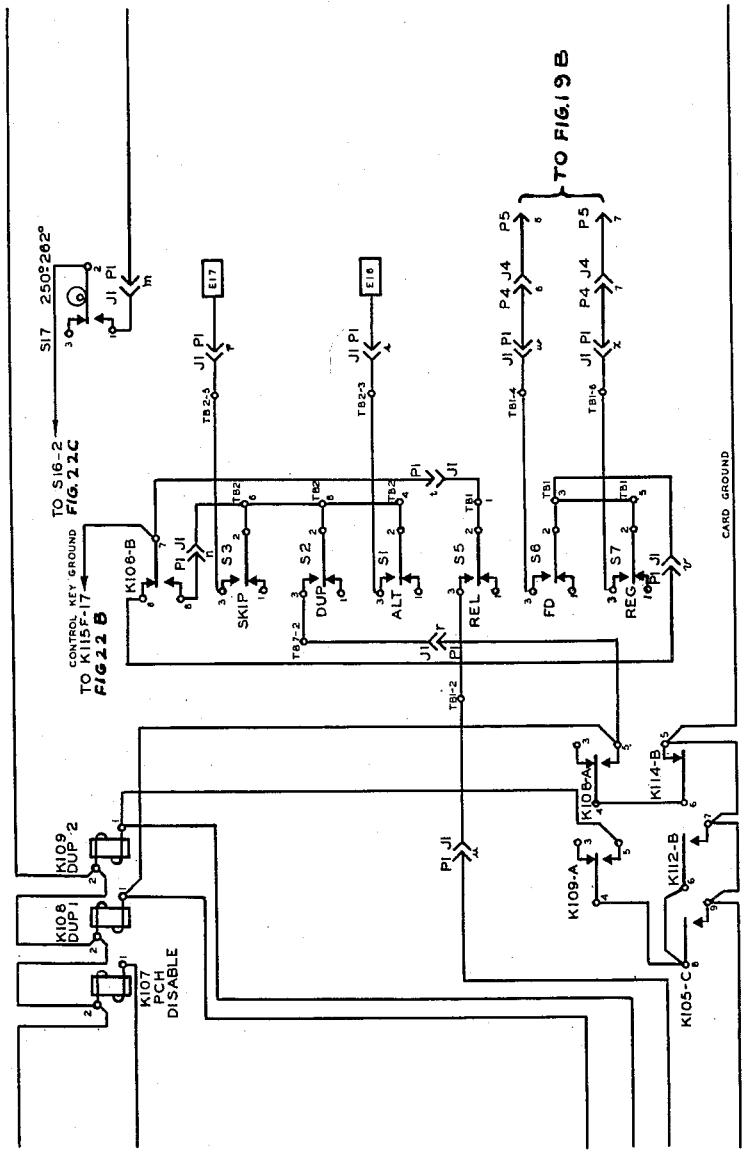

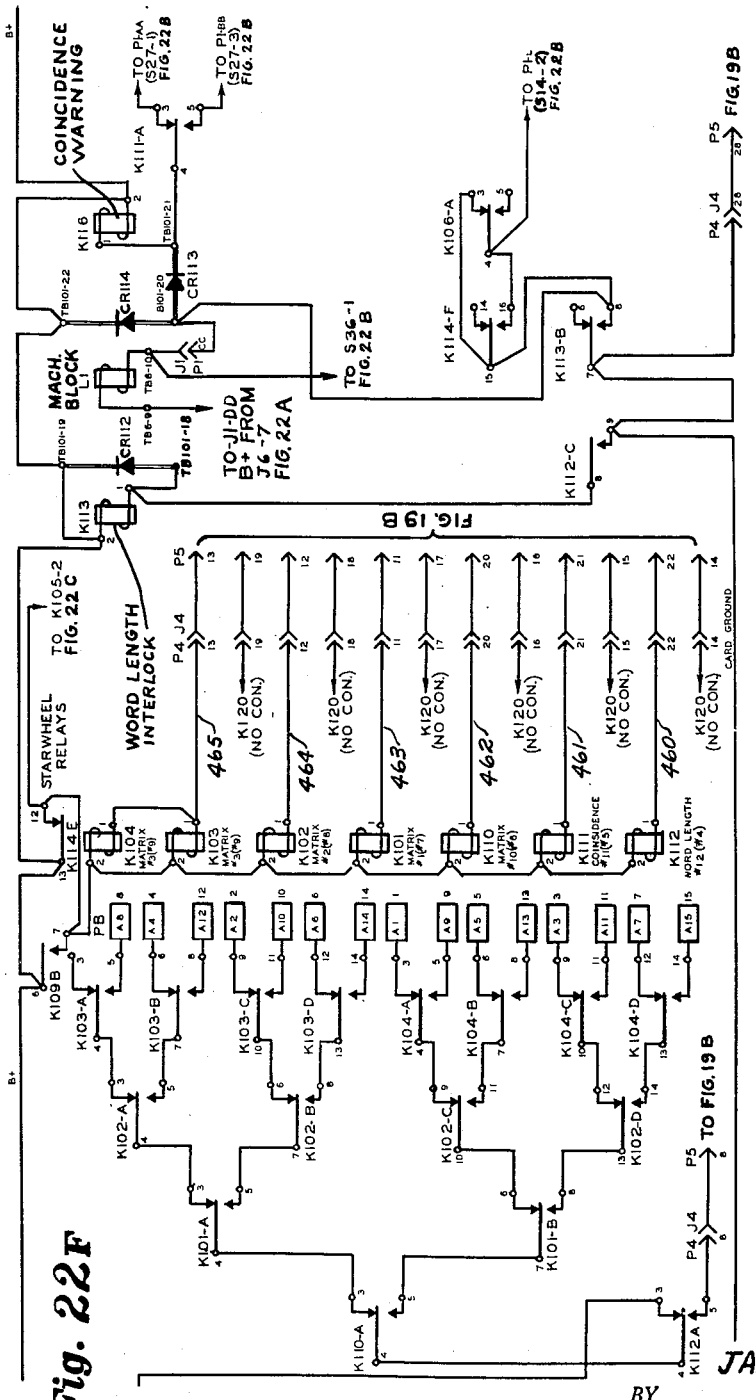

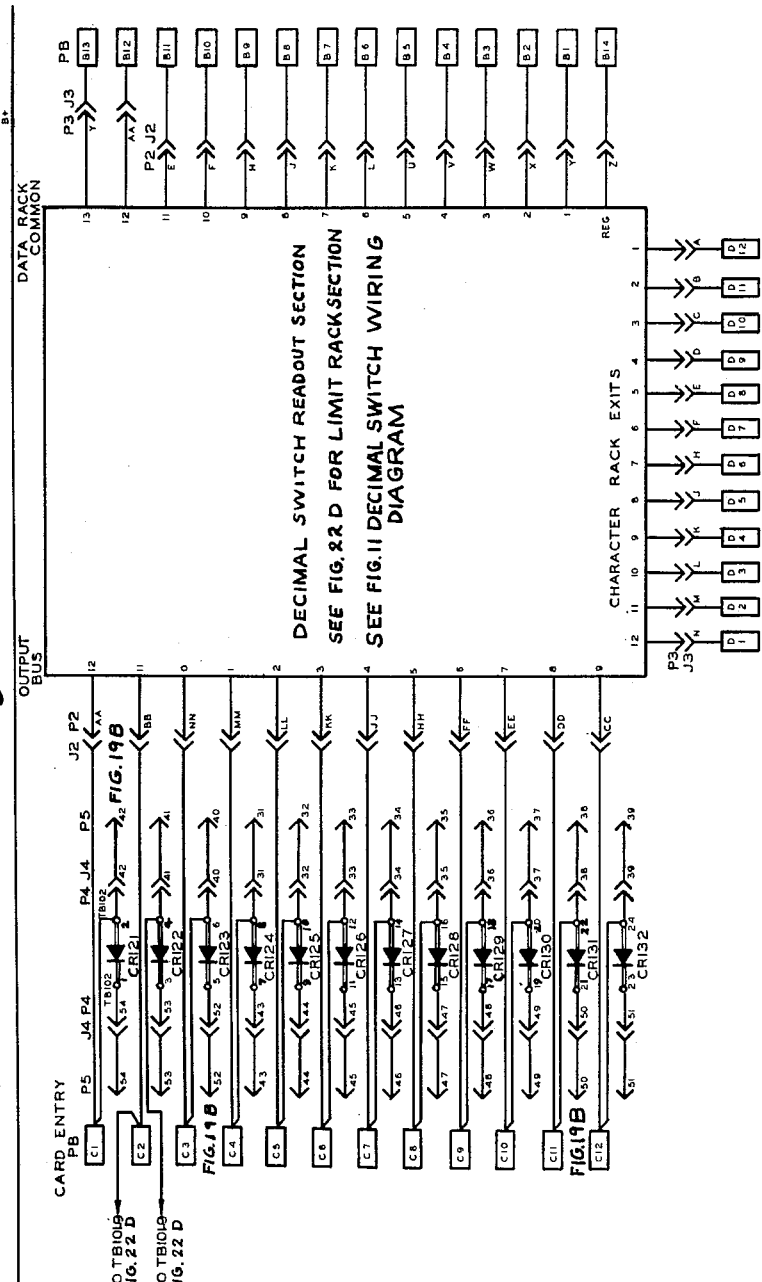

INVENTOR.
JAMES A. THOMAS.
BY
ATTORNEY.

March 6, 1962  J. A. THOMAS  3,023,952
ACCOUNTING MACHINE WITH CARD PUNCH ADJUNCT
Filed July 7, 1958  26 Sheets-Sheet 24
Fig. 22 I.
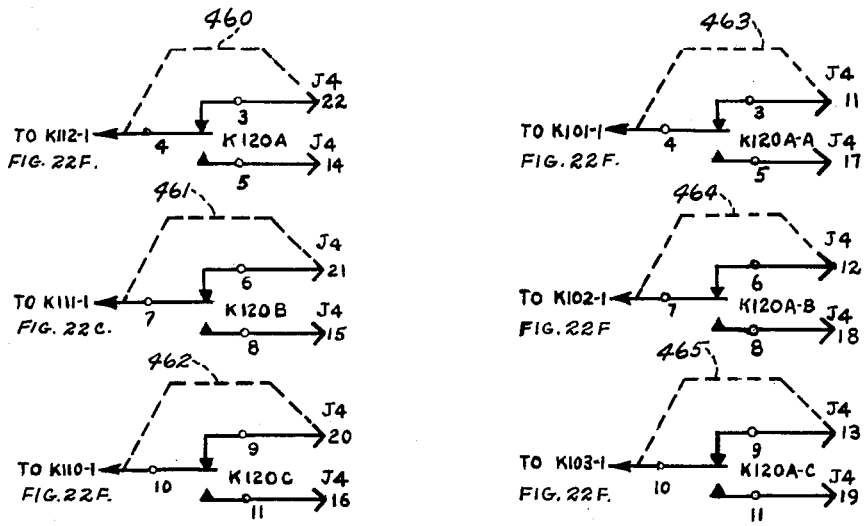
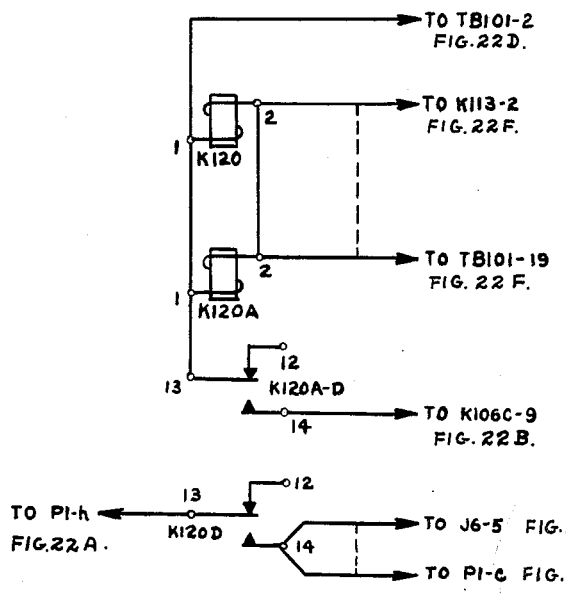
INVENTOR.
JAMES A. THOMAS
BY
ATTORNEY March 6, 1962          J. A. THOMAS          3,023,952

ACCOUNTING MACHINE WITH CARD PUNCH ADJUNCT

Filed July 7, 1958          26 Sheets-Sheet 25

Fig. 23.

INVENTOR.
*JAMES A. THOMAS.*
BY
*ATTORNEY.*

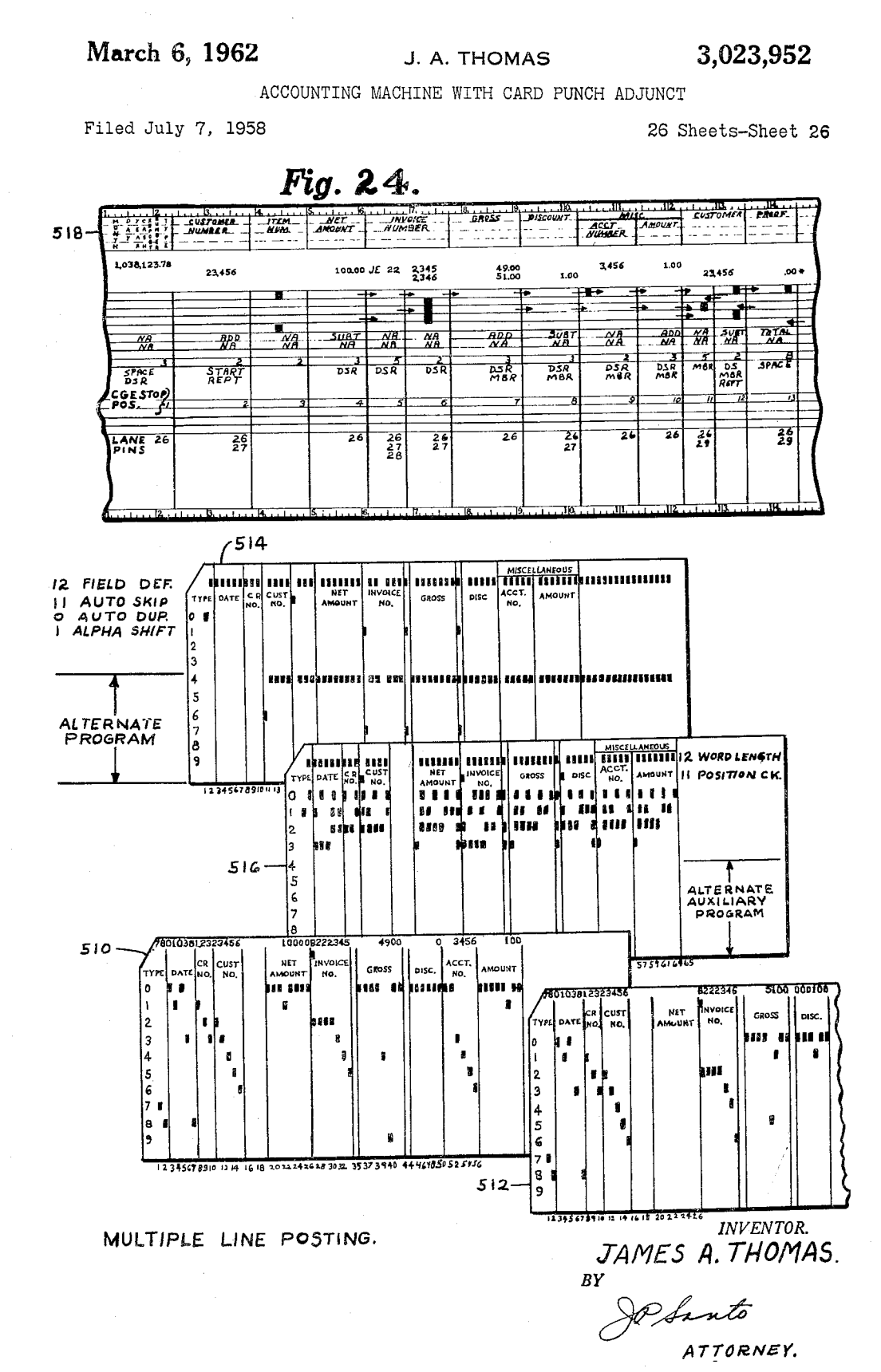

March 6, 1962  J. A. THOMAS  3,023,952

ACCOUNTING MACHINE WITH CARD PUNCH ADJUNCT

Filed July 7, 1958  26 Sheets-Sheet 26

Fig. 24.

MULTIPLE LINE POSTING.

INVENTOR.
JAMES A. THOMAS.
BY
ATTORNEY.

United States Patent Office 3,023,952
Patented Mar. 6, 1962

3,023,952
ACCOUNTING MACHINE WITH CARD PUNCH ADJUNCT
James A. Thomas, Garden City, Mich., assignor to Burroughs Corporation, Detroit, Mich., a corporation of Michigan
Filed July 7, 1958, Ser. No. 747,005
19 Claims. (Cl. 235—61.1)

This invention relates generally to accounting apparatus of the type including an accounting machine with a card punching attachment and to improved intercoupling control means therefor for operating the card punch machine directly from the accounting machine.

More particularly, the invention relates to accounting apparatus of the type described in copending U.S. patent application S.N. 626,765, filed December 6, 1956, now U.S. Patent 2,998,914, and has among its objects to provide improvements in apparatus of this character primarily from the standpoint of improving and expanding its programming flexibility, capacity and applications.

The accounting apparatus includes, in general, a commercially available accounting machine and a card punch machine which are electrically interconnected through a card punch control unit. The accounting machine includes a movable carriage portion having a platen and an automatic functional control panel thereon and a base portion including a keyboard section and a printing section coupled to an array of differentially positionable data racks and accumulator sectors, which are controlled through the data racks from the keyboard and/or from the automatic control panel at various stop positions of the carriage. In order to adapt the accounting machine for use with the card punch machine herein, certain electrical control elements have been added thereto including an electrical read-out section for sensing the mechanical differential positions of data racks, a machine drive trip interlock solenoid, several signaling devices, a plurality of machine actuated switches for timing purposes and for sensing carriage stop positions, minus indication, total and sub-total operations, and a plurality of manually actuated switches controlling the card punch control unit and certain functional operations of the card punch machine.

The card punch machine includes a card feed unit, a punching unit and a reading unit controlled through a separate keyboard and through a program unit, which includes a regular program drum and an auxiliary program drum, both of which carry prepunched program record cards thereon. The regular program drum provides automatic functional controls of the card punch machine including Field Definition, Auto-Skip, Auto-Dup and Alpha Shift. The function of the auxiliary program drum has been modified for purposes of the present invention and is used herein to regulate the sequence of punching variable information from the read-out section of the accounting machine and certain fixed information and the initiation of certain automatic functional controls of the card punch machine from the card punch control unit.

The card punch control unit through which the accounting machine and the card punch machine are interconnected includes a power supply, a control relay section, a relay matrix selectively energizable from control indicia in the auxiliary program card, and a programming plug board.

The record cards employed in the card punch machine are of the standard 80 column IBM variety having 80 vertical columns, each of which includes 12 punching rows of punching positions or zones, 12, 11, 0, and 1 through 9 extending from the top to the bottom of the card. Operation of the card feed unit releases and feeds a detail card from the card hopper past the punching unit which includes punching mechanism for punching the card column by column and advances the card past the reading station. As a card is being punched, the card previously completed is being read at the reading station, which includes mechanism to sense the absence or presence of a hole in a column of the lead card to enable duplication of any card column or group of card columns therefrom into the subsequent card at the punching station.

The apparatus is prepared for operation by scheduling the automatic control panel of the accounting machine for the accounting operations desired at various carriage stop positions thereof, placing a program card on the program drum of the card punch machine prepunched in accordance with the automatic functional control operations of the card punch machine desired therefrom in control fields corresponding generally to the order of scheduling of the program panel for the various carriage stop positions of the accounting machine, patch wiring the face of the program plug board of the control unit in accordance with the desired order of reading the read-out section of the accounting machine and/or the various control functions of the card punch machine desired therefrom, and placing a prepunched auxiliary program card on the auxiliary program drum of the card punch machine to regulate the punching sequence from the information in the data racks of the accounting machine and the selection of certain functional controls of the card punch machine as programmed from the plug board of the card punch control unit.

The main line switch on the card punch machine is closed and a Punch-on key and carriage control disabling lever on the accounting machine are actuated to energize the system, transfer control of the card punch machine to the accounting machine and the control unit, and to lock the keyboard of the card punch machine.

The operator may then depress a card Feed functional control key added to the keyboard of the accounting machine to energize the card feed unit of the card punch machine and to release a card from the card hopper thereof into the card bed where it is advanced to a preregistration position. Subsequent actuation of this key causes a second card to be fed from the card hopper of the card punch machine to the preregistration position therein and advances the first card to the registration position, or punching position, at which time a "LOCK" or no card signal lamp, which was energized after the system was turned on, will be extinguished to indicate that the system is ready for an accounting cycle.

The information in the accounting machine is represented by the differential mechanical positions of the data or actuator racks, which are controlled by the accumulators and the keyboard indexing keys, and is read out therefrom by the electrical read-out switch section, the data output terminals of which are connected in electrical circuits connected to the punch operating interposer magnets of the card punch machine. After this information is introduced into the amount keys of the keyboard of the accounting machine, a machine motor bar is depressed to initiate a machine cycle and tab the carriage to a stop position having a punch indication switch actuating pin therein to supply ground through the timing switches from which an initiating pulse is sent from the accounting machine through the contacts of the relay matrix of the card punch control unit to a code exit terminal on the plug board. The matrix relays are selectively energized in accordance with the control indicia contained in a binary 1, 2, 4, 8 coding notation in zones 0, 1, 2, and 3 of the first column of a control field of the auxiliary program card to activate one of the code exit circuits of the contacts of the matrix relays. The contacts of the matrix relays are contained in a single input, plural output contact tree arrangement to provide a total of 15 code exit outputs therefrom in accordance with the distribution of the coded binary punchings in the aforesaid zones of the auxiliary program card. The corresponding code exit terminal of the control unit plug board may be wired to the common terminal of a read-out switch associated with one of the data racks of the accounting machine. Depending upon the value of the quantity indexed in this keyboard column, one of the output contacts of this read-out switch will be closed to complete a circuit for the aforesaid pulse to a designated one of the punch interposer magnets of the card punch machine. Energization of this magnet initiates a card escapement cycle in which the detail card is advanced from card column 0 to card column 1 and is punched with the quantity read out of the aforesaid decimal read-out switch. Advancement of the detail card also advances the regular program card and the auxiliary program card to the next columnar position in which the coded punching in the auxiliary program card changes the condition of energization of the matrix relays to complete a circuit through a subsequent one of the code exit outputs of the relay contact tree.

As the punching of the detail card is being completed in its first columnar position, a pulse is supplied from a punch cam actuated timing switch in the card punch machine to pulse the input of the relay contact matrix section and supply a subsequent pulse through the output thereof as determined by the aforesaid energization of the matrix relays in the subsequent columnar position of the auxiliary program drum, and a subsequent pulse is supplied to another code exit of the control board of the card punch control unit to pulse a subsequent one of the decimal switches for a following one of the data racks of the accounting machine.

The termination of the punching operation or the end of the field is determined by a zone 12 word length punching in the auxiliary drum program card in which holes are punched in all of the card columns extending to the end of the field, except for the first card column at the beginning of the field. The first column of the next adjacent control field will not have a hole punched in zone 12 and prevents the pulse supplied during the punching of the last column of the first field of the detail card from being applied through the contact tree. Further operation of the card punch machine must then be initiated from a subsequent accounting operation performed from the accounting machine or from the regular program card.

In the event that a totaling operation was called for in the aforesaid carriage position of the accounting machine, the card punch control unit may be patch wired through the program board to provide, if desired, disabling of the card punch machine to prevent punching of the detail card or alternatively to punch the detail card, and in still other cases, to provide an over punch in zone 11 of any column of the total quantity. Punching may also be prevented on subtract or reverse operations and in the event of a blank keyboard operation in which skipping or duplication operations of the card punch machine may be initiated from the plug board. Through suitable patch wiring on the face of the program board, any of the code exits therefrom may be wired to provide any automatic functional controls of the card punch machine, such as card release, dup., or skip operations or to change the punching format of the detail card by shifting the regular program card and/or the auxiliary program to alternate program control.

Upon the initiation of an accounting machine cycle, the machine block solenoid is energized to prevent the initiation of a subsequent accounting machine cycle during the time that the card punch machine is operating to punch information into the detail card indexed from the first accounting machine cycle.

In accordance with another feature of the invention, a positive position check control is provided to prevent operation of the system in the event of a loss of synchronism between the columnar punching of the detail card and a carriage stop position from which information is to be punched in a subsequent punch field of the detail card. This feature assures that the first column of a field to be punched coincides with a carriage stop position from which information is to be punched in the detail card, before punching of the card.

Referring to the drawings:

FIGS. 2 and 3 are keyboard layouts of the accounting machine and of the card punch machine, respectively;

FIG. 4 is a right side elevation view showing some of the components of the accounting machine including an electrical read-out switch section which has been added thereto for sensing the differential positions of the actuator racks;

FIG. 5 is a fragmentary right side elevation view showing the accumulator sections of the accounting machine;

FIG. 6 is a right side elevation view of mechanism for raising and actuating the read-out switch section;

FIG. 11 is a diagrammatic view of the input and output terminals and electrical wiring of the read-out switch section and the electrical connections therefrom to the outlet plug connectors associated therewith in the accounting machine;

FIG. 12 is a diagrammatic illustration of the several plug and jig connectors and cables interconnecting the basic units of the integrated punched card accounting apparatus described herein;

Figure 19A:
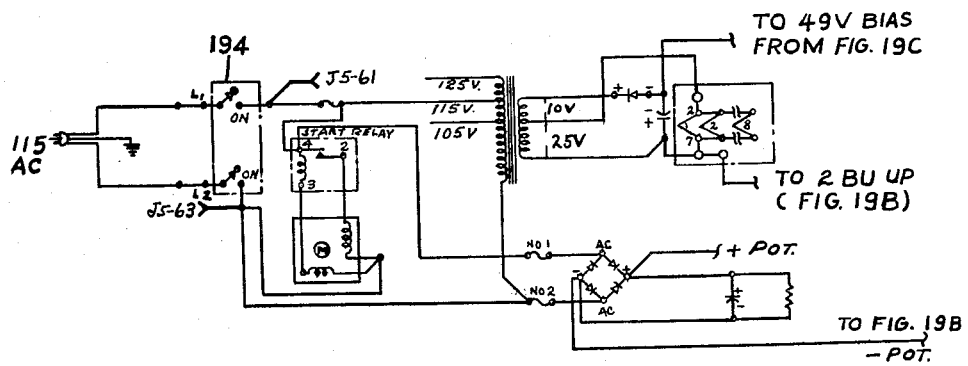
Figure 21:
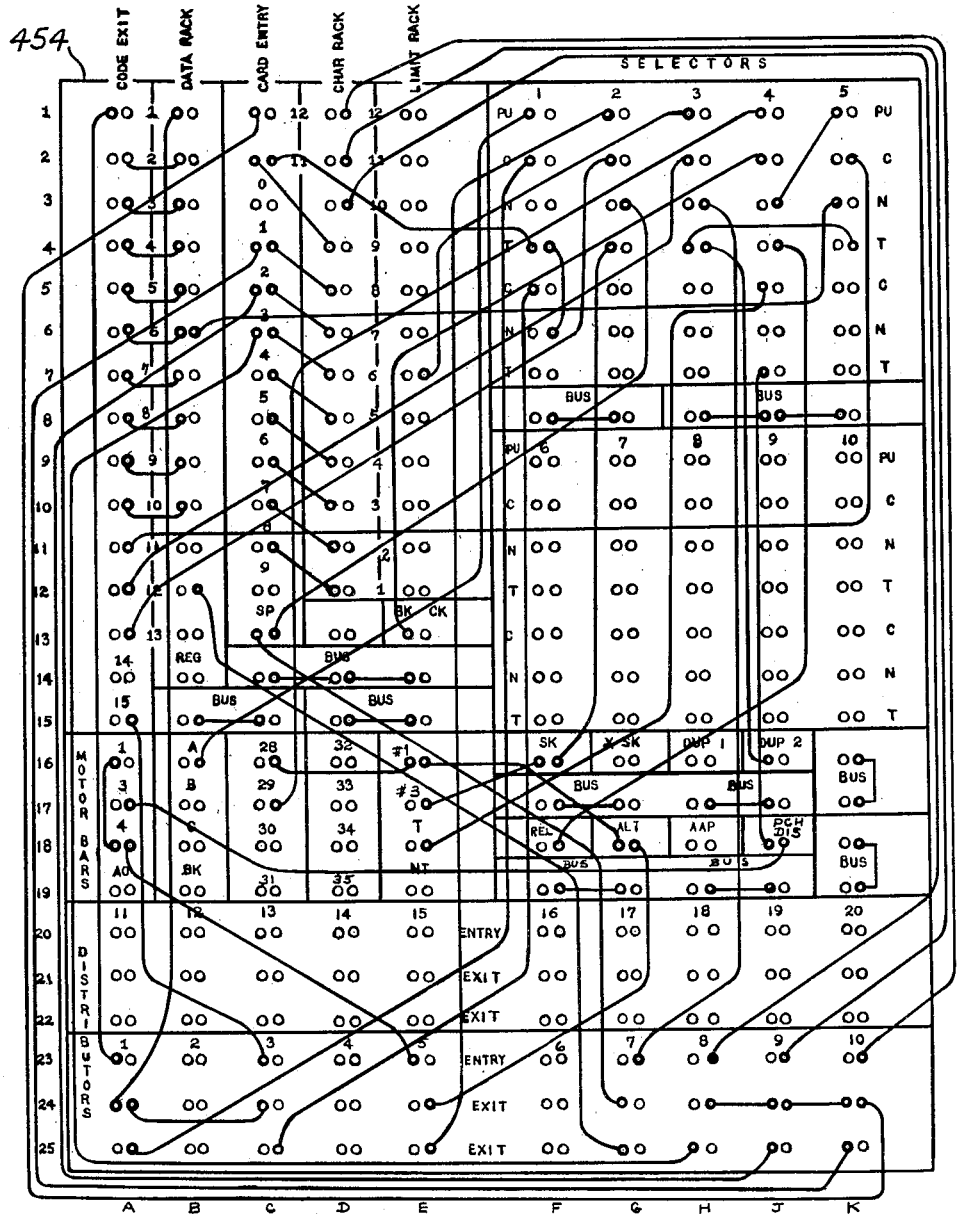

FIGS. 19A, B, C, and D illustrate the schematic electrical circuit diagram of the card punch machine as modified for use herein;

FIG. 20 is a perspective view illustrating the electrical components of the card punch control unit for intercoupling the accounting machine and card punch machine;

FIG. 21 is a view of the control plug board of the card punch control unit patch wired or programmed for the sample Cash Receipts Multiple line posting applications described herein;

FIGS. 22A through I represent the electrical schematic wiring diagram of the complete card punch control unit;

FIG. 23 illustrates the various media employed in a sample single line Cash Receipts application chosen to illustrate the operation of the accounting machine direct to card punch accounting apparatus; and FIG. 24 illustrates a multiple line posting application of the accounting machine with card punch adjunct apparatus described herein.

The accounting machine 10 comprises, in general, a base portion 20 including a keyboard 21 and a movable carriage portion 22, which is mounted for tabulation and return movement on the base portion and includes a platen assembly 24 upon which a recording member 25 may be rolled to receive printed impressions from the printing section of the machine. Except for certain modifications of the base portion and carriage portion, the accounting machine illustrated is a commercially available accounting machine such as the Style F503 machine manufactured by the Burroughs Corporation of Detroit, Michigan, and is similar mechanically to the accounting machine described in U.S. Patent No. 2,629,549 to Thomas M. Butler.

In addition to the result or functional control keys 28, motor bars 29, register selection keys 30, amount keys 31, and date and miscellaneous character designation keys 32 furnished on the keyboard of various styles of these machines, a special bank of functional control keys 27 and a group of signal lamps 34 are provided on the right side and left side, respectively, of the keyboard 21 to make available to the operator certain functional operations of the card punch machine from the accounting machine and to indicate certain operating conditions when the accounting machine is used with the card punch machine.

Mounted above the keyboard are a pair of carriage tab and return keys 36 and 37, a carriage control disabling lever 38 and a carriage open and close key 39, all of which are furnished on the machine.

In addition to the keyboard 21, the base portion 20 includes an electric drive motor 44, a plurality of horizontally extending actuator racks 46, a plurality of vertically extending print bars 48, and several accumulators or totalizer banks 50A, B, and C, all contained in the Butler machine.

The drive motor 44, indicated in dotted outline in FIG. 4, transmits power to the main cam shaft 52 through a one-revolution mechanical clutch 54 that is tripped upon depression of a motor bar or result key to apply the motor drive to rotate the cam shaft. The cam shaft 52 is the main control mechanism of the Butler machine and carries a plurality of timing cams as 56 that actuate various mechanism and index various accounting machine functions at different times during the machine cycle.

Associated with each forwardly and rearwardly extending columnar bank of keys to the left of the motor bars 29 are a locking slide 60 and an index strip 62, which respectively function after initiation of a machine cycle to lock these keys and to limit the forward movement of the actuator rack associated with a key bank in accordance with the value of a key as 35 indexed in that bank. Strip 62 is coupled to a pivotally mounted stop sector 63 and through cam follower mechanism 65 is permitted to move rearwardly upon rotation of the main cam shaft to limit on the stem 64 of an indexed key and block further rotary motion of the stop sector. One of the ten stepped sections as 66 of the stop sector 63 corresponding to the numerical value or position of an indexed key will then be interposed in the path of a formed ear 67 provided on each actuator rack 46 to limit the forward movement of the rack in accordance with the depressed key. Extending transversely through elongated openings in each of the actuator racks is a reciprocable actuating rod 68, which is moved upon rotation of the main cam shaft by a cam follower mechanism 70 to permit forward movement of each of the actuator racks to the positions determined by the keys indexed in the various columns of the keyboard.

Forward movement of each actuator rack rotates a separate bull gear 72 that meshes with a toothed portion 74 of the actuator rack and with a toothed portion 76 provided on the lower end of the print bar 48 provided for that rack. Each print bar carries a plurality of selectively operable, longitudinally movable type slugs 78 on the upper end thereof. Each print bar is thus elevated to a position where a type slug corresponding to the value or character of a depressed key of the bank of keys associated with that actuator rack and print bar may be struck during the machine cycle by a pivotally mounted hammer 80 to leave an impression upon the recording medium 25 between the type slugs and the platen assembly 24.

The accumulators 50A and 50B are illustrated as being of the so-called double pinion crossfooter variety as in Butler Patent No. 2,629,549 from which both positive and direct negative totals and sub-totals may be taken, while the accumulator 50C is illustrated as being of the single pinion multiple register variety shown in Butler Patent No. 2,721,695 in which plus totals and sub-totals and only complementary negative totals and sub-totals may be taken.

Each of the crossfooters 50A and 50B includes a set of intermeshed decimal pinions 81, 82 for each denominational order of amount information to be accumulated, a pinion shifting mechanism (not shown) for shifting the pinions 81, 82 slightly laterally for selective vertical alignment with the actuator rack associated with each pinion set, and a pinion assembly rocking mechanism 84 for raising the pinions into the path of the actuator rack with an aligned one of the pinions 81 or 82 engaging the rack, as described in detail in the principal Butler Patent No. 2,629,549. The pinion assembly rocking mechanism 84 includes a bifurcated hook arm 85, a meshing arm 86, and an internal cam member 87, and cooperates with a series of laterally spaced add, subtract/total, sub-total, and negative balance meshing control slides 90, 91, 92 and 93, which are located on the right side of the machine and are reciprocated from the main cam shaft 52 through cam follower mechanism as 94. Each of the control slides carries a series of square studs as 96 thereon for engagement with the bifurcated portions of the hook arms 85 of the pinion rocking mechanism and is selectively coupled to or disengaged from the hook arms of the accumulators through depression of selected ones of the result keys as 28B–5 of the keyboard or from the machine carriage controls to bring an aligned one of the pinions of all or selected ones of the accumulators into mesh with an actuator rack at the proper time during the machine cycle and provide the desired computing function. Each of the intermeshed positive total pinions 81 and negative total pinions 82 has a long tooth 98 which limits on a total limit bail 100 that is positioned in the path of the long tooth of pinion 82 to provide a limit for the actuator racks during total taking and sub-total taking operations.

The accumulator 50C shown in the register C position is of the multiple register variety comprising a plurality of interspersed pinions 102 arranged in a number of compact groups corresponding to the number of denominational orders of information to be accumulated, with each group containing, say, nine laterally spaced pinions corresponding to nine separate register or storage sections provided on this style of machine. The pinions are mounted on a common shaft which may be moved longitudinally by mechanism under control of the register selection keys 30 on the machine keyboard or the machine carriage controls to position the pinions belonging to the same register section in each of the pinion groups in vertical alignment with the corresponding actuator provided for each group and are adapted to be rocked into engagement with and to be disengaged from the actuator racks by a pinion rocking assembly under the control of the result keys or machine carriage controls in a manner similar to the pinions of the crossfooters, as shown and described in Butler Patent No. 2,721,695.

In the rearmost position beneath the actuator racks 46, there has been added a static memory unit in the form of an electrical readout switch assembly 110 which functions to sense the differential mechanical positions of the actuator racks and controls the electrical energization of the punch operating interposer magnets of the card punch machine, as hereinafter described. The read-out assembly may be of the type shown and described in U.S. Patent No. 2,812,902 and co-pending application S.N. 626,765 filed December 6, 1956, now U.S. Patent 2,998,914, and comprises a plurality of multiple switch sections labelled S201 to S213 in the wiring diagram of FIG. 11 herein, a separate switch unit being provided for each actuator rack from which information is to be read out of the machine. The individual switch sections are of the decimal type or duo-decimal type depending on whether the actuator rack to be sensed thereby is of the ten pitch or twelve pitch variety. Each switch section has a double row of laterally and longitudinally spaced depressable switch actuating pins shown at 112, 113 in FIG. 7 herein, ten of such pins arranged in two rows of 5 pins each being provided for the decimal type switches and twelve of such pins arranged in two rows of six pins each being provided for the duo-decimal type switches.

Figure 7:
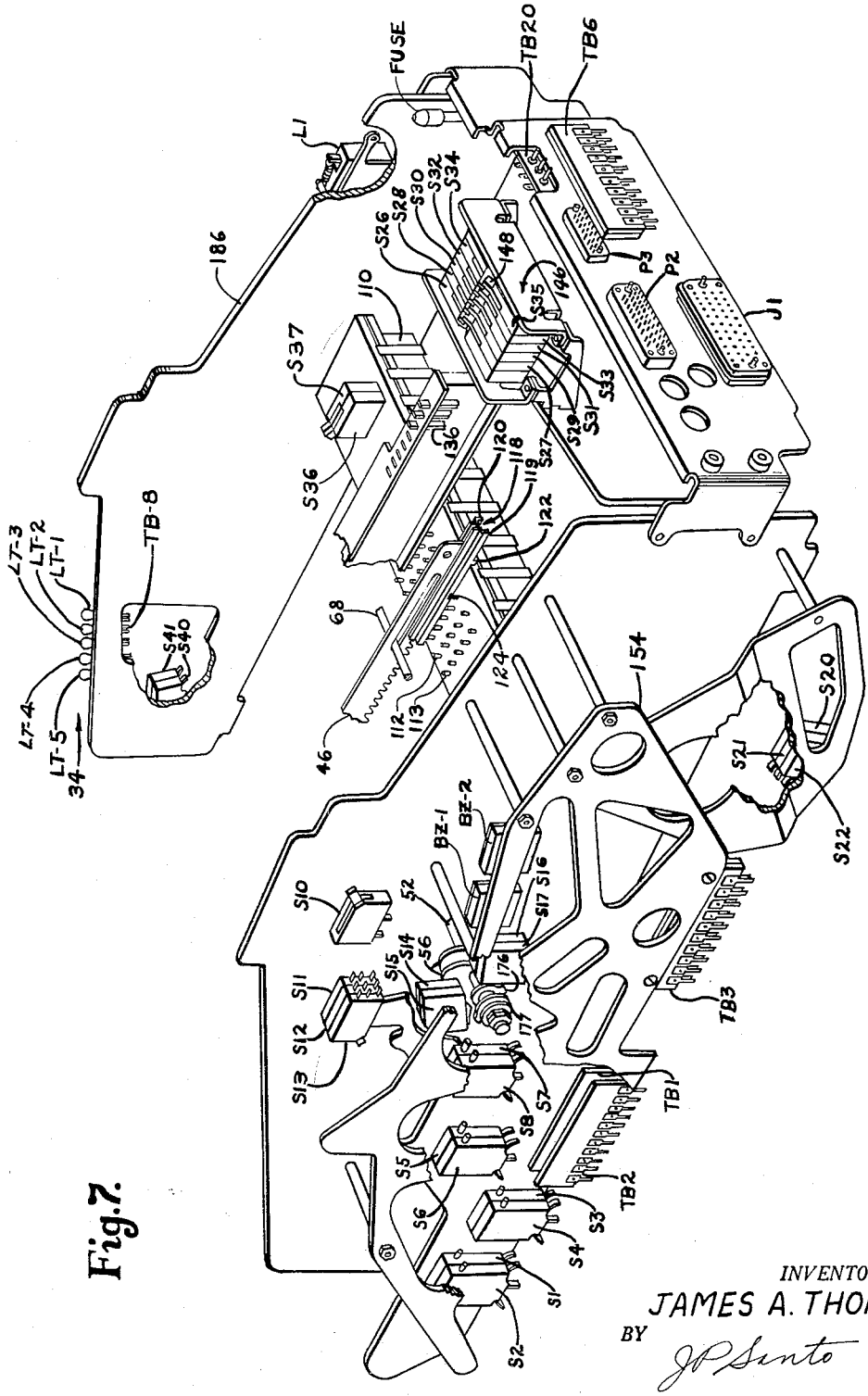
FIG. 7 is a perspective view showing the relative locations of the various electrical components which have been added to the accounting machine for purposes of the present invention.

For actuating the pins and operating the switches, each of the actuator racks from which information is to be read out of the machine has affixed to the end thereof, a coded slide member 118 having a pair of laterally spaced downwardly extending flanges 119, 120, each of which has a switch operating projection 122, 123 and a notched section 124, 125 thereon, as indicated in FIGS. 4, 6, and 7 herein.

The entire read-out switch assembly 110 is adapted to be rocked from its retracted position shown in FIG. 4 to its elevated position shown in FIG. 6 in which the switch actuating pins are indexed against the coded slides of the actuator racks through rocking mechanism 128 actuated from the cam shaft of the machine as described more fully in the aforementioned Patent 2,812,902.

Figure 9:
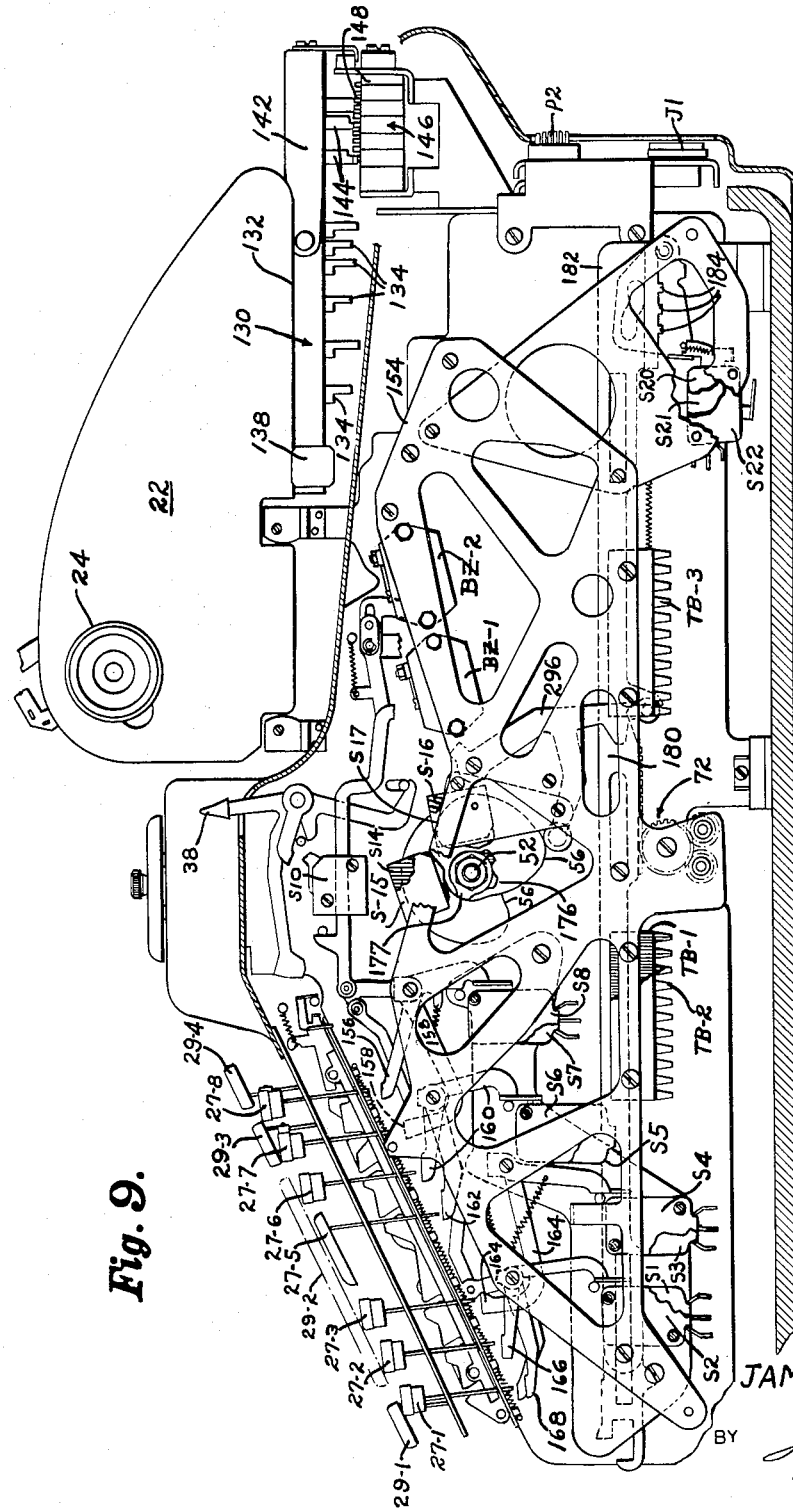
FIG. 9 is a right side elevation view with parts broken away showing some of the switch actuators and mechanism associated with the electrical components added to the accounting machine.

In addition to the platen assembly 24, the carriage portion 22 of the Butler machine 10 includes an automatic function selection program unit indicated generally at 130 in FIG. 9 herein. The machine program unit comprises, in general, a rectangular, inverted shallow pan 132 having a plurality of laterally and longitudinally spaced control lugs 134 depending therefrom. The control lugs 134 are of various lentghs and operate at preselected positions of the carriage, a sensing mechanism which includes a series of vertically movable sensing tappets shown at 136 in FIG. 7 and a plurality of bell cranks and levers (not shown) to effect various automatic functional controls of the machine similar to those effected by manually depressing various ones of the functional control keys, as described in the pricipal Butler patent.

Figure 1:
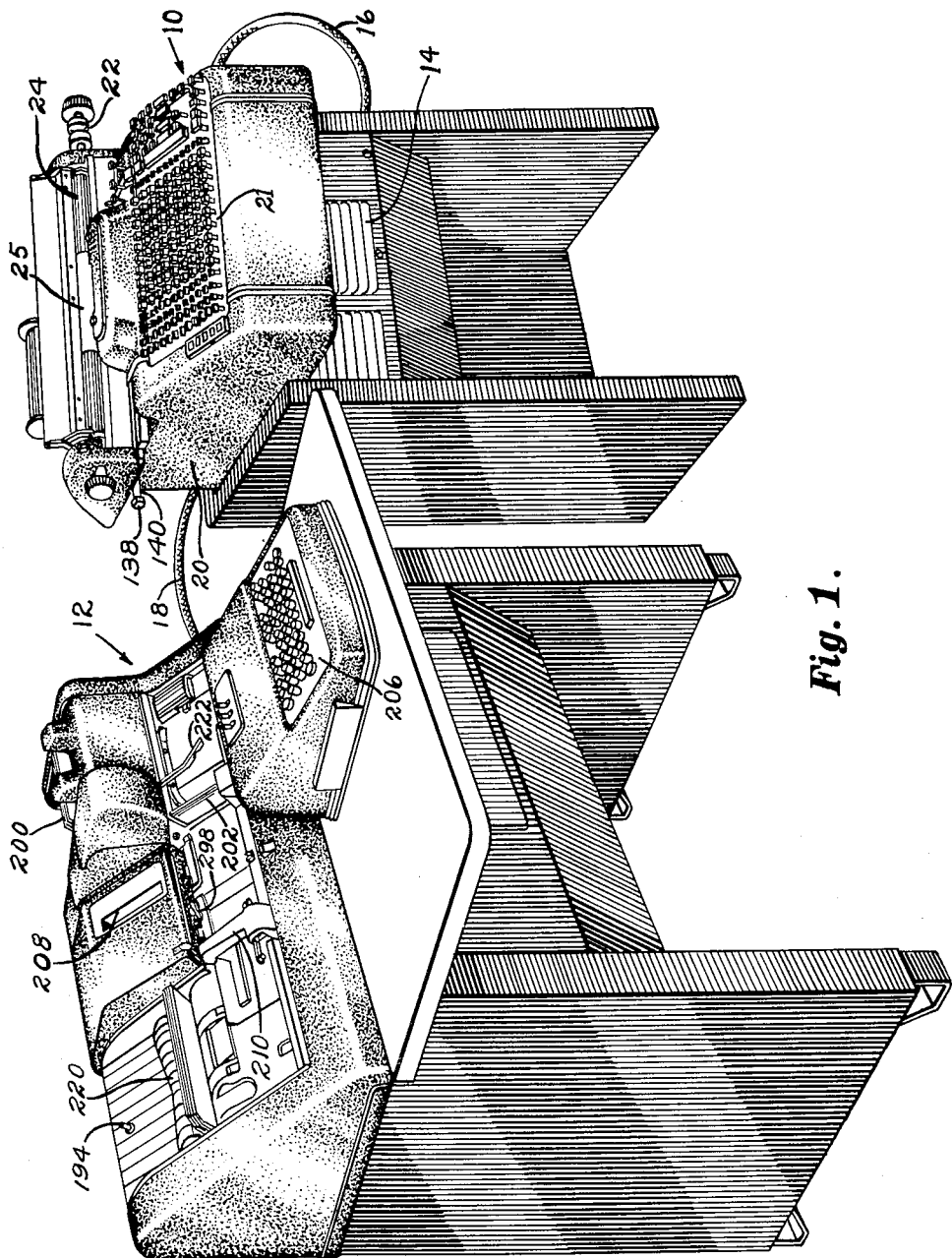
FIG. 1 is a perspective view of an accounting machine coupled to a card punch machine through the card punch control unit of the present invention.

Located on opposite sides of the pan or program tray 132 is a spaced pair of knobs as 138, provided on the ends of a program selector shaft 140 shown extending through the program tray in FIG. 1. The shaft may be rotated manually by the knobs to any one of four positions to shift the program tray slightly laterally to any one of four positions in each of which a different set of longitudinally spaced control lugs is positioned at each of the carriage tabulating positions to cooperate with the aforementioned sensing mechanism, thereby affording a selection of several different mechanical control programs of accounting machine operation.

In order to establish several additional control lanes for controlling the card punch machine from the accounting machine, the control tray 132 of the accounting machine has been extended rearwardly by the addition of an auxiliary control tray 142 attached to the rear edge of tray 132, as indicated in FIG. 9. The tray 142 mounts a plurality of transversely and longitudinally spaced switch actuator elements 144 shown as depending skids or lugs which cooperate with a bank of electrical control switches indicated generally at 146 supported from the rear of the base portion of the machine and having their individual switch actuator arms 148 in position to be engaged by the lower ends of respective ones of the control lugs 144 as the tray 142 moves transversely across the accounting machine with the carriage 22, as more fully shown and described in the aforesaid application S.N. 626,765.

The above-mentioned switches, hereafter referred to as the electrical lane switches, are also illustrated in FIG. 7 in relation to the various other electrical components which have been added to the base portion of the accounting machine to adapt the accounting machine for use with the card punch machine and are listed in the following table together with the actuating source therefor and/or the function effected thereby.

| SYMBOL | COMPONENT | FUNCTION |
|---|---|---|
| S1 | Alt. Pro. Control Key (27-1) Sw | Alt. Pro. |
| S2 | Dupl. Control Key (27-2) Sw | Duplication. |
| S3 | Skip/X-Skip Control Key (27-3) Sw | Skip/X-Skip. |
| S4 | Skip Interlock (27-3) | Skip Interlock. |
| S5 | Card Release Control Key (27-5) Switch | Card Release. |
| S6 | Card Feed Control Key (27-6) Sw | Card Feed. |
| S7 | Card Register Control Key (27-7) Switch | Card Reg. |
| S8 | Punch-On Control Key (27-8) Sw | Punch On-Off. |
| S10 | Carriage Control Disabling Lever (38) Switch | Punch On-Off. |
| S11 | Motor Bar 1 (29-1) Switch | Programming. |
| S12 | Motor Bar 3 (29-3) Switch | Do. |
| S13 | Motor Bar 4 (29-4) Switch | Do. |
| S14 | Timing Cam Switch | Timing. |
| S15 | Do | Do. |
| S16 | Do | Do. |
| S17 | Do | Do. |
| S20 | B Symbol Slide (Minus Indication Switch). | Programming. |
| S21 | A Symbol Slide (Minus Indication Switch). | Do. |
| S22 | C Symbol Slide (Minus Indication Switch). | Do. |
| S26 | Electrical Lane No. 26 Switch | Punch Indication. |
| S27 | Electrical Lane No. 27 Switch | Position Check. |
| S28–S35 | Electrical Lane Switches | Programming. |
| S36 | Tab. Interlock Switch | Machine Block. |
| S37 | Do | Disable LT-4 and BZ-2. |
| S40 | Total Bail Switch | Total Limit. |
| S41 | Do | Do. |
| L1 | Drive Trip Interlock Solenoid | Machine Drive Trip Interlock. |
| LT-1 | Punch Indication Lamp | Punch Indication. |
| LT-2 | Lock Lamp | Lock Signal. |
| LT-3 | Alternate Program Lamp | Alt. Pro. Signal. |
| LT-4 | Position Check Lamp | Pos. Check Signal. |
| LT-5 | Auxiliary Program Lamp | Aux. Pro.Signal. |
| BZ-1 | Buzzer | Machine Lock Buzzer. |
| BZ-2 | Do | Pos. Warning Buzzer. |

Figure 8:
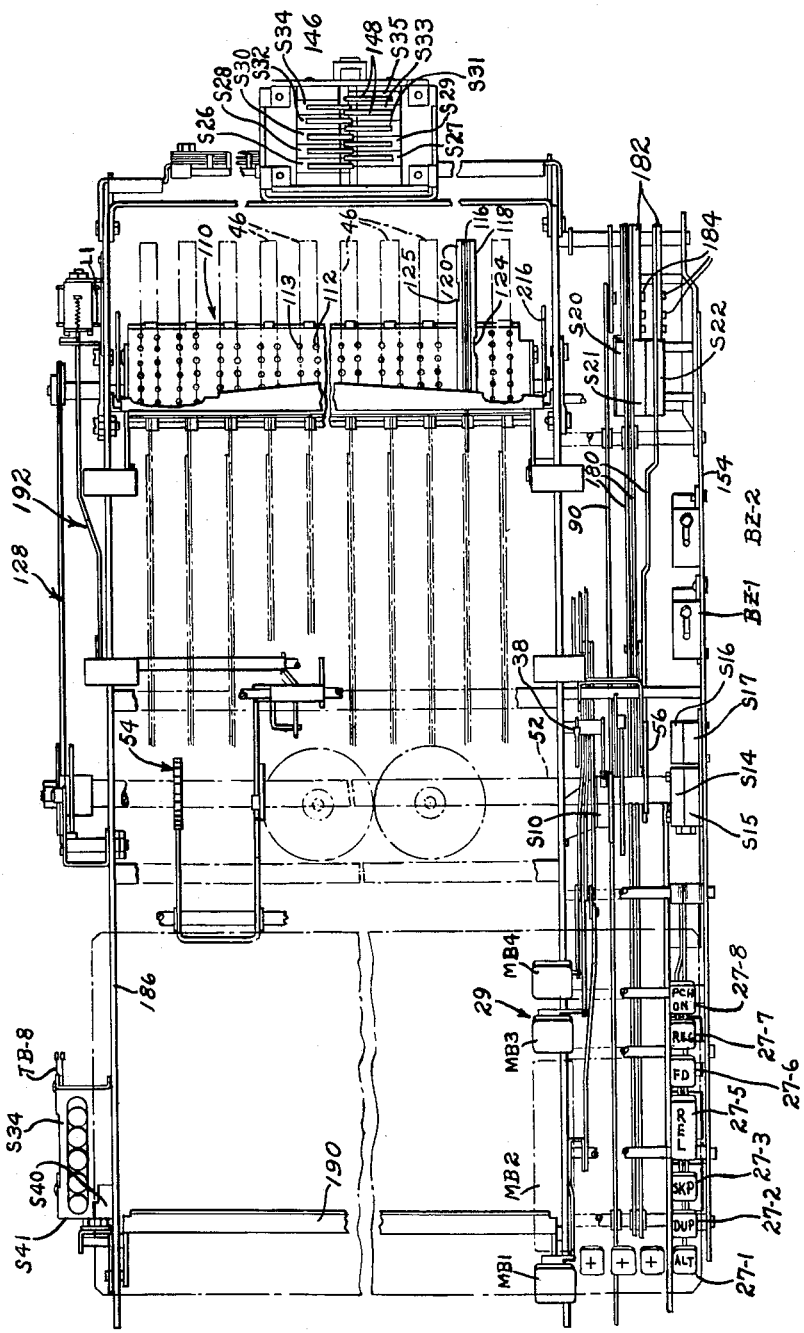
FIG. 8 is a top plan view of the accounting machine with the cover, keyboard and carriage removed, showing some of the switch actuators and mechanism associated with some of the electrical components added to the accounting machine.

The switches S1 to S8 are selectively actuated from the special bank of functional control keys 27 on the right side of the keyboard and are mounted on the auxiliary right side frame 154 of the accounting machine as shown in FIGS. 7, 8 and 9 herein. The uppermost key 27–8 designated Punch-on, when depressed is latched down causing its stem to engage and rock bell crank 156 to actuate switch S8 which controls the application of power to the various control relays of the card punch control unit 14, as described later herein. Depression of control key 27–7 labelled "Reg.," rocks its bell crank 158 to actuate switch S7 which is located adjacent to and behind switch S8 and completes an electrical control circuit to the card punch machine to index an automatic card release operation therein. Control key 27–6 labelled "Feed" when depressed rocks its bell crank lever 160 to actuate switch S6 for completing a control circuit to the card punch machine and cause a card feed cycle therein. Likewise, depression of control key 27–5, labelled "Rel." actuates switch S5 through bell crank 162 to complete a control circuit for initiating a card release operation of the card punch machine.

The Skip key 27–3 actuates both the skip or X-skip switch S3 and the skip interlock switch S4 through a double fingered bell crank 164 to cause a skip or X-skip operation of the card punch machine and prevent the latter from skipping more than one card field if the key is held depressed by the operator. The Dup key 27–2 and Alt. Pro. key 27–1 actuate switches S2 and S1, respectively, through their respective bell cranks 166 and 168 to initiate a duplication operation in the card punch machine or to shift the internal program control of the card punch machine to an alternate program condition indicated by energization of signal lamp LT–3.

Switch S10 is actuated in the forward position of the carriage control disabling lever 38 and is connected in series with the punch indication switch S8 to control the application of power to the card punch control unit 14.

Switches S11, S12, and S13 illustrated in FIG. 7 are actuated by respective ones of motor bars 29–1, 29–3, and 29–4 and are wired to the program control board of the card punch control unit to effect a key punch machine function other than the function that would be provided if motor bar 29–2 had been depressed in the same carriage position.

Switches S14, S15, S16, and S17 are timing switches which are actuated during the accounting machine cycle from timing cams shown at 176, 177 on the cam shaft 52 of the accounting machine to provide four successive timing pulses used to initiate certain control operations of the system. Switches S15 and S17 are closed by cam 177 from 150° to 162° and from 250° to 262°, respectively, of the accounting machine cycle to provide the No. 2 and No. 4 timing pulses, while switches S14 and S16 are closed by cam 177 from 100° to 125° and from 200° to 225°, respectively, of the accounting machine cycle to provide the No. 2 and No. 3 timing pulses to which reference will be made later herein.

The switches S20, S21 and S22, located at the rear of the right auxiliary side frame 154, function to sense the sign, plus or minus, of the A, B, and C accumulators and are actuated by individual symbol slides as 180, one of which is provided for each of the accumulators as shown in FIG. 100 of the principal Butler patent. Each slide carries a coded strip as 182 having three projections as 184 thereon which permit the switches to remain closed whenever a subtract, minus sub-total or a minus total operation is effected in any one of the accumulators, as more fully shown and described in the aforementioned application S.N. 626,765. The minus indication switches are wired to the control board of the card punch control unit which can be wired to provide a minus indication punch or to disable the punch, for example, depending on the desired programming.

The electrical lane switches S26 to S35 are actuated from the control lugs 144 of the auxiliary electrical program tray 142 as previously mentioned and serve to provide certain control functions of the card punch machine at those positions of the accounting machine carriage containing one or more of the control lugs 144. Lane switch S26, the punch indication switch, is actuated by a control lug provided in each position of the accounting machine carriage in which information indexed in the accounting machine is to be punched in the card punch machine. Lane switch S27 is a position check switch which is included in a control circuit for sensing the coincidence of the beginning of a punch field of the card punch machine with a predetermined carriage position of the accounting machine and for detecting synchronism or loss of synchronism between the two machines.

Lane switches S28 to S31 are wired to the program board of the card punch control unit and operate in connection with several program control relays to perform specific control functions of the card punch machine or to alter any of the basic programmed functions and control operations thereof effected from the accounting machine, as will be later described herein. The lane switches S32 to S35 are reserved to provide additional lanes of control similar to lane switches S28 to S31 depending upon the program requirements and extend the programming flexibility of the system.

The switches S36 and S37 are in-tab switches which are actuated from their normally closed position during movement of the carriage by mechanism shown and described in co-pending U.S. application S.N. 598,454, filed July 17, 1956 and function to sense when the accounting machine carriage has stopped in a tabulating position. In-tab switch S36 is connected in circuit with the machine drive trip interlock magnet L1 which is located in the left side frame 186 of the accounting machine and, when energized, prevents the machine drive from being tripped. In-tab switch S37 is connected in circuit with the position check signal lamp and buzzer to prevent energization of these signal devices when the carriage is tabulating or returning, as will appear more fully hereinafter.

The total limit switches S40 and S41 are located on the left side of the accounting machine and are actuated from their normally closed position by the index lock bail 190 which operates on total and sub-total cycles to lock the keyboard through the indexing strips 62 and sectors 63 and to enable quantities stored in the accumulators to be read out thereof, as described in the principal Butler patent. The switches S40 and S41 are wired to the control unit program board to make available therefrom a desired control operation of the card punch machine upon initiation of a total or sub-total operation of the accounting machine, as explained later herein.

The aforementioned machine drive trip interlock magnet or solenoid L1 functions to prevent tripping of the machine drive during certain functions of the card punch machine as when the latter is in a skip, dup or card release condition or is punching information from the data indexed in the decimal switch read-out section of the accounting machine. L1 is also energized if the card lever relay of the card punch machine is not picked or if the carriage of the accounting machine is out of position with respect to the designated punching fields of the card in the card punch machine, as sensed by the position check control circuit. Reference may be had to the aforementioned application S.N. 626,765 for a description of the interconnecting elements shown generally at 192 of FIG. 8 herein between the solenoid L1 and the machine drive tripping mechanism.

In addition to the signal lamps LT–1 to LT–5 located on the forward left side of the accounting machine, two audible signaling devices in the form of buzzers BZ–1 and BZ–2 are provided on the framing member 154 of the accounting machine. LT–1 is a Punch on signal lamp which is illuminated when the on-off main line switch 194 on the card punch machine is turned on, the Punch-on key 27–8 of the accounting machine has been latched down to activate switch S8 and the carriage control disabling lever 38 has been shifted to its forward active position to actuate switch S10.

LT–2 is a Lock signal lamp which is activated together with buzzer BZ–1 to indicate to the operator that, while the control unit power supply has been energized, the card lever relay of the card punch machine is not energized due either to failure to feed two successive cards into the punch bed or to depletion of the cards in the supply hopper thereof. With a supply of cards in the hopper of the card punch machine, the card Feed key 27–6 on the accounting machine is depressed twice in succession until a detail card has been positioned at the registration position and another at the pre-registration station of the card punch machine, whereupon the card lever relay therein is energized and the Lock lamp and buzzer in the accounting machine will be inactivated.

Lamp LT–3, labelled "Alt. P." in FIG. 2, will be illuminated when the operator depresses the Alt. Pro. key 27–1 on the keyboard of the accounting machine to actuate switch S1 which completes an energizing circuit to the alternate program relay R39 in the card punch machine to place the latter machine in an alternate program control condition.

The position lamp LT–4, labelled "Pos.," operates in conjunction with the buzzer BZ–2, both of which are energized through a pair of switches, one of which is operated from a control lug in electrical control lane 27 of the accounting machine and the other from an 11 punch in a column of the auxiliary program card on the auxiliary dup drum of the card punch machine, as later explained herein. The lamp and buzzer are de-energized if both of these control switches are in the same position, i.e. both opened or both closed, but if one switch is closed and the other is open, the lamp and buzzer will be energized, indicating the card punch machine is out of step with the carriage of the accounting machine. Under these conditions, an energizing circuit is also completed to the machine drive trip interlock solenoid L1 to prevent initiation of a subsequent cycle of accounting machine operation.

The lowermost lamp LT–5, labelled AAP, forms part of a control circuit feature optionally available with the system described herein and is illuminated when the contol unit is shifted to an auxiliary alternate program. Under these conditions, the control circuits established from the upper portion of the auxiliary dup drum program card of the card punch machine are transferred to the lower portion of this program control card for extending the flexibility of the system.

Figure 10:
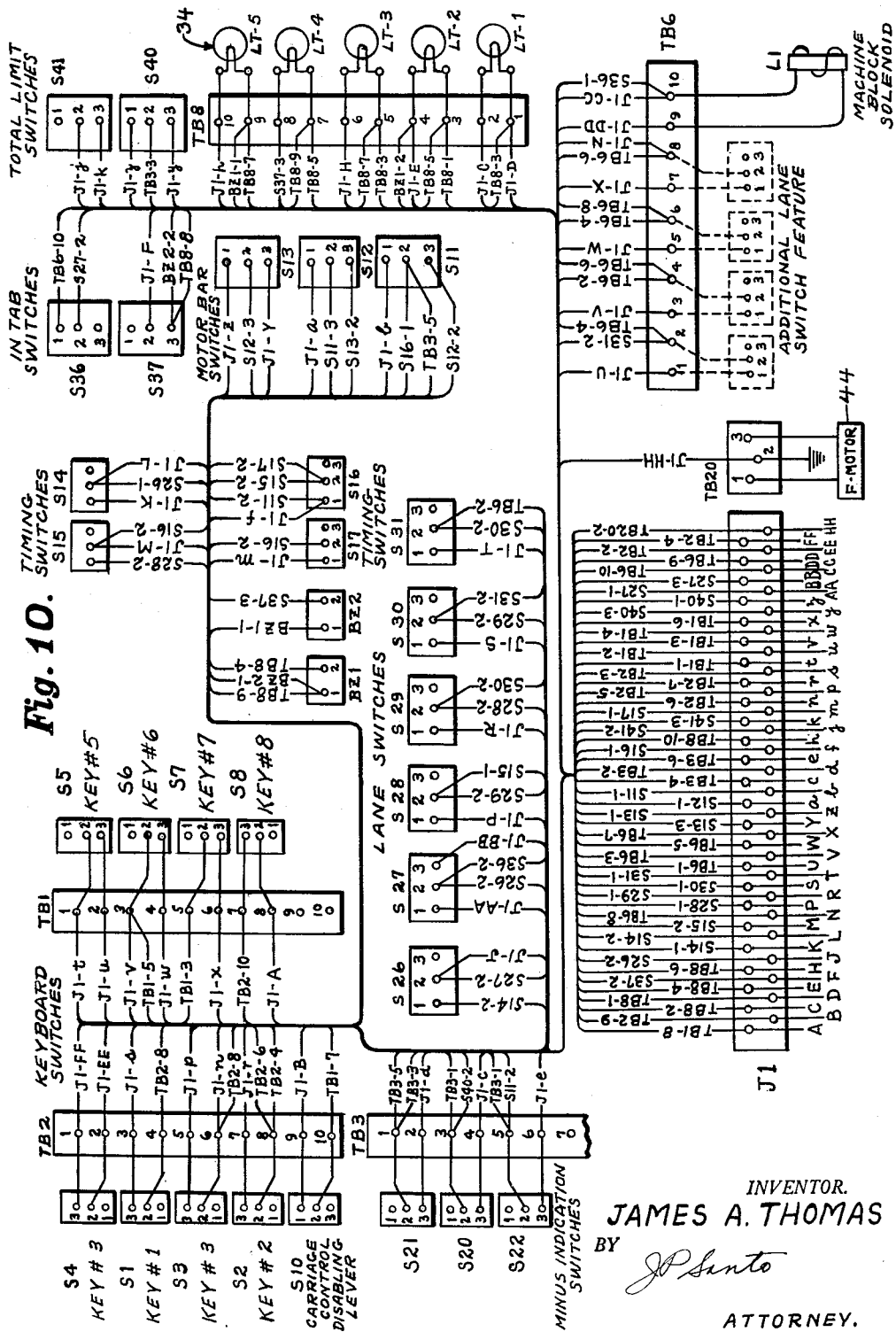
FIG. 10 is a diagrammatic illustration of the internal electrical wiring connections to the various electrical components from the terminal boards and connector plugs of the accounting machine.

The electrical conductors connected to the various electrical control elements contained within the accounting machine are represented in FIGS. 9 and 10, the location of the various terminal boards and cable connector plugs of which are shown in FIG. 7. The laterally spaced terminal boards TB–1 and TB–2 provide connections for the terminals of the keyboard switches S1 through S8 and switch S10, while TB–3 includes the circuit connections and conductors for the minus indication switches S20, S21, and S22. Terminal board TB–8 is located below the signal lamp assembly 34 and provides circuit connection points therefor, while TB–6 is mounted on the rear of the machine case or housing and provides circuit connection points for the machine drive trip interlock solenoid L1 and the additional lane switches S32 to S35.

The pin contacts of the two male plug connectors P2 and P3 on the accounting machine are connected to the various input and output terminals of the decimal and duo decimal switches of the read-out switch assembly 110 as indicated in FIG. 11, while the various socket contacts of the female jig connector J1 are connected to the power plug terminal board TB–20 for the motor of the accounting machine and to the various terminal boards TB–1, TB–2, TB–3, TB–6 and TB–8 and to the remaining electrical elements as indicated. The jig connectors J2 and J3 and the plug connector P1 connected respectively to the corresponding connector elements P2, P3 and J1 are wired to various conductors which are contained in cable 16 and are connected directly to the control unit 14. The several plug and jig connectors and their associated cables for interconnecting the basic units 10, 12, and 14 of the system are illustrated diagrammatically in FIG. 12 in which the legends P1, P2, etc., indicate the plug or male portion of the respective connectors and the legends J1, J2, etc., the jig or female portions thereof.

In the read-out switch wiring diagram of FIG. 11, switches S201 through S211 are 10 pitch decimal switches for sensing the digit values indexed in the ten listing columns of amount keys 31 with switch S211 provided for sensing the extended total column. Switches S200, S212 and S213 are of the duo-decimal or 12 pitch variety associated with keyboard columns 30 and the two columns of year, date and miscellaneous character keys immediately to the left of the amount columns.

Each decimal switch unit has two input terminals labelled X and Y, ten output terminals labelled 0 through 9 that are associated with input terminal Y, and two extra decimal terminals labelled A and B that are associated with input terminal X and will be referred to herein as the limit rack section of each decimal switch. The output terminals A and B are indexed into circuit completing relation with input terminal X by the actuator pins which index the "0" and "5" terminals, respectively, into engagement with the Y input terminal and function to sense the presence of a blank keyboard condition or to provide an indication from the decimal switches associated with those actuator racks in which amounts were not indexed to the left of the highest significant digit of the amount indexed into the accounting machine for the purposes later described herein.

Each of the duo-decimal switches S200, S212, S213 has 12 output terminals labelled 1 through 12 which are selectively actuable into engagement with the two interconnected input terminals X and Y thereof in accordance with the relative position of an indexed key in a character column.

It will be noted the "0" output terminals of the several decimal switch units S201 through S211 are connected together and are bussed to a common terminal P2–NN of connector plug P2. The remaining output terminals of these decimal switches are similarly bussed to P2 plug terminals P2–MM (1), P2–LL (2), P2–KK (3), P2–JJ (4), P2–HH (5), P2–FF (6), P2–EE (7), P2–DD (8), and P2–CC (9). Terminals 1 through 9 of duo-decimal switch S200 are connected to the corresponding numbered terminals of the aforementioned decimal switches, with the output terminal "10" thereof connected to the aforesaid "0" terminal bus and terminals 11 and 12 to connector points P2–BB and P2–AA, respectively, as shown.

The output terminals of the duo-decimal character rack sensing switch S212 are separately connected to the terminal points A through H and J through N of connector plug P3 as shown on the upper left side of FIG. 11. With the exception of the interconnected output terminals "1, 2 and 3" connected to terminal point P3–W, the terminals 4 through 12 of duo-decimal switch S213 are connected to the same terminal points as those of switch S200.

*Card Punch Machine*

The card punch unit 12 employed in the accounting apparatus of the present invention may be an IBM key punch machine such as is described in U.S. Patents 2,647,581 and 2,753,789 to E. W. Gardinor et al. and is employed with record cards of the well-known IBM variety illustrated in FIG. 23 herein having twelve horizontal rows of punch designation receiving positions and eighty vertical columns. Each column may have a single hole or a combination of holes punched therein to designate a number or an alphabetical character or symbol, and the card can be divided into a plurality of separate data designation fields each containing one or more columns each representing one digit symbol or character of the data to be punched.

Figure 13:
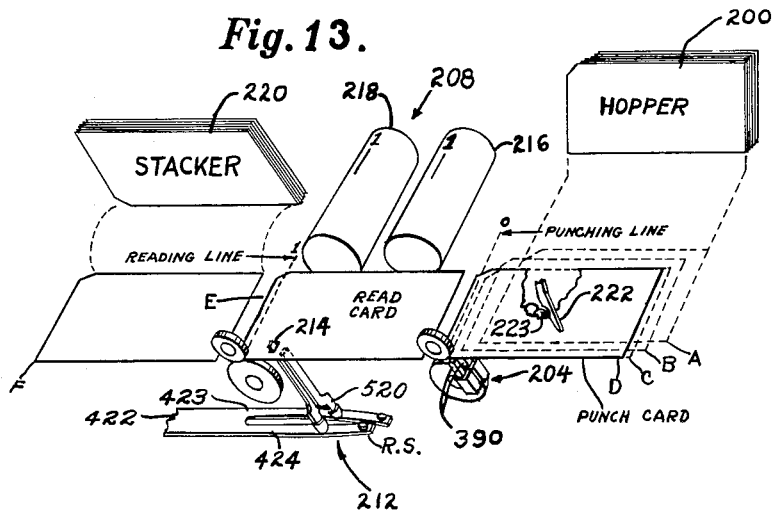
FIG. 13 is a diagrammatic view illustrating the path of a record card in the card punch machine.

With reference to FIGS. 1 and 13, the card punch machine includes in general a card hopper 200 at the upper right of the machine from which cards are adapted to be released and fed in succession past a punching station head 202, which includes punching mechanism 204 for punching a card column by column under the control of a keyboard 206 and a program unit 208 and are then advanced individually past a reading station head 210. As a card is being punched, the card just previously completed, called the read card, is being fed under the reading station head which includes mechanism 212 that senses the absence or presence of a hole or holes such as 214 punched therein to enable duplication of any card column or group of punched columns from the card at the reading station into the subsequent card at the punching station. Such duplication in the normal use of the machine is controlled by the regular program drum 216 or an auxiliary duplicating drum 218, both included in the program unit, or from the machine keyboard 206, shown in FIGS. 1 and 3, from which selective punching of the card and functional controls of the machine are available, the program drums serving to bring about certain alternate automatic operations and other operations of the card punch machine incident to record card punching. After the read card has been advanced past the read station, it is automatically ejected and stacked in its original sequence in a card stacker 220 at the upper left of the machine.

The mechanical and electrical elements for effecting and controlling the various functions of the machine including feeding, alignment, registration, punching, releasing, reading, ejecting, and stacking of the cards, together with the manner of programming the machine are described in the aforementioned Gardinor patents to which reference should be made for a more complete understanding of the construction and operation of this machine.

The card path through the machine is illustrated in the diagrammatic view of FIG. 13 herein. On the first card feed cycle, a card is fed from the hopper at 200 and advanced to a position A and then shifted to a position B, referred to as the pre-registration position. In moving to the position A, the card enters between a spring-urged lever 222 and a contact button 223, that operate a card lever switch CLS (FIG. 19B) which is included with the card feed control circuit of the card punch machine. During the second card feed cycle, the first card is shifted to the left and aligned at position C and is then advanced to the full line position D in preparation for punching with its first card column located one step or column to the right of the punching line, and a second card is advanced from the hopper to position A and then shifted under the first card to position B where it remains until the third card feed cycle.

The first card is then advanced under control of the keyboard or program unit from the D position, column by column, past the punching line, until column 80 has traversed thereby when a third card feed cycle is initiated to advance the first card to a position E, where its first column is positioned at the reading line. During this third cycle, the second card is advanced from position B to position D and a third card is released from the hopper and advanced from position A to position B. From here on, the first and second cards are moved concurrently, so that one card passes the reading line as the other advances past the punching line until the second card has completely traversed the punching line. Thereupon, a fourth card feed cycle is initiated, during which the first card is advanced to position F from where it is shifted at right angles and delivered into the stacker 220.

Figure 14:
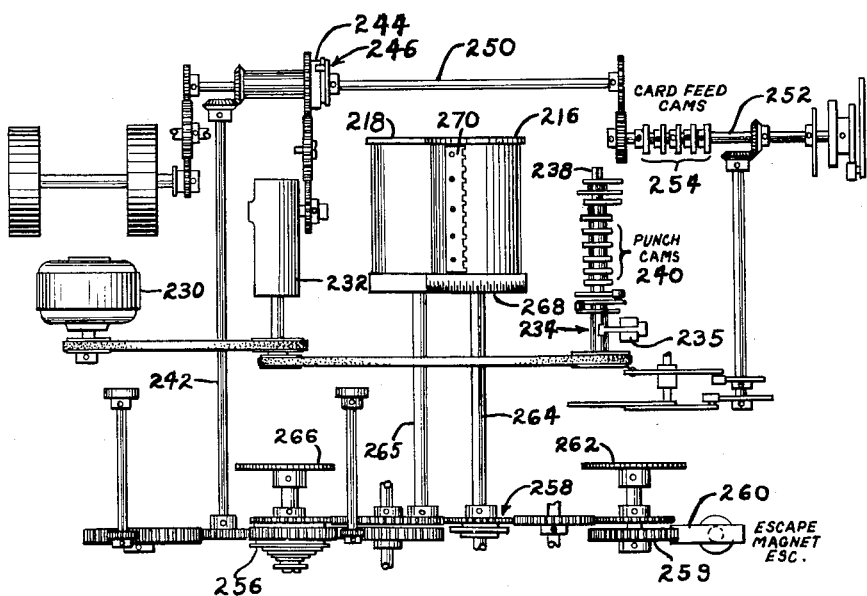
FIG. 14 is a general mechanical drive schematic of the card punch machine.
Figure 18:
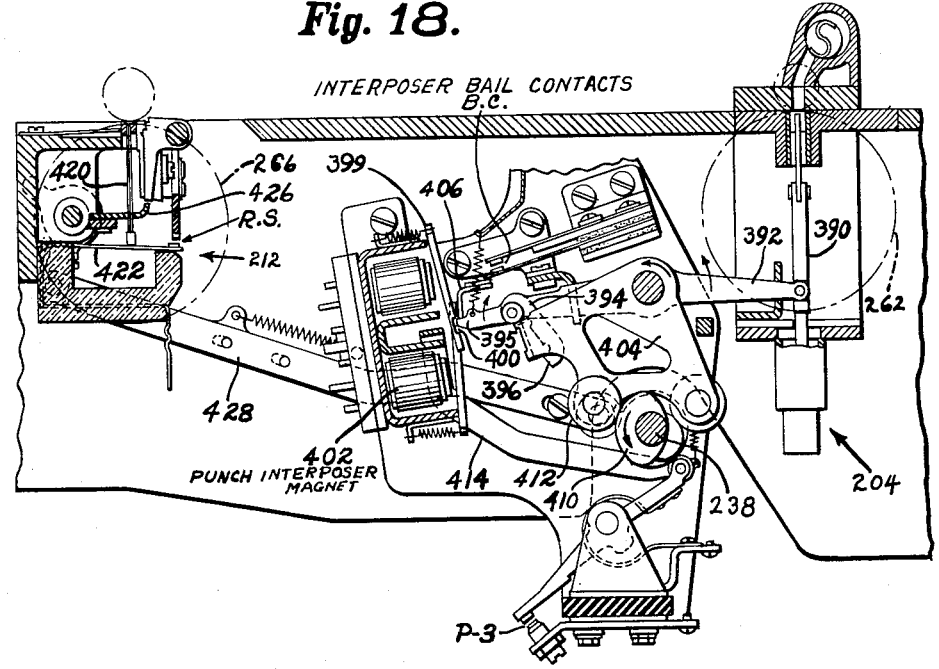
FIG. 18 is a longitudinal sectional elevation view through the card bed of the card punch machine showing some of the mechanical and electrical components of the card punching mechanism and card reading mechanism of the card punch machine.

FIG. 14 is a generalized drive schematic showing the relationship of various mechanical components of the machine and includes, in the main, a continuously running drive motor 230, which drives a reduction gear unit 232 and a part of an electro-magnetically operated, one-revolution punch clutch 234 described in the Gardinor patents. Energization of the punch clutch operating magnet, shown at 235 causes the drive to be applied to a punch cam shaft 238 on which is mounted a plurality of spaced timing cams 240, referred to as the punch cams. Associated with each of the cams is a separate set of switch contacts designated P–1 to P–5 in the IBM circuit schematic of FIGS. 19A–D, one set P–3 of which is illustrated in FIG. 18 herein.

The reduction gear unit 232 is geared to a transverse drive shaft 242 and to a card feed clutch ratchet 244, which is cooperatively associated with an electro-magnetically operated one-revolution card feed clutch 246 shown together with its actuating magnet in FIG. 6 of the Gardinor patents. Energization of the card feed clutch magnet through depression of a card feed key or the register key of the keyboard of the card punch machine or through a set of cam actuated switch contacts PC–2 provided on the regular program drum 216 of FIG. 15 herein engages the card feed clutch 246 with a card feed shaft 250 which is geared to a card feed cam shaft 252 having a number of electrical switch actuating card feed cams 254 mounted thereon. The transverse drive shaft 242 also applies power through a frictional drive disc clutch 256 to an escapement gear train 258, which is under the control of an escape magnet, labelled "Esc.," to operate in synchronism a punch feed roll 262, the shafts 264 and 265 of the regular program drum 216 and auxiliary storage drum 218, and a read feed roll 266 when the escape magnet is energized.

Figure 15:
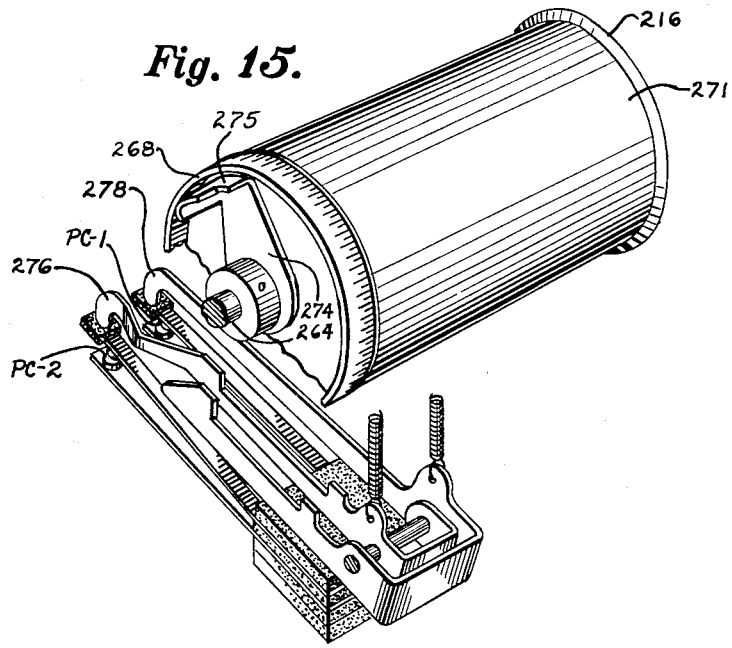
FIG. 15 is a perspective view of the regular program drum employed in the card punch machine.

With reference to FIGS. 14 and 15, a program column indicator disc 268 is fixedly mounted on the shaft 264 of the regular program drum 216, which is releasably mounted on the shaft and disc. Extending axially of this drum is a manually releasable clamping plate 270 for holding a standard size 80 column record card 271 wrapped around the surface of the drum. Mounted on the shaft 264 on the under side of the column indicator disc is a cam arm 274 having a notched program cam extension 275 thereon which cooperates with a pair of spring-biased contact levers 276 and 278, each of which is arranged to actuate a pair of electrical switch contacts designated PC–1 and PC–2. The configuration of the camming surface extension of the arm 274 is such that switch contacts PC–1 will close when the program drum has advanced past the 80th column sensing position and will restore at column 88, while switch contacts PC–2 close at columns 81½ and restore at column 88 of the column indicator disc.

The auxiliary program drum 218, mounted to left and behind the regular program drum is similar to the regular program drum and is normally used as an auxiliary storage drum to control circuits which operate the punches in accordance with data perforated in an auxiliary or duplicating card 272 (FIG. 23) wrapped on this drum.

Figure 16:
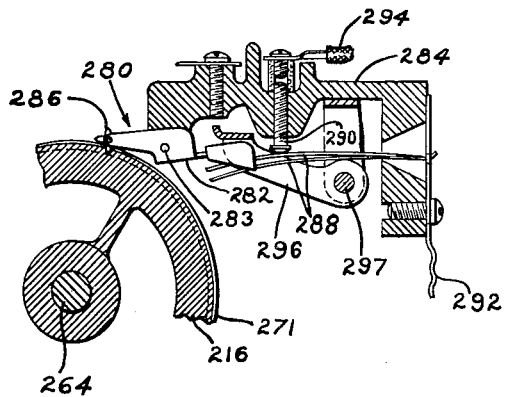
FIG. 16 is a sectional view illustrating a star wheel switch actuating mechanism of the program drum assembly.

Extending transaxially across the top of each of the drums is a row of twelve star wheel sensing devices, one of which is illustrated generally at 280 in FIG. 16 herein. One of these sensing devices is provided for each one of the 12 rows of punching positions of the program card 271 and of the auxiliary dup card 272 and includes a lever 282 pivoted at 283 to a stationary block 284. Each lever has pivoted thereto a five-point star wheel 286 that is urged against the card on the drum by wire contact pressure springs 288 which bias the lever downwardly. When the wheel 286 drops into a perforation in the card, it causes the wire spring 288 to engage a terminal post 290 mounted on the block to close an electrical control circuit from terminal 292 and through wire contact 288 and post 290 to conductor 294. A bail 296, extending over the ends of each of the star wheel levers is mounted on a shaft 297 which is journaled in the block 284 and may be oscillated or turned through a program handle knob 298 accessable from the front of the machine, as shown in FIG. 1, to raise or lower the switch levers with respect to the regular program drum. The switch levers of the auxiliary dup drum are raised or lowered into engagement with the aux drum through a separate actuating lever accessible from the rear of the machine.

The key punch can be equipped with either a numeric or alphanumerical keyboard, the latter form of keyboard being shown in FIG. 3 herein and including a plurality of alphabetical and symbol keys 304 similar to those of a standard typewriter, a plurality of combination alphabetical and numerical keys 306, several numerical keys 308, a plurality of functional control keys, some of which are used in conjunction with the program card on the program drum to set up automatic operations of the key punch machine. Among the control keys are a card Feed key 310, a card Release key 312, a card Register key 314, a Numeric key 316, an Alpha key 318, a Multi-Punch key 320, a Dash Skip key 322, a Skip key 324, Dup key 326, an Aux Dup key 328, an Alternate Program key 330, and space bar 331. Located above the keys of the keyboard, are several control switches including an Auto-Feed Switch 332, Auto Skip and Auto Dup Switch 334, and a Print Switch 336, the functions of which together with those of the aforementioned keys are described in the Gardinor patents.

Depression of various ones of the keys of the keyboard of the key punch machine actuates one or more switches having contacts referred to as latch contacts, bail contacts, and key stem contacts. Depression of an alphabetic character key will close two bail contacts providing circuits to energize two punch interposer magnets to cause two holes to be punched in the detail card. Depression of a combination numeric and alphabetic key will close two bail contacts and a latch contact. If the machine is in a numeric shift condition as when a program card is being used to control automatic functions of the machine, the latch contact circuit will be active to cause the punching of one hole. If the machine is in alphabetic shift instruction, which is the normal condition of the key punch unless a program card is being used, the bail contact circuits will be active and two holes will be punched.

Figure 17:
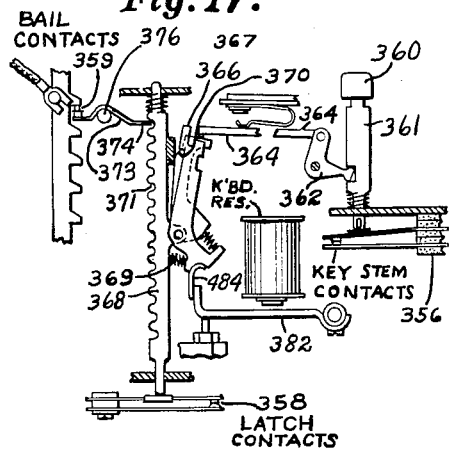
FIG. 17 is a diagrammatic composite view illustrating some of the mechanical and electrical components associated with a key of the keyboard of the card punch machine.

The key stem contacts, shown at 356 in the composite keyboard structure of FIG. 17 herein, are actuated by the direct depression of certain ones of the keys, such as the duplication and multi-punch keys. The latch contacts 358 and bail contacts 359 associated with some of the keys are closed by a mechanism which is tripped by vertical depression of a key as 360, the key stem 361 of which rocks bell crank 362 to actuate a latch pull rod 364. Actuating the pull rod releases latch 366 from latch bail or bar 367 which allows compression spring 369 to lower permutation bar 368. When the permutation bar is lowered, it may actuate a latch contact 358 and/or bail contacts 359, depending on the key depressed. The cut outs 371 on one edge of the permutation bar rock one or more vertically spaced plates or contact bails as 374, each pivoting on a separate shaft as 376 to actuate one or more bail contacts 359 in addition to a latch contact as required. Relatching of the pull rod 364 on the permutation bar latch assembly is prevented until the permutation bar is restored by energizing the keyboard restoring magnets labelled K'BD RES., two of which are provided for the left and right side of the keyboard of the key punch machine. When the restoring magnets are energized, they raise restoring bail 382 which raises the permutation bars through their latches 366. When the step 370 on the latch is raised above the latch bar 367, it relatches, holding the permutation bar in the restored position.

The punching mechanism 204 includes a row of 12 punches, 390, one for each of the 12 vertically spaced rows of the detail card. As indicated in FIG. 18, each punch receives one end of a pivotally mounted punch operating lever arm 392, the other end of which has a punch operating interposer in the form of a bell crank lever 394 pivotally mounted thereon. One end of the bell crank forms a latch arm 395 which normally engages the hooked end 400 of an armature 399 controlled by a punch interposer magnet 402, one of which is provided for each of the 12 punches. Energization of the magnet unlatches the punch operating interposer 394 to swing its hooked arm 396 downwardly beneath a punch operating bail 404 and to move its latch arm 395 upwardly to raise an interposer bail 406 and close a set of interposer bail contacts, labelled B.C. These contacts are actuated by the interposer bail 406 whenever any of the 12 punch interposer magnets 402 or a space interposer magnet shown in the IBM circuit schematic is energized and function to bring about an escapement through energization of the escape magnet Esc. which causes the energization of the punch clutch magnet 235.

The escape magnet, designed Esc., may be energized by depression of a key on the key punch keyboard which energizes an interposer magnet such as 402 and trips the interposer bail 406 to close bail contacts B.C. through which power is supplied to energize the escape magnet. The escape magnet then unlatches its armature 260 from an escapement wheel 259 at the end of the escapement gear train 258 to advance the escapement wheel and the elements driven through the escapement gear train. At the end of the escapement armature travel, the energizing circuit of the escape magnet is interrupted to permit the escapement wheel to be advanced one step corresponding to one card column, and an energizing circuit is completed to the punch clutch magnet 235. Energization of the punch clutch magnet 235 engages the punch clutch 234 with the drive motor 230 to bring about a cycle of revolution of operation of the punch cam shaft 238 of FIG. 14 herein.

The punch cam shaft mounts a pair of spaced cams, one of which is shown at 410 engaged by a roller 412 to cause oscillation of the punch operating interposer bail 404 of FIG. 18. When the bail 404 is engaged by the hooked ends 396 of the selected punch operating interposer bell cranks 394, it will rock the associated punch operating lever or levers 392 counterclockwise to elevate the related punches 390 which strike the record card at approximately 93° of this punch cycle. At 36° of the punching cycle, the punch interposer magnets 402 are caused to be restored mechanically by an auxiliary or restoring bail 414 actuated from the punch shaft, as illustrated, in order to permit the magnets to be re-energized by the sensing pin contacts of the card reading mechanism when the sensing pin contacts make at 76° of the punching cycle, as described in the aforementioned Gardinor patents. Since the punch operating bail 404 has already started to operate by the time the sensing pin contacts make, information read on one cycle will not be punched until the following cycle.

The card reading mechanism, illustrated generally at 212 in FIG. 18 herein, is operated concurrently with the punching mechanism from the common drive shaft 238, and includes a row of 12 sets of dual sensing pins, one set of which is illustrated at 520 in FIG. 13 herein. The sensing pins rest upon the bifurcated spring arms 423, 424, of a spring contact blade 422, and are retracted by a guide bail 426 driven from a cam on the punch shaft 238 through link 428, shown in FIG. 18. Bail 426 is rocked counterclockwise to permit the pins to be raised through their spring contacts at approximately 76°±5° of the punch cycle in order to sense the presence or absence of a punching in the card at the reading station and restores the pins to their normal position at 176°±5° of the punch cycle, as explained in the Gardinor patents. The presence of a hole or holes in the read card permits the read pin or pins to be raised fully and to close a set of switch contacts labelled Pin Contacts 1 through 12 in the schematic circuit wiring diagram of FIG. 19B herein. One set of such switch contacts being provided for each set of sensing pins which are retracted and restored to their normal open condition by bail 426 at approximately 176°±5° of the punching cycle.

Figure 19B:
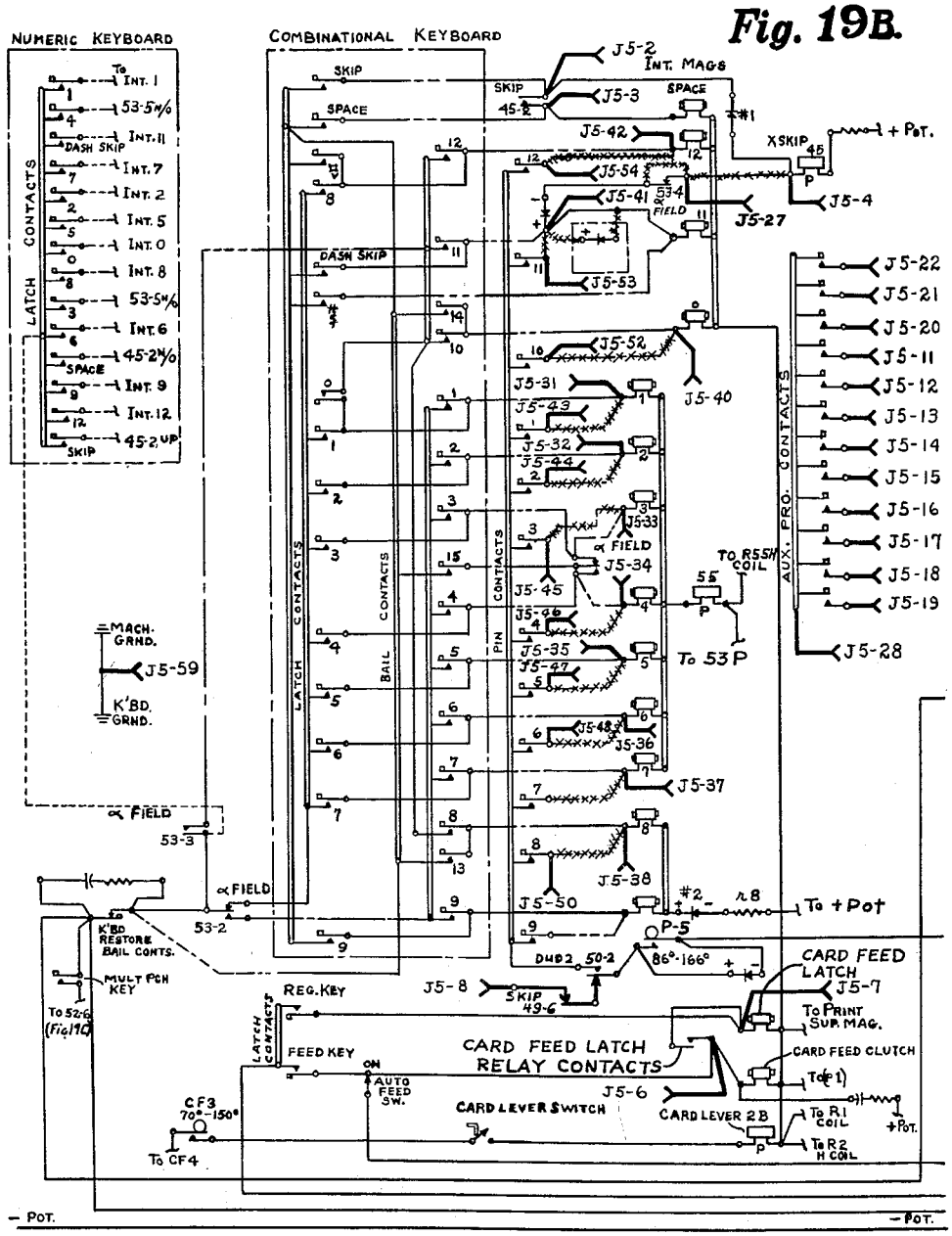

The electrical schematic circuit diagram for a currently available IBM Type 026 key punch machine suited for use with the accounting machine installation described herein is illustrated in FIGS. 19A, B, C and D herein in which FIG. 19A illustrates the power supply chassis and FIG. 19B, the latch and bail contacts of the numeric and combinational keyboards and the sensing read pin contacts and interposer magnets thereof. FIG. 19C illustrates most of the machine relays and control circuits therefor together with the star wheel contacts labelled, Program Contacts, associated with the upper half or first six rows, 12, 11, 0, 1, 2, and 3, of the regular program drum. FIG. 19D illustrates the Alternate Program control circuit together with the alternate program control relay designated R39 herein which is energized through the Alternate Program key to transfer control of the circuits controlled by the upper set of star wheels to the lower set of six star wheels (not shown) through the contacts of the alternate program relay in the manner shown in FIGS. 47b and 47c of Gardinor patent No. 2,753,789 in which the shift to alternate program condition is effected by energization of the relay R33 therein to transfer its twelve sets of form C contacts generally designated a therein.

In order to adapt the card punch machine for use in the accounting apparatus of the present invention, several slight circuit changes have been made in the key punch wiring diagram including the disconnection of certain circuit conductors indicated by the crossed out conductors thereon and the addition of circuit connections indicated by the heavy solid lines therein from a female jig connector J5 of a multiple conductor cable connector to certain circuits or connection terminal points of the key punch diagram. The star wheel switch contacts associated with the auxiliary duplication device are shown as the Aux. Pro. Contacts in FIG. 19B herein together with the tie-in connections thereto from the card punch control unit for connection to the matrix relays and other control relays in the latter unit. For purposes of the present invention, the aux dup control relay provided in the key punch machine for establishing the auxiliary duplication control from the star wheel contacts of the aux dup drum is removed or disabled to permit access to the star wheel actuated switch contacts thereof, which are used instead to control the energization of the matrix relays in determining the order of selection of accounting machine actuator racks to be read and the number of racks to be read in a predetermined punching sequence, as later explained herein.

*Card Punch Control Unit*

The card punch control unit 14 is housed in a cabinet 450 below the accounting machine and, as illustrated in FIG. 20 herein, includes a plurality of telephone type relays labelled K101 through K116 located on the left side of the control unit, a plurality of pulse-pulse type relays labelled K121 through K125 located on the right side of the control unit, a control plug board 454, and a plurality of terminal boards labelled TB101–104 on which are mounted various resistor and circuit isolation diode components of the control unit and from which circuit connections are available to various parts of the system.

The telephone relays are commercially available relay devices each containing four separate sets of contact points, the contact point configuration of each of which is shown on the control unit wiring diagram of FIGS. 22A through H herein.

The relays K101–104 and K110 are referred to herein as the matrix relays and are selectively energized over control circuits completed through the contacts of the star wheel actuated switches associated with the first six rows or zones of the auxiliary duplicating drum 218 of the key punch machine, the auxiliary duplication relay of which is electrically disconnected to permit the circuits controlled by the star wheel switch contacts of this drum to be connected to the coils of the matrix relays. The lower six rows of star wheels of the aux dup drum are used in conjunction with the auxiliary alternate program control feature, which is an optionally available feature of the system used for changing the punching format of the detail card under the control of a different punching program available from the lower half of the auxiliary dup program card in a manner similar to the alternate program control previously mentioned herein. By punching holes in the 0, 1, 2 or 3 zone positions of a card and clamping it to the auxiliary dup drum, it is thus possible to energize any one or any combination of the matrix relays and to complete through the contact points thereof any one of 15 different output circuits. The matrix output circuits are connected to the code exit section of the program board which may be wired to read any desired decimal switch of the accounting machine.

The relay K110 is energized through the star wheel switch contacts actuated by a hole punched in the zero, "0," position of the aux dup card to route an electrical pulse to or activate code exit 1 of the program board. A zone "1" punch will energize relay K101 to activate code exit 2, a "2" punch will energize relay K102 for code exit 4, and a "3" hole punch will energize relays K103 and K104 to activate code exit 8. The combination of a "0" punch and a "2" punch will energize relays K110 and K102 to activate code exit 5, since the sum of their single code exits, 1 and 4, is 5, etc.

Relay K105 is the Punch Indication relay, which is energized upon the closing of timing switch S14 at 100 degrees of the accounting machine cycle in carriage positions where punching is indicated by a control pin in electrical lane 26 to activate the punch indication switch S26. The contact points of this relay complete circuits to initiate the first punch cycle in the card punch machine after which subsequent punching is under the control of punch cam switch P–5 in the key punch until terminated by word length. Relay K106 is the Card Indication relay and is energized at the time the card lever relay 2B of of FIG. 19B in the card punch machine is energized, at which time punching from the accounting machine can be accomplished. Relay K107 is the Punch Disable relay, energization of which opens the hold circuit to relay K105 to block a punch operation in a carriage position where punching would normally be indexed. Relay K108 is the Control Unit Dup 1 relay, energization of which completes a circuit to energize the Dup 1 relay R52 in the card punch machine.

Relay K109 is the Dup 2 relay which is energized in conjunction with the control unit K108 Dup 1 relay and holds the control unit matrix relays active during duplication, assuring the matrix relays will be energized so that punching from the decimal read-out unit in the accounting machine can take place immediately following a duplication operation within a single field. Relay K111 is the Position Check relay, which is energized over a circuit completed from the "11" star wheel on the aux dup drum, and is used in conjunction with the circuit established through electrical lane switch S27. If relay K111 is energized in a carriage stop position that does not contain a control pin in electrical lane 27 pin or vice versa, the machine drive trip solenoid L1 will be energized and the accounting machine will be locked thereby. When the accounting machine is locked by this position check circuit, the "Pos." lamp LT-4 and buzzer BZ-2 will be turned on through a contact point of the Position Warning relay K116.

K112 is the control unit Word Length relay and is energized through the "12" star wheel circuit on the aux dup drum. Zone 12 punches, indicating Word Length, are punched in the aux dup program card in each field similar to the field definition punching in the regular program card. When relay K112 is energized, it establishes a circuit from the key punch cam switch P-5 (FIG. 19B) and through the output or code exit contacts of the matrix relays of the control unit to pulse the decimal read-out section of the accounting machine from which punching is continued until relay K112 is released. Relay K113 is the control unit word length interlock relay and is energized through relay K112 to energize the drive trip interlock magnet L1, thereby preventing the accounting machine drive from being tripped during the punching of a field. It also breaks the hold circuit to the Punch Indication relay, K105. Relay K114 is the Control Interlock relay, which prevents the accounting machine drive from being tripped when the key punch is skipping, duplicating or releasing a card. Relay K115 is the Control Transfer relay, energization of which transfers the key punch keyboard controls to the accounting machine keyboard and locks the keys on the key punch preventing their use.

Relay K116 is the Position Warning relay, which, when energized, turns on the "Pos" lock lamp LT-4 and buzzer BZ-2. Relays K120 and K120-A are the Auxiliary Alternate Program relays which, when pulsed from the control board, transfer the control of the punching of the detail card from the upper half of the auxiliary dup program card 272 to the lower half of the latter card for changing the punching format in a manner similar to the alternate program control feature which provides an alternate program of automatic functional operations of the key punch machine from the lower half of the regular program card 271.

The relays K121 through K125 are pulse-pulse type relays, referred to herein as plug board selector relays and may be of the type shown and described in copending U.S. application, Serial No. 626,765. The selectors are used to change the punching format in conjunction with one of the following conditions later described herein: Electrical lanes, Total, Non-total, limit rack, motor bars, blank keyboard, and sign of A, B or C. The control unit may have five extra selectors, K126 through K130 for additional programming flexibility in applications where needed.

The program control or plug board 454 is simply a terminal connection board for interconnecting circuits in the accounting machine, the control unit and the key punch in a manner depending upon the punching format.

As indicated in FIG. 21, the control board includes ten laterally spaced vertically extending columns, each containing twenty-five vertically spaced sets of double terminals or programming hubs and is divided into several sections, each section containing the terminal hubs for a particular set of components, either in the accounting machine, the control unit or the key punch. On the control unit wiring diagram of FIGS. 22A through H, the hubs of the plug board are designated by an alphabetic letter and numerical grid co-ordinate system enclosed in a rectangular box in which the alphabetic letters designate the vertical or columnar locations of the hubs and the numerals designate the horizontal rows.

The Code Exit section located at the extreme left side of the plug board encompasses the first vertical row of fifteen terminals A1 through A15 which are connected from the rear of the program board to the output contacts of the matrix relays from which successive pulses are available to energize the punch interposers of the card punch machine. The pulses are supplied from two sources; the first pulse originating from the actuation of timing switch S17 of the accounting machine to initiate the punching of the card punch machine from which subsequent pulses are emitted through the operation of punch cam switch P-5 to cause subsequent punching of the detail card under the control of the word length or zone 12 punching on the auxiliary program card, as later explained herein. Energization of the punch interposers of the card punch machine may be accomplished by programming the Code Exits on the face of the plug board to either the Data Rack section or to the Card Entry section of the plug board.

The first fourteen terminal hubs B1 through B14 of the second vertical row of the plug board 454 constitute the Data Rack entries which are connected from the rear of the plug board to the input or common terminals Y of the decimal read-out switches of the accounting machine, the similarly numbered data output terminals of these switches being bussed together as shown in FIG. 11 and connected to the punch interposers of the key punch. The data rack terminal hubs are designated 1–13 and Reg. to designate actuator racks 1 through 13 and the register selection rack, respectively, of the accounting machine.

The first thirteen terminal hubs of the third vertical row, C, of the plug board are the Card Entry terminals which are connected directly from the rear of the plug board to the punch interposers of the key punch and, when programmed from the face of the plug board, cause punching in the card directly and not from the read-out switches of the accounting machine. From top to bottom, the card entries are numbered 12, 11, 0, 1 through 9, and SP meaning space, and, when pulsed from a Code Exit, cause the card entry amount to be punched. If the space terminal is programmed, the card will simply advance to the following column without punching.

The first twelve terminal hubs numbered 12 through 1 from top to bottom, of the fourth vertical column D of the plug board are the Character Rack exists, which are connected from the rear of the plug board to the 12 pitch duo-decimal switch associated with character rack, 12 or 13, depending on the style of the accounting machine and constitute the data outputs of the character rack read-out switch. When the character rack is pulsed from a code exit, this pulse is available and emitted from the Character Rack exit terminal of the plug board corresponding to the key depressed in the character column of the keyboard. The purpose of this variation is to permit recoding of the character rack output by programming any character exit terminal directly to and card entry hub to cause alphabetic or multiple punching of a column of the detail card by programming a character rack exit hub through a distributor of the distributor section of the plug board and over two outputs of the distributor to two different entry hubs of the Card Entry section of the plug board.

The first thirteen terminal hubs of the fifth vertical row E of the plug board are the Limit Rack exits which are used to provide an indication of those columns of the keyboard of the accounting machine in which amounts were indexed or to indicate a blank keyboard condition. The exits are connected to the X input or common terminals of the extra decimal or Limit Rack sections of the decimal switch read-out units to make available a ground pulse upon the closing of timing switch S16 from all Limit Rack exits corresponding to each decimal switch in those columns to the left of the first left hand significant figure entered on the keyboard of the accounting machine. For example, if the amount $100.00 has been entered on the accounting machine, a pulse is available from the No. 5 Limit Rack exit and all Limit Rack exits to the left of rack No. 5 and including rack No. 11 in which amounts were not indexed. The No. 4, 3, 2, 1, and BK CK, meaning Blank Keyboard Check, limit rack hubs would not emit a pulse since the continuity of the circuit established from input terminal X to terminal A from decimal switches S211 to S205 of FIG. 11 was broken by the "1" indexed in decimal switch S205. The Limit Rack exits may be programmed on the face of the control board to provide various functional controls of the card punch machine as later described.

The first seven vertically disposed terminal hubs of the remaining 5 columns labelled F, G, H, J, and K comprise the plug board selector or relay hubs which are wired from the rear of the plug board to the aforementioned plug board selector relays K121–K125 of the control unit. The plug board provides seven terminal hubs for each selector relay including a pick terminal hub PU and two sets of three-contact terminals, designated C for common, N for normal and T for transfer, the contacts of these relays being indicated in FIG. 22H. In the normal or reset position of the selector relays, the common and normal contacts are engaged, while in their picked condition, the common and transfer contacts are engaged. The selectors are used to gate a pulse from a given source to one of two possible terminations as will appear more fully later herein and are reset by the No. 1 timing pulse from switch S14 at the beginning of each accounting machine cycle.

Terminals A16, A17, A18, and A19 are exits for motor bars No. 1, No. 3, No. 4, and AO, respectively, and are pulsed from timing switch S16 of the accounting machine. If motor bar No. 2 or any control key of the accounting machine is depressed, the pulse will be emitted from the AO exit, meaning All Others. Depression of motor bar No. 1 activates switch S11 to make this pulse available from the terminal A16, marked 1 on the plug board, while the depression of motor bar No. 3 emits the pulse from terminal A16, marked 3. The motor bar pulses may be programmed, for example, to pick up selectors to alter normal operational results by motor bar control.

Terminal hubs B16, B17, and B18 are the minus indication terminals for the A, B, and C accumulators, respectively. Any or all of these terminals emit a No. 3 pulse from timing switch S16 when subtraction is being performed in the corresponding accumulator. These pulses are normally used to alter normal operational results from minus indication of A, B, or C accumulators.

Terminal hub A19, marked BK or blank keyboard, is similar in function to the aforementioned Blank Keyboard Check, BK CK, terminal hub in that it emits a No. 3 pulse if no amount is indexed in the accounting keyboard. This terminal hub differs, however, from the blank keyboard check terminal hub in that it does not emit a pulse if the accounting machine is performing a total operation. The function of this terminal hub would be similar to that of the blank keyboard check terminal except that it would be used when its function is not desired on a total operation of the accounting machine.

Terminal hubs C16, C17, C18 and C19 marked 28, 29, 30 and 31, respectively, are the lane switch exists or CPC's, meaning Carriage Position Codes. These exits emit a No. 2 pulse from timing switch S15 when a pin is active in the accounting machine control panel in lanes 28 through 30. A pin in lane 28 makes a No. 2 pulse available from terminal hubs C16 or 28. A pin in lane 29 makes a No. 2 timing pulse available from terminal C17 or 29, etc. These pulses are used to alter normal operational functions by carriage position or to limit functions to a given carriage position.

Terminal hubs E18 and E19 are the total and non-total exists, respectively. On any operation other than a total operation, a No. 3 timing pulse from timing switch S16 is emitted from the non-total or E19 exit. On a total operation, a No. 3 pulse is emitted from the total or E18 exit. These pulses may be used to alter normal operational functions from total or non-total operations of the accounting machine. Terminal E16 is the exit from the Alternate Program Control key 27–1 on the accounting machine, marked ALT. This key may be programmed to alternate program or as an optional feature, to the auxiliary alternate program or both.

Terminal hub E17 is the exit from the Skip key 27–3 on the accounting machine and may be programmed to skip or X-skip as desired, as later described.

Terminal F16 is the skip entry hub SK and, when pulsed from any plug board exit emitting a No. 2, No. 3, or No. 4 accounting machine pulse, causes the key punch to skip the field as defined by the field definition punching in the program card.

Terminal G16 is the X-Skip Entry hub, which may be programmed similarly to the Skip Entry hub, and causes the key punch to X-Skip the field indicated by an 11 punch in the first column of the field being skipped.

Terminal H16 is Dup 1 or duplication No. 1 entry hub, which may be pulsed from any plug board exit terminal hub emitting a No. 2 or No. 3 accounting machine timing pulse to the key punch to duplicate a field from the card at the read station.

Terminal J16 is the Dup 2 or duplication No. 2 entry hub which is programmed from a No. 4 accounting machine pulse as is available from a Code Exit hub to initiate a duplication operation of the card punch machine. This terminal is only used when it is desired to duplicate part of a word and to continue punching the remainder of the word length by reading the racks of the accounting machine, as will be explained in the sample accounting application later herein.

In general, the basic operational difference between Dup 1 and Dup 2 control functions is that Dup 2 permits both duplication and reading of the accounting machine racks within one word length,, while Dup 1, when pulsed, disables the reading of the accounting machine racks for the remainder of the field being punched.

Terminal F18 is the release entry hub which is pulsed from any plug board exit emitting a No. 2 or No. 3 accounting machine timing pulse and functions to cause the key punch machine to initiate a card release operation.

Terminal G18, labelled ALT, is the alternate program entry hub which is pulsed from any No. 2 or No. 3 timing pulse or any Code Exit pulse to shift control of the key punch to the alternate program condition. Terminal H18, labelled AAP, is the auxiliary alternate program entry hub which may be pulsed from another exit of the plug board to energize the aforementioned auxiliary alternate program relays K120 and K120A where the customer's installation provides for this feature. When used, these relays are connected in the control unit wiring diagram as indicated in FIG. 22I, the broken lines indicated at 460 to 465 thereon corresponding to the similarly labelled conductors in FIG. 22F, which are cut to permit the contacts of these relays to be connected to the 12 rows of star wheel contacts of the aux program drum as indicated.

Terminal hub J18, labelled PCH DIS, is the punch disable entry which, when pulsed from exits emitting a No. 3 timing pulse, disables punching in any punching cycle.

Figure 22H:
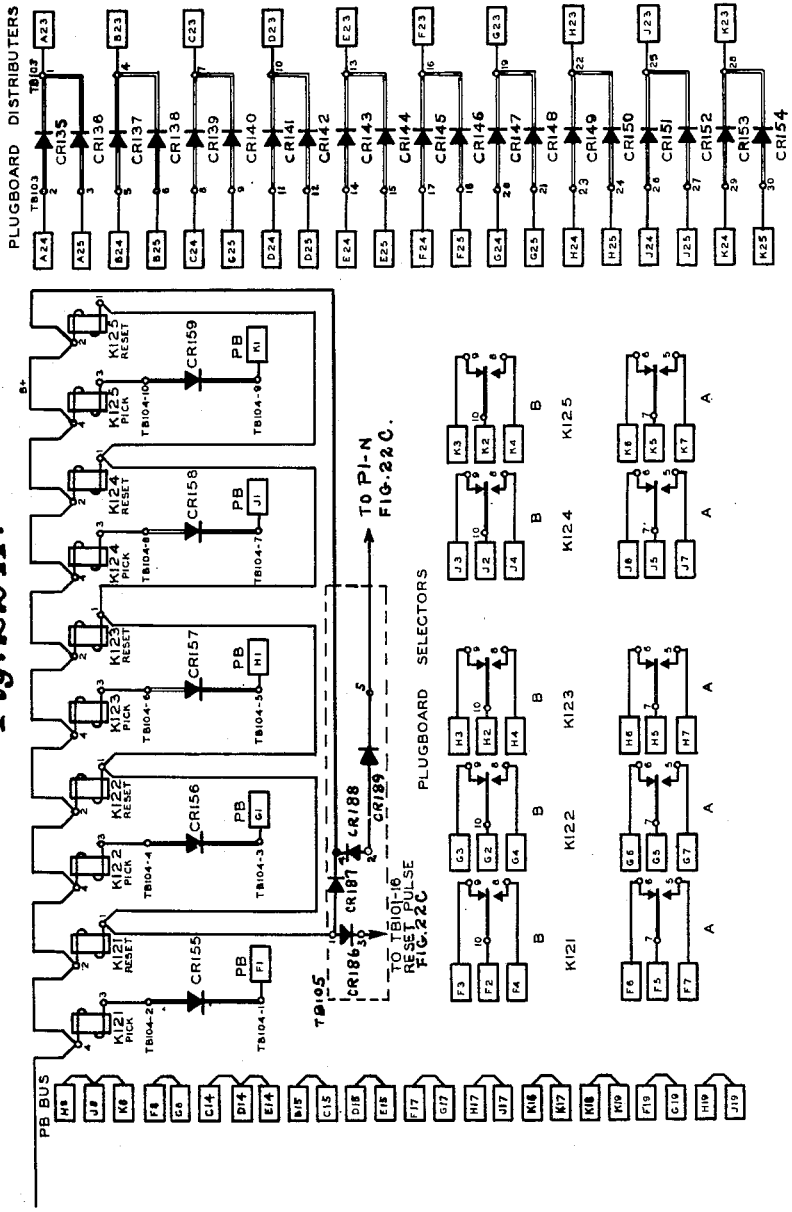

Terminal hubs A23 through K23, A24 through K24, and A25 through K25, comprise the plug board distributor hubs referred to as dual distributors which are wired through diodes CR135 through 154 as indicated in FIG. 22H to provide two exit terminals for each entry terminal. The entry for distributor No. 1 is terminal A23 and the exits are A24 and A25, etc. The distributors are used when a single pulse exit is used to accomplish two functions.

The following table lists the normal programming uses of the various terminals of the plug board from which control pulses are available.

PROGRAMMING USES OF CONTROL BOARD EXIT TERMINALS

| Exit | Uses |
| --- | --- |
| Lane Switch | Pick Selectors 1–10<br>AAP<br>Alt. Pro.<br>Skip, X-Skip<br>Dup 1<br>Release |
| Total<br>Non-Total<br>Sign A, B, C<br>Motor Bars<br>Limit Racks<br>BK CK<br>BK | Pick Selectors 1–10<br>AAP<br>Alt. Pro.<br>Skip, X-Skip<br>Dup 1, 2<br>Release<br>Punch Disable |
| First Code Exit of Each Word Length | Pick Selectors 1–10<br>Alt. Pro.<br>Skip, X-Skip<br>Dup 1, 2<br>Release<br>Data Rack<br>Character Rack<br>Card Entry<br>Space |
| Other Than First Code Exit of Each Word Length | Alt. Pro.<br>Skip, X-Skip<br>Dup 1, 2<br>Data Rack<br>Character Rack<br>Card Entry<br>Space |

The control unit 14 is connected to the accounting machine 10 over the cable 16 which has two jig connectors J2 and J3 and a plug connector P1 on the end coupled to the accounting machine. The cable 18 connecting the control unit with the key punch has a plug and jig connector on each end. The ends conencted at the control unit are designated P and J connector 4 and the ends connected to the key punch are designated P and J connector 5, the terminal designations of which are indicated in the control unit wiring diagram of FIG. 22A–H herein. The male and female terminals on plug and jig connectors P4, J4 and P5, J5 are identified on the control unit wiring diagram by a numeral following the prefix P or J, as for example, P5–11 for connector plug 5 terminal 11, and terminals of the various other cable connectors P1 and J1, P2 and J2, and P3 and J3, being similarly identified by numeral or alphabetical suffix designations.

The control unit power supply is located in the lower rear portion of the accounting machine stand, and is connected to the control chassis through connector P6, J6 as indicated in FIG. 12. The power supply chassis includes a step-down, variable tap input transformer T100, which is shown in FIG. 22A herein and has a 6.3 volt secondary winding from which the signal lamp and buzzer circuits of the accounting machine are energized and an 85 volt secondary winding for a full wave germanium rectifier CR100 from which rectified D.C. is supplied to energize the machine block solenoid L1 of the accounting machine and the various relays of the control unit, as indicated on the control unit wiring diagram.

Operating voltage for the control unit power supply is obtained from the input of the card punch machine power supply shown in FIG. 19A herein over a circuit traced from the 115 v. A.C. power inlet plug thereof and main line switch 194 thereof to jig connector terminals J5–61 and J5–63 are shown in FIG. 22A with terminal P5–61 connected through terminal 61 of J4, P4 and terminal 1 of J6, P6 to one side of the primary winding of transformer T100, and with terminal P5–63 connected through terminal PJ4–63 and PJ1–A through the Punch-on key switch S8 and the carriage control disabling lever switch S10 to the other side of the transformer T100.

*Operation*

Turning now to the circuit descriptions, programming and system operation, the first section of this description will deal with activating or turning on the system, the second section will deal with the control key circuits from the accounting machine, the third section with some of the media employed for a sample Cash Receipts application including the programming of the regular program card and the auxiliary dup program card, and the fourth section will cover punching from the accounting machine for a sample Cash Receipts Application in which the circuits will be covered in the sequence that they are needed during a line of posting on the sample application.

SECTION 1

To activate the system, the key punch main line switch 194, the Punch-on key 27–8 and the carriage control disabling lever 38 on the accounting machine must be in an active position, after which two cards must be fed into the punch bed to activate the card lever relay R2B in the key punch machine and the card indication relay K106 of the control unit. With the switches 194, S8 and S10 closed, the power supply transformer T100 of the control unit is energized as previously described and supplies 85 volts A.C. directly to the input of the full wave rectifiers CR100 thereof and 6.3 volts A.C. to the signal lamp and buzzer circuits through PJ6–5, PJ6–6, and PJ1–D energizing the Punch-on lamp LT–1 over a return circuit through PJ1–C and energizing the LOCK lamp LT–2 and buzzer BZ–1 over a return circuit through PJ1–E and the normally closed contacts K106–D and K114–D as traced in FIG. 22A.

The full wave rectifier CR100 supplies 115 volts D.C. from its output to the control unit circuits through PJ6–7 and PJ6–8 to energize the coil of the Control Transfer Relay K115 of FIG. 22B which transfers its six sets of contacts labelled K115 A–F of FIGS. 22B and 22A in the circuits described below.

(1) K115–A N/O points close to transfer the control circuit for the grid of the DUP control tube 5 of FIG. 19C of the key punch machine to the accounting machine over tie-in points PJ5–10.

(2) K115–B N/C points open to break the circuit normally completed thereby in FIG. 19C through tie-in points PJ5–24 and PJ5–25. The diode CR116 in this circuit allows duplication over blank columns when the key punch is in an alpha shift condition.

(3) K115–C N/O points shown in FIG. 22A close to connect the low potential or ground side of the control unit power supply to the ground side of the 130 volt power supply of the key punch through tie-in points PJ5–65.

(4) K115–D N/C points transfer to open the control circuit normally established from the plate of tube 2 of the key punch diagram to the keyboard restoring magnets thereof through J5–70, P5–70, K115–E N/C points, K115–D N/C points, PJ4–68, J5–68 and P5–68. The K115–D N/O points points close to energize the keyboard restoring magnets from the control unit power supply through tie-in points P5–68 and J5–68.

(5) K115–E N/O points transfer to connect the coil of the Control Interlock relay K114 shown therebelow with the plate of the aforementioned key punch tube No. 2 through P5–70 and J5–70, the operating voltage for which is supplied from a positive potential point of the key punch circuit through J5–23 and P5–23. Therefore, anytime this tube is conducting, relay K114 will be energized.

(6) K115–F N/O contacts close to complete a ground circuit to various ones of the control key switches on the keyboard of the accounting machine.

SECTION 2

*Accounting Machine Control Key Circuits*

FEED KEY 27–6

This key is depressed twice in succession to feed two cards into the punch bed of the key punch machine preparatory to punching and to energize the card indication relay K106 in the control unit.

The first depression of the feed key 27-6 on the accounting machine closes switch S6 shown in FIG. 22E to complete a ground circuit to the key punch machine through tie-in points PJ5-6 which energizes the key punch card feed clutch magnet of FIG. 19B to feed a card from the card hopper into the punch bed and to close the card lever switch upon entry of the first card into the punch bed. The second depression of the feed key 27-6 again energizes the card feed clutch magnet and at 70° of the card feed cycle, C. F. Cam No. 3 energizes the card lever relay R2B of FIG. 19C in the key punch through the closed card lever switch, the card lever relay remaining energized through its now closed contact points 2AL and the cam contacts PC-2 N/C of the regular program drum. The hold points 2AL for the card lever relay completes a ground circuit through the tie-in circuit J5-1 and P5-1 to the control unit and energizes the card indication relay K106 of FIG. 22D, which transfers its various contacts in the circuits mentioned below.

(1) K106-A N/C contact points shown in FIG. 22F open to break the ground circuit to the accounting machine drive trip interlock magnet L1 to de-energize L1 and permit the accounting machine drive to be tripped. Prior to the opening of the K106-A N/C contacts, the magnet L1 was energized over a circuit traced from the 0v. or low potential side of the control unit power supply and through activated lane switch S26 of FIG. 22B, the carriage of the accounting machine being in a punch indication stop position and containing a control lug in electrical lane 26 thereof. The ground circuit continues from the activated lower contact of S26 and through tie-in points PJ1-L and the K106-A N/C contacts to the low potential side of the coil of L1, the other terminal of which is connected to B+.

(2) K106-B N/C contact points shown in FIG. 22E open to break the ground circuit to the switches S6 and S7 controlled by the feed key 27-6 and register key 27-7 of the accounting machine. The N/O contact points of K106-B close to complete a ground circuit from the now closed contacts K115-F of FIG. 22B to the following control key switches of FIG. 22E: S1—Alt. (Pro.) key 27-1; S2—Dup key 27-2; and S3—Skip key 27-3.

(3) K106-C N/O contact points of FIG. 22B close to complete a ground circuit labelled Card Ground to various relays in the control unit and to the common points of the aux drum program contacts of FIG. 19B.

(4) K106-D N/C contact points of FIG. 22A open to turn off the LOCK lamp LT-2 and buzzer BZ-1 which were energized together with the Punch-on lamp LT-1 when the main line switch 194 of the key punch machine and the CCDL 38 and the Punch on key 27-8 of the accounting machine were activated. The N/O contact points of K106-D close to provide a 6.3 volt A.C. circuit to the Position lamp LT-4 and buzzer BZ-2 depending upon the positions of K116-A contacts and lane switch S37.

(5) K106-E N/C contact points of FIG. 22D open the circuit normally established through tie-in points P5-4 and P5-27 between the No. 11 interposer magnet and the X-skip relay in the key punch diagram of FIG. 19B.

(6) K106-F N/O contact points of FIG. 22D close to provide a ground circuit from the hold contact points 45-1 of the X-skip hold relay R45H in FIG. 19C of the key punch diagram through tie-in points P5-30 J5-30 to energize the coil of the Control Interlock relay K114 of FIG. 22B to block the accounting machine drive during an X-skip operation.

REGISTER KEY 27-7

This control key on the accounting machine functions to register a card which has been manually inserted in the punch bed of the key punch. Depression of the Register key closes switch S7 of FIG. 22E to complete a ground circuit through tie-in points P5-7 and J5-7 to energize the card feed latch magnet of the key punch shown in FIG. 19B and index a card register operation therein.

RELEASE KEY 27-5

Depression of this key indexes a card release operation in the key punch from the keyboard of the accounting machine by closing switch S5 of FIG. 22E to complete a ground circuit to the key punch Release relay of FIG. 19C through tie-in points PJ5-5. An automatic release operation may be indexed by plugging a program wire into the control board hub F18 of FIG. 22D and pulsing this hub thereover to energize the key punch release relay.

SKIP KEY 27-3

This key functions to index a skip or X-skip operation in the key punch from the keyboard of the accounting machine by closing switches S3 of FIG. 22E and S4 of FIG. 22B. Closing the skip switch S3 completes a ground circuit to the control board hub E17 which may be program wired to hubs F16 or G16 (FIG. 22D) to index a skip or X-skip key punch operation through tie-in points P5-2 or P5-4, respectively, the circuit connections of the jig connector terminals J5-2 and J5-4 of which are shown in FIG. 19B. Closing the skip interlock switch S4 completes a ground circuit to the control interlock relay K114 through K114C N/O contact points, which are transferred during a skip operation to prevent a second skip operation if the skip key is held depressed.

An automatic skip or X-skip operation can be indexed by plugging a ground circuit into hubs F16 or G16 on the control board 454.

DUP KEY 27-2

This key functions to index a manual duplication operation of the key punch from the accounting machine. Depression of the key closes switch S2 of FIG. 22E to complete a ground circuit to the coil of the control unit Dup No. 1 relay K108, which establishes a hold in circuit for itself through the transfer of K108-A N/O contact points. Relay K108 also transfers its K108-B N/O contacts shown in FIG. 22B to ground the grid of the Dup 1 control tube 5 in the key punch through the transferred contacts of K115-A N/O and tie-in point P5-10, thus energizing the key punch duplication relay R52 of FIG. 19C.

ALTERNATE PROGRAM KEY 27-1

The purpose of this key is to shift the key punch machine to alternate program, manually or automatically from the accounting machine. Depression of this control key on the keyboard of the accounting machine closes switch S1 of FIG. 22E to complete a ground circuit to the control board hub E16 which may be program wired to the alternate program hub G18 where the accounting application requires this feature. Thus, when hub G18 is grounded, it will energize the key punch alternate program relay R39 through tie-in point P5-57 connected to the key punch wiring diagram 19D to transfer the automatic functional controls of the key punch from the upper half of the regular program card 271 to the lower half thereof.

Tie-in points P5-55 and P5-56 of FIG. 22 are connected to a set of unused points 39-12 N/O on the key punch alternate program relay R39 as indicated in FIG. 19D herein. Therefore, anytime the alternate program relay in the key punch is energized, the 6.3 volt A.C. circuit through these tie-in points will turn on the alternate program lamp LT-3 on the accounting machine.

SECTION 3

*Media and Programming*

FIG. 23 illustrates various media used in a punched card cash receipts accounting application performed with the apparatus described herein and in which information contained on a check and remittance voucher 500 is entered into the accounting machine 10 and read out therefrom to be punched into a detail card 502 in the key punch controlled from the accounting machine and a regular program card 271 and an auxiliary program card 272 contained in the key punch.

Pursuant to their monthly billing or invoicing practice, check and remittance vouchers of this character are received by the vending company from its customers and are processed in the cash receivables account of the vendor by punching into individual cards as 502. The vouchers are received in batches which are sorted into groups according to the type of purchase or payment and a cash report number contained on a slip 506 attached to each group of vouchers bearing the same Type number, "78," and Cash Report No., "123," which information is to be punched in each card together with the date, "1/3/58" on which the cards are processed. In addition to the foregoing information, the Customer No., Invoice No., Gross Amount, Discount, and Net Amount items contained on the voucher are to be punched in the detail card after posting these quantities in the accounting machine at successive carriage stop positions arranged in the same manner as the fields on the card. The auxiliary program tray 142 attached to the control panel of the accounting machine includes a control lug in electrical lane 26 in every carriage position thereof where information is to be punched into the detail card from the accounting machine.

With reference to the customer card format, the first field thereon spanning columns 1 through 10 thereof includes the aforementioned Type number, Cash Report No., and Date information.

Card columns 11 through 15 are allocated to the Customer No., "12345" noted on the voucher. Following a skip of four columns from column 16 through 19, columns 20 through 27 are assigned to the Net Amount field in which the total cash received, "$98.00" picked up from the Net Amount column of the voucher is punched. The invoice Number, "A12 1234", which may include an alphabetic character, is assigned to card columns 28 through 34.

Column 35 is skipped and the Gross Amount "$100.00," picked up from the voucher, is punched into the Gross Amount field extending from card columns 36 through 43. Column 44 is skipped and the amount of the Discounts, $2.00," is next punched in the Discount field extending from columns 45 through 50, after which the card is skipped out of the punching stations from column 51 thereof.

The program card 271 controls the duration of the punching over the various fields of the detail card and certain other automatic functional operations of the key punch such as automatic skipping and duplication and alphabetic shift, which are established by punching in rows or zones 12, 11, 0 and 1 thereof.

The zone 12 punching, designated Field Definition, controls the length or duration of a field of punching of the detail card and is characterized by a "12" punch in each column included in the punch field except the first column. Thus, in the aforementioned Type, Cash Report No. and Date field of the detail card, card columns 2 through 10 of the program card will contain a "12" punch and card column 1 will be blank. In the Customer No. field, columns 12 through 15 will contain zone 12 punches and column 11 is blank. The blank column thus signals the beginning of a new field and terminates the columnar escapement and punching operations of the key punch machine when the program card has escaped into such a column.

The zone 11 punching of the regular program card, designated Auto-Skip, controls automatic skipping operations of the key punch which is signalled by an "11" or X punch in the first column of the field on the program card which is to be skipped. As indicated by the aforementioned skipped columns 16 through 19 of the detail card, an "11" punch is provided in column 16 of the program card to signal an auto-skip key punch operation which is continued under the control of the zone 12 field definition punches in columns 17, 18 and 19 of the program card until the program card escapes into card column 20, which does not contain a "12" punch therein and terminates the skipping operation of the machine. Zone 11 punches are also provided in columns 35, 44, and 51 of the program card 271, the zone 11 punch in column 51 beginning a skipping operation of the punch card out of the punching station under the control of the field definition punching in colunms 52 through 80 of the program card.

The zone 0 punching, designated Auto Dup, controls automatic duplication operations of the key punch to duplicate information contained in a column or field of the previously punched card, now located at the reading station, into the card at the punching station. The 0 punch is contained in the column that does not contain a field definition punch and, for the cash receipts application used herein, is provided in card column 1 of the regular program card 271 to initiate duplication of the information contained in card columns 1 through 10 under the continued control of the field definition punching through card column 10.

Since the information to be duplicated is always read from the previous card, it is first necessary to punch the information to be duplicated manually into the first card before automatic duplication can take place. In order to punch this field in the first card, the auto-skip auto-dup switch 334 on the key punch must be turned off and, after the information is inserted in this field of the first card, it is turned on.

The zone 1 punching of the program card 271, designated Alpha-Shift, functions to shift the key punch to an alphabetic condition, because the key punch normally is in numeric shift condition with a program card on the program drum. Thus, when a particular column of a field will always contain alphabetic information, a "1" punch is provided in each column of the program card, as in program column 28 herein, where the alphabetic shift is desired, the machine returning back to numeric in those columns not having a "1" punch.

On the key punch machines equipped with the alternate program feature, four additional program positions are available to control the same automatic functions. On the lower portion of the normal program card, the zone 4 punching controls field definition, a "5" punch controls automatic skipping, a "6" punch controls automatic duplication and a "7" punch controls alphabetic shift. Alternate program control is activated by depression of the alternate program key, thus enabling the operator to select two different programs to control the automatic functions for two different card formats as previously mentioned. Once the alternate program is indexed, it remains indexed until the card being punched is released.

The auxiliary program card 272 as used herein controls the selection of information to be punched in the detail card from the desired columns of the keyboard of the accounting machine and includes six punching control zones.

The 12 zone punching controls the starting and finishing of the punching of the columns of a field of the detail card similar to the 12 zone field definition punching of the regular program card and indicates to the control unit the length of the field to be punched from a single cycle of operation of the accounting machine. The 12 zone punching of the aux dup card appears only in those fields in which information is to be read out of the accounting machine and which are to be punched by accounting machine operations. The 12 zone punching is omitted for fields not punched by accounting machine operations, these fields normally being skipped automatically.

The eleven code of the auxiliary program card operates in conjunction with electrical lane 27 of the accounting machine to create a position or coincidence check. This feature insures that for a given accounting machine operation, the first column of a field of a card being punched coincides with a carriage stop position containing a position check pin in lane 27. Normally, only one or two such checks are programmed for a given card, each check being accomplished by punching a hole in the 11 code of the auxiliary program card in the first column of the field to be punched from the accounting machine operation and providing a position check pin in lane 27 of the control panel in the corresponding carriage position, usually the starting or first carriage stop position of the accounting machine.

By using this double switching arrangement, it is possible to produce a warning whenever either one of these indications is present without the other. With reference to FIGS. 19B, 22F, 22B and 22A, when the No. 11 star wheel contacts of the aux program drum are closed, the coincidence check relay K111 of the control unit is energized and transfers its K111-A points. If the carriage of the accounting machine does not contain a control pin in lane 27 in this carriage stop position, lane switch S27 will remain in the position shown in FIG. 22B to supply ground potential through S27, tie-in point PJ1-BB, and the lower contacts of K111-A in FIG. 22F to energize the coincidence warning relay K116 and the machine block solenoid L1, whereupon the K116-A contact points in FIG. 22A transfer to activate the position lamp LT-4 and buzzer BZ-2. The machine block solenoid L1 locks the accounting machine until the carriage and the card are again synchronized, either by repositioning the accounting machine carriage with the directional control keys 36, 37 or by advancing the card in the key punch bed until coincidence is attained.

The punchings in rows 0, 1, 2, and 3, designated code 1, 2, 4, and 8, respectively, of the auxiliary drum card, energize the matrix relays K110, K101, K102, K103 and K104, respectively, of the control unit through the star wheel switches of this drum. By energizing one or a combination of these relays, code exits 1 through 15 can be individually activated. These exits are wired to the program control board hubs A1 through A15 which may be program wired to the data rack entry hubs B1 through B14 thereof connected to the commons of individual ones of the decimal read-out switches of the accounting machine to read the information indexed into the respective columns thereof.

Card ground is applied to the common of the auxiliary drum star wheel contacts shown in FIG. 19B through tie-in point P5–28 and will ground the matrix relays K110, K101, K102, K103 and K104 of the control unit upon closing of the star wheel contacts of rows 0, 1, 2, and 3 through tie-in points P5–20, P5–11, P5–12, and P5–13, respectively.

SECTION 4

*Punching From the Accounting Machine Using the Cash Receipts Application*

Card columns 1 through 10 containing the Type, Date, and Cash Report No. information is considered as one field and is punched from carriage stop position No. 1. This field will be duplicated into all cards after the first card has been punched with the auto-skip auto-dup switch 334 on the key punch keyboard turned off. The two digits "78" of the Type No. are indexed in the accounting machine keyboard amount section columns 31–2 and 31–1 and are to be punched in card columns 1 and 2, respectively. The Date "1038" for 1/3/58, and Cash Report No. "123," are indexed in keyboard amount columns 31–10 through 3 and are to be punched into card columns 3 through 10, respectively. On the auxiliary drum program card, zone 12 word length punches are punched in columns 2 through 10 of this field except the first column to signal the control unit the length of this field.

CARRIAGE STOP POSITION 1—CARD COLUMN 1

With the sample figures indexed on the accounting machine keyboard, key 29–2 for Motor Bar No. 2 thereof is actuated to cycle the machine and tabulate the carriage to stop position 2, during which cycle the control unit will cause punching of the keyboard indexed information into the first 10 columns of the card through the following control circuitry.

The control unit B+ circuit, starts on FIG. 22A at PJ6–7 and from this point runs uninterrupted throughout the upper portion of FIGS. 22B through 22H of the control unit wiring diagram. The control unit low potential or ground circuit, starts at PJ6–8 and is connected to the K115–C10 contact, K115–1 coil terminal, K114–C8 contact point, K106–C10 contact point, K105–B7 contact point, and through tie-in PJ1–J to punch indication switch S26–2 contact. The pin in lane 26 in the accounting machine panel in carriage stop position 1 closes switch S26 to complete a ground circuit therethrough to timing switch S14–2 contact. Timing switch S14 closes between 100°–125° of the accounting machine cycle, completing a ground circuit extending through PJ1–K to TB101–16 from which ground potential is available over two circuits. One of these circuits extends to TB105–3 and through CR186 and to the low potential side of the reset coils of the plug board selector relays K121 through K125 of FIG. 22H. The other circuit from TB101–16 extends through CR111 to the low potential side of the punch indication K105 relay coil, the other terminal of which is connected through K114–E N/C contact points of FIG. 22F to the control unit B+ conductor.

The energizing of relay K105 transfers its set A contact points shown in FIG. 22C to complete a hold circuit through K113–A N/C contact points and K107–A N/C contact points from the card ground potential circuit established through the transferred contacts of K106–C. Also K105–B N/O contact points of FIG. 22B will be transferred to complete a ground circuit through K114–A N/C contacts and PJ1–M tie-in points to timing switches S15 and S16 of FIG. 22C and S17 of FIG. 22E.

Timing switch S15 closes between 150°–160° of the accounting machine, completing a ground circuit to test electrical lane switches S28 through S31 of FIG. 22C, none of which, however, is active in carriage stop position 1.

Timing switch S16 closes between 200°–225° of the accounting machine cycle, completing a ground circuit to test the motor bar switches S11, 12 and 13 of FIG. 22D, all of which are in their normal position shown, so that ground potential is available at control board hub A19 through connector PJ1–Y. Also, S16 tests the minus indication switches S20, S21, S22 and total limit switch S40 of FIG. 22C. Switches S20, S21 and S22 test the sign of the A, B, and C accumulators and are transferred from their positions shown, because the symbol slides of the accounting machine are in a non-add position. The total limit switch S40 is in its normal position shown, making ground potential available at the control board hub E19 through PJ–1Y. Switch S16 also completes a ground circuit through tie-in points PJ–1F and PJ–3Z into the decimal switch limit rack section indicated in FIG. 22D.

As shown in the decimal switch wiring diagram of FIG. 11, terminal P–3Z is wired to the X or lower common input terminal of S211, and since S211 is set to 0, a circuit is completed from terminal X to terminal A thereof and then through the jumper connection from the latter terminal of S211 to the input terminal X of S210, which also has a 0 indexed therein completing a circuit to terminal A thereof and then through the jumper to terminal X of S209. Switch S209 has a 1 indexed therein, breaking the ground circuit between its terminals X and A. The X or lower common input terminals of S209, S210 and S211 make ground circuits available through P2–A, P3–DD and P3–CC, respectively. These circuits are terminated on FIG. 22D of the control unit wiring diagram at control board hubs E4, E3 and E2, which are limit rack hubs 9, 10 and 11, respectively, none of which are wired on the program control board 454 of FIG. 21 herein. It can be seen, therefore, that when the limit rack section of the decimal read switch is tested by timing switch S16, ground circuits will always be made available from each of the limit rack hubs starting from the highest order position down to, and including, the first column containing a significant digit.

Timing switch S17 of FIG. 22E next closes between 250°–260° of the accounting machine cycle and completes a ground circuit through PJ1–M and K112–A N/C contacts to the matrix relay points K110–A N/C, K101–A N/O, K102–B N/C, K103–C N/C shown in FIG. 22F to control board code exit bulb A2. The matrix relay K101 was energized to complete this code exit 2 circuit by the code 2 hole punched in column 1 of the auxiliary drum program card indicated in FIG. 23.

The control board hub A2 is wired to hub B2 as illustrated in FIG. 21. Therefore, the ground circuit established from S17 and traced to the control board hub A2 extends to the decimal read-out section through hub B2 of FIG. 22G and PJ2–X to the upper common input terminal Y of decimal switch section S202 of FIG. 11. Since this switch had a "7" indexed in it by the coded strip 118 on actuator rack 2 when the decimal read-out unit was raised, the S17 ground circuit will be completed to the "7" terminal on S202 and through the No. 7 output bus wire and PJ2–EE, as indicated in FIGS. 11 and 22G. Tie-in point PJ2–EE is wired to the control board hub C10, which is card entry No. 7. Hub C10 is not wired on the face of the control board but is internally wired to TB102–20 as a terminal and through tie-in PJ4–37 to plug tie-in point P5–37, the corresponding jig tie-in point J5–37 of which is connected to the No. 7 interposer magnet of the key punch as shown in FIG. 19B. Energization of the No. 7 interposer magnet closes the interposer bail contacts to cause an escapement cycle of the key punch in which the regular and aux program drums move to column 2 and the detail card drum moves to column 1 to initiate a punching cycle to punch the first numeral "7" of the Type item of information in column 1 of the detail card.

Column 2 of the aux drum program card 272 contains a zone "12" and a zone "0" punch therein, the 0 punch causing the energization of matrix relay K110 to set the matrix contact circuit for a code exit 1 output therefrom. The zone 12 punch in the aux dup program card closes star wheel switch 12 to energize the control unit word length relay K112 through tie-in points P5–22 and PJ4–22, whereupon relay K112 transfers its contact points K112–A N/O of FIG. 22F, which connect the ground circuit completed upon the closing of punch cam actuated switch P–5 of FIG. 19B in the key punch machine during the punching of column 1 of the detail card to test the relay matrix as described below, and also transfers its contact points K112–C N/O, which supply card ground to energize the word length interlock relay K113. The K113–A N/C contact points shown in FIG. 22C transfer to open the hold circuit to the control unit Punch Indication relay K105 while the K113–B N/O contact points of FIG. 22F close to complete a ground circuit to the coil of the machine block solenoid L1, which blocks the accounting machine drive from being tripped for a subsequent cycle of operation as long as zone 12 word length punches are present in the aux drum program card until the entire field has been punched.

At 86° of the first punch cycle, punch cam actuated switch P–5 closes, completing a ground circuit through tie-in connector points PJ 5–8 and PJ 4–8 and the indicated contact points of K112–A N/O, K110–A N/O, K101–B N/C, K102–C N/C and K104–A N/C to the control board code exit hub A1, all shown in FIG. 22F. The control board hub A1 is program wired to the plug board distributor entry hub A23 shown in FIG. 22H so that the ground pulse from punch cam switch P–5 entering hub A23 will exit from the distributor outlet hubs A24 and A25 through diodes CR135 and CR136, respectively. Hub A24 is wired to hub B1 on the face of the plug board and enters the decimal read-out section through PJ2–Y to pulse decimal switch unit S201 having an "8" indexed therein and exits from PJ2–DD to energize the No. 8 interposer magnet of the key punch through the tie-in point P5–38 of FIG. 22G and J5–38 of FIG. 19B. Energization of the No. 8 interposer magnet closes the interposer bail contacts to initiate another card escapement cycle and the punching of column 2 of the detail card during which punch cam switch P–5 again closes to pulse the input of the matrix relay contacts which have been set in accordance with the condition of energization of the matrix relays under control of the code punchings in rows 0, 1, 2, and 3 of column 3 of the aux program card. The punching of the remaining columnar positions of this field will continue as described in the above paragraphs, the only changes being the code exits and the amounts in the various decimal switches.

When the No. 3 interposer magnet is energized to punch detail card column 10, it will cause a card escapement moving the aux drum program card to column 11, which has code 1, 2, and 4 holes in the 0, 1 and 2 zones thereof setting up a code exit of 7. Since column 11 does not contain a word length punch in zone 12 thereof, the control unit word length relay K112 will drop out and all of the K112 contact points return to normal including the K112–A N/O contact points, which open the P–5 ground circuit from the key punch. Therefore, when cam switch P–5 of the key punch closes during the punching of column 10, the matrix will not be tested and punching will stop after column 10. The K112–CN/O contact points, upon returning to normal, will de-energize the word length interlock relay K113, which in turn will open the energizing circuit established through its K113–B N/O contact points to de-energize L1 and allow the accounting machine, now in carriage stop position 2, to be operated for its next cycle of operation.

CARRIAGE STOP POSITION 2—CARD COLUMN 11

In this carriage stop position, the Customer No. "12345" of the cash receipts application is indexed in keyboard amount section columns 7 through 3 and will be punched in card columns 11 through 15 after the accounting machine is operated with motor bar No. 2 to tabulate the carriage to stop position 3. The control panel 130 of the accounting machine is scheduled to cause the machine operation to be repeated after the punching of the customer number field has been completed and after the auto-skip code programmed by the zone 11 punching in column 16 of the regular program card 271 causes the card to skip to card column 20. After the repeat of machine operation, the accounting machine carriage will tabulate to stop position No. 4.

With the exception of those circuits not previously covered point to point, the remaining circuit descriptions of the cash receipts application will be covered in outline form to eliminate repetition.

(1) Timing switch S14 of FIG. 22B closes at 100° to 125° of the accounting machine cycle to complete a ground to the control unit Punch Indication Relay K105 of FIG. 22C and to supply a reset pulse to reset selector relays K121 through K125 of FIG. 22H.

(2) K105–A N/O contact points of FIG. 22C close to complete a hold circuit for relay K105.

(3) Timing switch S15 then closes at 150° of the accounting machine cycle to test electrical lane switches S28 through S31.

(4) Timing switch S16 closes at 200° to test the position of motor bar switches S11, S12 and S13; the total and non-total limit switches S40 and S41, the sign of A, B, and C switches S20, S21, and S22, and the limit rack section of the decimal read-out switches as previously outlined.

(5) Timing switch S17 of FIG. 22E closes at 250° to test the matrix relay points which were set for code exit 7 by code 1, 2, and 4 punches in card column 11 of the auxiliary drum program card.

(6) Code exit A7 of FIG. 22F is wired on the face of the program board to hub B7 of FIG. 22G to test decimal read-out switch S207 in which the first numeral, "1," of the Customer No. "12345" is indexed.

(7) The exit from decimal switch section S207 on the No. 1 bus wire will energize the No. 1 key punch interposer magnet through tie-in point P5–31 of FIG. 22G and J5–31 of FIG. 19B.

(8) The card escapement caused by energization of the No. 1 interposer margnet picks up a new matrix code and word length from the coded punching of the auxiliary drum program card column 12.

(9) The word length code punch in zone 12 of column 12 the aux pro card energizes the Word Length Relay K112 of FIG. 22F.

(10) The K112–C N/O contact points close to energize the control unit Word Length Interlock Relay K113.

(11) K113–B N/O contacts close to energize L1.

(12) Punch cam actuated switch P–5 in the key punch closes to test the matrix relays through K112–A N/O contact points.

(13) This operation continues until word length is lost on the auxiliary drum program card column at 16.

(14) In card column 16 on the regular program card, an auto-skip code punch in zone 11 is indexed and causes the 11 star wheel contacts of the regular program drum to close to energize the Skip relay 49 shown on FIG. 19C of the key punch wiring diagram. When the skip relay point 49–3 in the grid circuit of key punch tube 2 closes, tube 2 will conduct energizing the control unit Interlock Relay K114 of FIG. 22B through the following circuit traced from the plate of tube 2, tie-in point J5–70 and P5–70, PJ4–70, the transferred K115–E N/O contact points, K114 relay coil, TB101–23, TB101–34, R102, TB101–33, PJ4–23, and PJ5–23 to B+ in the key punch. The K114–E N/C contacts of FIG. 22F open the B+ circuit to the matrix relays and the Punch Indication Relay K105. The K114–E contact point is transferred during the skip operation to prevent the rapid energizing and de-energizing of the matrix relays. The K114 relay will be de-energized at the end of the skip operation.

CARRIAGE STOP POSITION 4—CARD COLUMN 20

Carriage stop position 4 is assigned to the Net Amount quantity, which is indexed in keyboard amount section columns 8 through 1 depending on the magnitude thereof and will be punched in card columns 20 through 27 inclusive after which the card will stop in column 28. The accounting machine is operated from motor bar No. 2 to skip the carriage to stop position 6 under the control of a pin in the program tray 130 of the accounting machine. The Net Amount quantity is normally subtracted in the accounting machine. If the sign of the Net Amount is reversed, it is added in the accounting machine, the last card column 27 of this field of the punch card will be X overpunched, as described in steps 9 and 10 of the following outline of system operational steps for the Net Amount punching.

(1) Upon initiation of this accounting machine cycle, timing switch S14 closes energizing punch indication relay K105.

(2) K105–A N/O contacts close to hold relay K105.

(3) Timing switch S15 tests the electrical lane switches.

(4) Timing switch S16 tests the motor bar switches, the total and non-total switches, and the limit rack switches, none of which are used in this operation.

(5) The sign of accumulator A switch S21 of FIG. 22C will remain in its normal position shown, because the A symbol slide is in a subtract condition. Therefore, the ground circuit from S16 will exit from control board hub B16.

(6) Hub B16 is program wired on the face of the program board to selector hub F1 and will pick the selector relay K121 of FIG. 22H.

(7) Punching from this point on will be as outlined previously for carriage position 2, with the exception of card column 27.

(8) Column 27 of the auxiliary program card includes 1, 2, 4, and 8 code punchings thereon to energize the matrix relays and set their contacts to route the pulse applied to the matrix contact input from punch cam switch P–5 through K112–A N/O contacts to code exit hub A15. Hub A15 is program wired to distributor entry hub C23 from which ground circuits will exit from hubs C24 and C25 through diodes CR139 and CR140, respectively.

Distributor exit hub C24 is wired on the face of the board to data rack hub B1 to read data rack 1, and exit hub C25 is wired to plug board selector hub F5 of FIG. 22H, which is the common of the K121–A selector relay points. Since relay K121 was transferred as mentioned in Step 6 above, no circuit is completed through the contacts of this selector relay.

(9) If the crossfooter A plus key shown in FIG. 2 is depressed to reverse the sign of the entry, sign sensing switch S21 would be opened so that hub B16 would not be active and relay K121 would remain reset or normal.

(10) When the pulse supplied from P–5 of the key punch exits from hub A15 in card column 27, the data rack 1 would be read as before and the ground from exit hub C25 would now find a completed circuit traced from hub C25 jumper wired to hub F5 which is connected through K121–A N/C contacts to hub F6. Hub F6 is jumper wired to hub F4 and from hub F4 to hub C2 of FIG. 22G. From hub C2, the circuit extends to TB101–9 of FIG. 22D, TB102–4 of FIG. 22G, PJ 4–41 and tie-in points P5–41 and J5–41 to the No. 11 interposer magnet of the key punch. Energization of this magnet provides an "11" punch along with the regular punch in card column 27 of the detail card.

CARRIAGE STOP POSITION 6—COLUMN 28

In this carriage stop position of the accounting machine, the Invoice Number "A12 1234" will be indexed in keyboard columns 11 or 32–1 and key columns 10, 9, 6, 5, 4, and 3 of the amount section thereof to be punched in card columns 28 through 34 inclusively and respectively, the letter "A" being indexed from the uppermost key of column 32–1. Instead of indexing the invoice number into the keyboard, the operator may auto duplicate the first portion "A12" of the number by indexing only the last part "1234" thereof into the keyboard or may duplicate the complete number by leaving the keyboard blank as will be covered separately below.

A. *Indexing Complete Invoice Number.*—With the figures "A12 1234" indexed in the aforementioned keyboard columns and motor bar No. 2 depressed, the carriage will tabulate to stop position 7 during which:

(1) Timing switch S14 closes to energize the Punch Indication Relay K105.

(2) K105–A N/O contacts close to hold K105 energized.

(3) Timing switch S16 closes to test the limit rack section of the decimal read-out switch, the limit rack section being inactive because of the figures indexed as the uppermost key of column 32–1 disables the circuit through the limit rack switch section of duo-decimal switch S212 provided for this column.

(4) Timing switch S17 closes, pulsing or testing the matrix relay contact points which were set for code exit 12 by punches in card column 28 of the aux drum program card 272.

(5) Code Exit hub A12 is wired on the face of the plug board 454 of FIG. 21 to selector hub H2 which is internally wired through K123–B N/C contacts shown in FIG. 22H to hub H3. Hub H3 is program wired to distributor entry hub G23 which is internally connected to exit hubs G24 and G25 through diodes CR147 and CR148. Exit hub G24 is program wired to the space hub C13 of FIGS. 22D and 21 which is connected from the rear of the plug board through diode CR140, PJ4–3 and tie-in point P5–3 to the space interposer magnet, labelled Space, in FIG. 19B of the key punch wiring diagram. Exit hub G25 is program wired to data rack entry hub B12, which is connected from the rear of the plug board through PJ3–AA to read character rack 12 through duo-decimal switch S212, the X and Y common input terminals of which are interconnected as indicated in FIG. 11 and are pulsed from the aforementioned pulse from code exit A12. Switch S212 has a "12" indexed therein for the alphabetical character "A" of the aforementioned Invoice Number and completes the ground circuit from the "12" output terminal thereof exiting on wire PJ3–N to control board hub D1. Hub D1 is jumper wired in FIG. 21 to distributor entry hub K23 which is internally connected through diodes CR153 and CR154 to exit hubs K24 and K25. Exit hub K24 is program wired to card entry hub C1 which is connected over a circuit from the rear of the plug board to TB102–2, PJ4–42 and tie-in point P5–42 of FIG. 22G to energize the No. "12" key punch interposer magnet of FIG. 19B. Exit hub KJ25 is program wired on the face of the plug board 454 to hub C4 to supply ground over a circuit through TB102–8, PJ4–31 and tie-in point P5–31 to energize the No. 1 interposer magnet. Column 27 of the detail card 502, therefore, will be punched with a 12 and a 1 punch therein for the letter "A."

(6) The punching from this point on will be as outlined previously.

B. *Indexing Last Portion of Invoice Number.*—With the figures "1234" indexed in keyboard amount columns 6, 5, 4, and 3, depressing motor bar No. 2 will cycle the accounting machine and cause duplication of card columns 28, 29 and 30 from the card at the reading station and permit normal punching of the remainder of the field, as described below.

(1) Timing switch S14 closes at 100° to 125° of the accounting machine cycle to energize the Punch Indication Relay K105 which establishes its own holding circuit through the closing of the K105–A N/O contacts thereof.

(2) Timing switch S16 tests the limit rack readout section, which provides a circuit through PJ1–F and PJ3–Z to pulse the X or lower common input terminal of S211 to pick plug board selector 3, relay K123. Since decimal switches S211, 210, 209, 208, and 207 are set to 0, the terminal X to terminal A circuits of the limit rack sections of these switches will be completed to terminal X of S206 and exits will be available from the control board limit rack hubs E2 through E7. Control board hub E7 is program wired on the face of the plug board to selector hub H1, which is connected to pick selector 3, relay K123.

(3) Timing switch S17 through code exit A12 energizes the control unit duplication relays K108 and K109 over a circuit traced from hub A12 jumper wired on the board to hub H2 which is connected through K123–B N/O contacts to hub H4. Hub H4 is jumper wired to hub J16 of FIG. 22D which is connected through diode CR109 to energize Dup 2, relay K109 and through diode CR108 and CR107 to energize the Dup 1, relay K108 of the control unit.

(4) K109–A N/O contacts hold Dup 2 relay K109 in series with K105–C N/O or K112–B N/O.

(5) K108–A N/O contacts hold Dup 1 relay K108 in series with K114–B N/C contacts.

(6) K108–B N/O contacts shown in FIG. 22B ground the grid of the Dup 1 key punch tube 5 (FIG. 19C) through K108–B N/O contacts, K115–A N/O contacts, PJ4–10, and tie-in point P5–10.

(7) K109–B N/O contacts shown in FIG. 22F close to shunt K114–E N/C contacts to keep the matrix relays active when the K114–E points transfer during duplication.

(8) The control unit control interlock relay K114 will be energized during duplication upon closing of the normally open Dup 1 relay contact points 52–3 in the grid circuit of key punch tube 2 of FIG. 19C. Tube 2 will conduct energizing the control interlock relay K114 of FIG. 22B over a circuit traced from the plate of tube 2, PJ5–70, PJ4–70 and K115–E N/O contacts to the low potential side of relay K114, the high potential side of which is connected through R102, PJ4–23 and tie-in point P5–23 to key punch B+.

(9) Duplication will continue under control of field definition in the regular program card until card column 30. During the duplication of column 30, the dup 2 relay R50 in the key punch is normal and the back or normally closed set of its contact points 50–2 N/C of FIG. 19B reconnects the P–5 grounding circuit to the matrix relay points through K112–A N/O contact points. The matrix relay points are set for a code exit 11 in aux pro card column 31 at the time the pulse from punch cam switch P–5 tests the matrix. The code exit will read decimal switch S206 associated with data rack 6 for amount column 6 and cause punching of the number "1" indexed therein. When the dup relays are de-energized in the key punch, tube 2 will cut off de-energizing the control interlock relay K114 of the control unit. Since the K114 relay is slow in dropping out, the control unit Dup 2 relay K109 must be energized to shunt the K114–E points assuring that the matrix will be active at the time the pulse from P–5 tests the matrix relay points.

(10) Punching from this point on will be as previously outlined.

C. *No Invoice Number Indexed.*—If the present invoice number is the same as the number in the previous card, duplication will be automatically indexed by operating the machine with a blank keyboard as explained below.

(1) Timing switch S14 closes energizing the Punching Indication relay K105.

(2) Timing switch S16 tests the decimal switch limit rack section to pick selector 3 relay 3 over the same circuit outlined in step A–2 above. Also, selector 5 will be picked through the following circuit: terminal X of S206 through the X to A circuits of the limit rack sections of decimal switches S206, S205, S204, S203, S202, and S201, all of which are set to 0, and out of S201–A and through PJ2–T to control board hub E13. Hub E13 is programmed on the face of the plug board to hub J2 associated with Plug Board Selector relay K124, the normally closed contact set K124–B N/C of which connects hub J2 to J3. Hub J3 is program wired to hub K1 to pick plug board selector 5, relay K125.

(3) Timing switch S17 closes to index a dup operation through code exit A12 as outlined in Steps 3, 4, 5, and 6 immediately above.

(4) During the duplication of card column 30, punch cam switch P–5 of the key punch will close to ground the input of the matrix tree contacts and the following circuit will be completed to cause duplication of the remainder of the field; the eleventh code exit hub A11 jumper wired to hub K2 which is internally wired through K125–B N/O contact points to selector hub K4 programmed to hubs H4 and J16 to index duplication as outlined previously.

CARRIAGE STOP POSITION 7—CARD COLUMN 36

In this carriage stop position, the Gross Amount quantity, "$100.00," will be indexed in keyboard amount columns 8 through 1 assigned to be punched in card columns 36 through 43 followed by a skip of card column 44 programmed from the plug board, and the card will stop in card column 45. The Gross Amount field is normally an add field, but if the sign of entry should be reversed, an X will automatically overpunch, say, the last card column, 43, of this field.

(1) With motor bar No. 2 depressed, the carriage will tab to stop position 8, and the operation will be a normal punching operation as outlined previously.

(2) On a reverse entry, the crossfooter A minus bar (28A–5) of FIG. 2 will be used to operate the accounting machine and will cause normal punching with the exception of column 43. Plug board selector 1, constituted by relay K121, will be energized by the Sign of A switch S21 which will remain closed when tested by the ground pulse applied when timing switch S16 is closed. During the punching of column 42, the closing of punch cam switch P–5 will complete the following circuit from tie-in point P5–8 of the key punch diagram of FIG. 19B to corresponding jig point J5–8, PJ4–8, K112–A N/O contact points, the matrix relay contact points to code exit hub A1 because of the code 1 punching in column 43 of the aux program card. Code exit hub A1 is jumper wired on the face of the plug board to distributor entry hub A23. The exit of A24 will test B1, which is data rack 1 associated with the first column of the amount section of the keyboard. Exit A25 is jumper wired to hub F2 connected through K121–B N/O contact points to hub F4 which is jumper wired to hub C2 (card entry 11). Hub C2 is connected through tie-in point P5–41 to the number 11 interposer of the key punch.

CARRIAGE STOP POSITION 8—CARD COLUMN 45

The Discount amount, "$2.00," will be indexed in keyboard amount columns 6 through 1 and will be punched in card columns 45 through 50. The accounting machine will be operated with motor bar No. 4 to skip the carriage to stop position 12 under the control of the program tray 130 of the accounting machine.

The punching of this field is the same as outlined for carriage stop position 4.

CARRIAGE STOP POSITION 12—CARD COLUMN 51

This stop is a non-punching position and is used to re-index the customer number to produce a zero proof for this line of posting. The accounting machine will be operated in this position with motor bar No. 2 tabulating the carriage to stop position 13 with a repeat of machine operation indexed from the control panel tray of the accounting machine.

CARRIAGE STOP POSITION 13—CARD COLUMN 51

In this stop position, the machine will automatically total and index a carriage return to stop position 2 under the control of the program panel of the accounting machine. If the A crossfooter is clear during this total operation, the card will be released. If not, the card will remain in card column 51, and the position lamp LT–4 and buzzer BZ–2 will be turned on.

(1) With the pin in lane 26 closing the punch indication lane switch S26, a ground circuit will be completed to timing switch S14 which closes at 100 degrees of the accounting machine cycle to energize the Punch Indication relay K105 and to reset relays K121 through K125, selectors 1 through 5.

(2) Timing switch S15 then closes at 150° of the accounting machine cycle to supply ground to lane switch S29, which has been actuated by a pin in lane 29 completing the following circuit: S29 N/O, PJ1–R, hub C17 jumper wired to hub J1 to pick the pick coil of plug board selector 4, relay K124 through diode CR158 as shown in FIG. 22H.

(3) Timing switch S16 will test the limit rack and total limit hubs to index a key punch card release and punch disable operation, respectively, over the following circuitry from switch S16, PJ1–F and PJ3–Z to the X to A limit rack circuits of decimal switches S211 through S201, exiting from PJ2–T to the Blank Keyboard Check (BK CK) hub E13. This hub is jumper wired to plug board selector hub J2 which is internally connected through K124–B N/O contact points to hub J4. Hub J4 is jumper wired to the release hub F18 from which a circuit extends through diode CR118, PJ4–5 and tie-in point P5–5 as shown in FIG. 22D to the card Release relay of FIG. 19C of the key punch wiring diagram.

Timing switch S16 also tests the total limit switch S40 which has been transferred by the accounting machine index strip lock bail 190 to complete a circuit from switch S40 N/O, PJ1–Z to total limit hub E18. Hub E18 is jumper wired to plug board selector hub J5 which is internally connected through K124–A N/O contact points to hub J7. Hub J7 is jumper wired to the punch disable hub J18 which is connected from the rear of the plug board through diode CR117 to the coil of the control unit Punch Disable relay K107, as indicated in FIG. 22D.

(4) The K107–A points shown in FIG. 22C are "make-before-break" contacts to assure the following functions take place in a sequence.

a. K107–A N/O contact points will complete a shunt circuit around punch indication relay K105–B N/O contact points of FIG. 22B to maintain card ground from K106–C contact points on timing switch S16 when K105–B contact points open.

b. K107–A N/C contact points will open the hold circuit to the Punch Indication relay K105.

c. K105–B N/O contact is shunted so as not to shorten the time duration of timing switch S16, which would result in not energizing the release relay in the key punch on this operation.

(5) When timing switch S16 opens at 225°, the punch disable relay K107 will be de-energized opening the ground circuit to timing switch S17 before it closes at 250° of the accounting machine cycle.

Multiple Line Posting Application

FIG. 24 illustrates a multiple line posting application such as is used where several invoices are involved in the same cash payment or where there are additional miscellaneous entries for the same payment. The quantities posted on different lines of the accounting machine are punched in successive cards as 510 and 512 under the control of the regular program card 514, auxiliary program card 516 and the scheduled programming of the accounting machine indicated on the work sheet 518.

The punching of the first card 510 for the first line of posting is generally similar to the punching of the card for the single line or entry cash receipts application previously described except that in punching of the first line of the Gross Amount field with the carriage at stop position 7, Motor bar No. 4 instead of Motor bar No. 2 is used to tabulate the carriage to stop position 9 since no Discount quantity is present in the first line of posting.

By using motor bar No. 4 in stop position 7, the carriage will skip to stop position 9 and the card will be skipped automatically to column 51 after punching the Gross Amount quantity in columns 36 through 43 of the card 510, as explained below.

With the program cards sitting in column 36 at the beginning of the Gross Amount field, when timing switch S16 closes during the accounting machine cycle initiated by depression of motor bar No. 4, a control circuit will be activated through switch S13 activated by bar No. 4 to pick selector No. 2, relay K122, and shift the key punch to Alternate Program through the following circuits: Timing switch S16, the normally closed contacts of motor bar switches S11 and C12 and the lower transferred contacts of S13 connected through PJ1–Z to hub A18, which is jumper wired in the plug board to distributor entry E23 connected through diodes CR143 and CR144 of FIG. 22H to distributor exit hubs E24 and E25. Exit hub E25 is program wired on the face of the plug board to hub G1 to pick selector 2, and exit hub E24 is program wired to plug board hub G18, which is connected through diode CR119, PJ4–57, and tie-in point P5–57 of FIG. 22D to pick the alternate program relay R39 on the key punch diagram of FIG. 19D, shifting the functional control of the key punch machine to the lower half of the regular program card 514.

When timing switch S17 closes, the input of the matrix tree contacts will be pulsed or tested through the normally closed contacts K112–A, the relay coil K112 of which has not been energized in view of the absence of a zone 12 word length punching in column 36 of the aux program card 516. This column of the card contains a code 8 punchnig therein to energize the matrix relays and to provide a code exit to plug board hub A8 therefrom. Hub A8 is program wired to data rack hub B8 to read data rack 8 for the eighth column of the amount key section of the accounting machine keyboard, and the S17 timing pulse is applied through tie-in points PJ2–J to the upper common terminal Y of decimal switch S208, which has a zero indexed therein to exit the pulse through output bus P2–NN, as indicated in FIG. 11. P2–NN is connected to the rear of the card entry hub C2 having another connection therefrom to TB106–6 from which a circuit extends through tie-in connections PJ4–40 and P5–40 to pulse the "0" interposer of the key punch, initiating a card escapement cycle of the program cards to column 37 and the detail card to column 36 in which a zero is punched.

At 86° of the thus initiated punch cycle, punch cam actuated switch P–5 closes to supply a ground pulse from the key punch through the now transferred contacts K112–A N/O of the now energized relay K112 to test the setting of the relay tree contacts, the coils of which were selectively energized through the aux drum star wheel switch contacts in column 37 of the aux program card, and the punching continues under the field definition punchings in the now effective alternate program zone 4 of the regular program card.

After the last column, column 43, of the Gross Amount field has been punched and the program cards have been advanced to column 44 thereof, the closing of punch cam actuated switch P–5, during the punching of column 36 of the detail card, provides a ground circuit out code exit A13, in accordance with the coding in zones 0, 2 and 3 of the aux program card. Code exit A13 is jumper wired to plug board selector hub G2, which is connected through K112–B N/O contacts to hub G4 jumper wired to hub F16 to index a Skip operation on the key punch as programmed from the plug board.

The field definition punchings in the alternate control zone of the regular program card will continue the skip operation to card column 51.

CARRIAGE STOP POSITION 9—CARD COLUMN 51

In this stop position, the Miscellaneous Account Number ("3456") appearing on the first line of the work sheet 518 will be indexed and the accounting machine operated with motor bar No. 2. The carriage will tabulate to stop position 10 and the Miscellaneous Account Number will be punched in card columns 51 through 56, and the card 510 will stop in column 57. Punching in this carriage stop position is the same as that previously outlined in stop position No. 2 for the single line posting application.

CARRIAGE STOP POSITION 10—CARD COLUMN 57

In this stop position, the Miscellaneous Amount ($1.00) will be indexed and the accounting machine will be operated with motor bar No. 1. The Miscellaneous Amount will be punched in card columns 57 through 64 of the first detail card 510, and the carriage will tabulate to stop position 11 and operate because of a motor bar repeat operation scheduled in stop position 10 from the control panel of the accounting machine. This field will be punched the same as stop position 7.

CARRIAGE STOP POSITION 11—CARD COLUMN 65

The machine operation in stop position 11 is indexed by the motor bar repeat operation from stop position 10, and the carriage will return on mechanical control lane 2 to stop position 5 with another motor bar repeat operation indexed. The card will be released because of a pin in electrical lane 29, actuating electrical lane switch S29 to energize the Release relay in the key punch and index a card release operation, as previously outlined for stop position 13 for the single lane cash receipts application.

CARRIAGE STOP POSITION 5—CARD COLUMN 11

The motor bar repeat operation in carriage position 11 has returned the carriage to stop position 5 and the second card 512 for the multiple line posting operation has been advanced to its punch registration position to receive the information contained on the second line of posting of the work sheet 518 of FIG. 24.

After the first 10 columns have been duplicated in card 512 as indexed by the auto-dup code in column 1 of the regular program card, the accounting machine will operate in stop position 5 from which the carriage will tabulate to stop position 6. The machine operation in stop position 5 shifts the key punch to alternate program which causes duplication of the Customer Number "23456" punched in columns 11 through 15 of the previous card 510 and automatically skips columns 16 through 19 of the blank field and the Net Amount field indexed from the Auto-Skip code in column 11 of the now effective alternate program section of the regular program card 514, stopping the second card 512 in column 28.

The key punch is shifted to alternate program control when the accounting machine is operated in carriage position 5 by the closing of timing switch S15 which tests electrical lane switch S28, completing a circuit from hub C16 which is jumper wired on the face of the plug board to hub E16. Hub E16 in turn in jumpered to the alternate program hub G18 to shift the key punch to Alternate Program. The K114A N/C contacts open to break the ground circuit to timing switch S17 to disable punching from stop position 5.

CARRIAGE STOP POSITION 6—CARD COLUMN 28

From this stop position on the operation will be the same as previously outlined for a normal straight line of posting. The second Invoice Number "B222346" for the second line of posting is punched in columns 28 through 34 of the card 512 followed by a Space operation from the code 13 punching in column 35 of the aux program card.

Upon completion of the punching of the Invoice Number, the carriage will be in stop position 7 for the Gross Amount ($51.00) in which motor bar 2 instead of No. 4 is used because the second line of posting contains a Discount quantity ($1.00), absent on the first line of posting for carriage position 8.

What is claimed is:

1. The combination with a card punch machine for column by column punching of a detail card and including a potential supply source, a plurality of selectively energizable punching elements each connected to one side of said source, a program card having control indicia in columns corresponding to the columns of the detail card and regulating the punching of the detail card over data receiving fields therein controlled by corresponding control fields of the program card, means for sensing the control indicia in the columns of the program card, and means for advancing the detail card and the program card column by column past said punching elements and said sensing means, respectively, upon energization of any of said punching elements, and a cyclically operable accounting machine having a movable carriage, a plurality of differentially positionable data racks, an accumulator cooperating with said data racks, and a keyboard having a plurality of different denominational orders of data keys for entering variable data therein and means for initiating cyclical operations at different carriage stop positions thereof; of a plurality of electrical read-out means for sensing the variable data entered in the accounting machine, and control means connected between said machines providing a plurality of selectively operable control circuit paths from the other side of the potential supply source and through different ones of said read-out means to the other side of said selectively energizable punching elements and including matrix relay selector means operated by said program card control indicia sensing means controlling the sequential selection of individual ones of said control circuit paths containing said read-out means, switching means operated from the accounting machine upon initiation of a cycle of operation thereof to complete a first one of the control circuit paths selected by said control circuit path selecting means in an initial columnar position of a control field of the program card corresponding to one of the carriage stop positions of the accounting machine, said path extending from a point connected to the other side of the potential supply source and through the electrical read-out device contained in the selected circuit path to the other side of one of said punch operating elements to initiate advancing of the detail card and the program card to the next columnar positions thereof and punching of the detail card, and switching means operated thereafter from said card punch machine to complete following ones of the control circuit paths upon their sequential selection by said selecting means from successive columns of the program card during the subsequent punching of variable data from the accounting machine read-out means in succeeding columns of the detail card over the extent of the corresponding control field of the program card, said movable carriage being free to move from one stop position to another independently of control by the program card.

2. The combination with a card punch machine for column by column punching of a detail card and including a potential supply source, a plurality of selectively energizable punching elements each connected to one side of said source, a program card having control indicia in columns corresponding to the columns of the detail card and regulating the punching of the detail card over data receiving fields therein controlled by corresponding control fields of the program card, means for sensing the control indicia in the columns of the program card, and means for advancing the detail card and the program card column by column past said punching elements and said sensing means, respectively, upon energization of any of said punching elements, and a cyclically operable accounting machine having a movable carriage, a plurality of differentially positionable data racks, an accumulator cooperating with said data racks, and a keyboard having a plurality of different denominational orders of data keys for entering variable data therein and means for initiating cyclical operations at different carriage stop positions thereof; of a plurality of electrical read-out means for sensing the data entered in the accounting machine, and control means connected between said machines providing a plurality of selectively operable control circuit paths from the other side of the potential supply source and through different ones of said read-out means to the other side of said selectively energizable punching elements and including matrix relay selector means operated by said program card control indicia sensing means controlling the sequential selection of individual ones of said control circuit paths containing said read-out means, switching means operated from the accounting machine upon initiation of a cycle of operation thereof to complete a first one of the control circuit paths selected by said control circuit path selecting means in an initial columnar position of a control field of the program card corresponding to one of the carriage stop positions of the accounting machine, said path extending from a point connected to the other side of the potential supply source and through the electrical read-out device contained in the selected circuit path to the other side of one of said punch operating elements to initiate advancing of the detail card and the program card to the next columnar positions thereof and punching of the detail card, switching means operated thereafter from said card punch machine to complete following ones of the control circuit paths upon their sequential selection by said selecting means from the program card during the subsequent punching of succeeding columns of the detail card, and means controlled from said control indicia sensing means in a subsequent columnar position of the program card to interrupt the selection of said control circuit paths by said selecting means with the initiation of the punching of the detail card for the last column thereof corresponding to the end of the data entered in the accounting machine at the said carriage stop position thereof, said movable carriage being free to move from one stop position to another independently of control by the program card.

3. The combination with a card punch machine for column by column punching of a detail card and including a potential supply source, a plurality of selectively energizable punching elements each connected to one side of said source, a program card having control indicia in columns corresponding to the columns of the detail card and regulating the punching of the detail card over data receiving fields therein controlled by corresponding control fields of the program card, means for sensing the control indicia in the columns of the program card, and means for advancing the detail card and the program card column by column past said punching elements and said sensing means, respectively, upon energization of any of said punching elements, and a cyclically operable accounting machine having a movable carriage, a plurality of differentially positionable data racks, an accumulator cooperating with said data racks, and a keyboard having a plurality of different denominational orders of data keys for entering variable data therein and means for initiating cyclical operations at different carriage stop positions thereof; of a plurality of electrical read-out means for sensing the data entered in the accounting machine, and control means connected between said machines providing a plurality of selectively operable control circuit paths from the other side of the potential supply source and through different ones of said read-out means to the other side of said selectively energizable punching elements and including selector means operated by said program card control indicia sensing means controlling the sequential selection of individual ones of said control circuit paths containing said read-out means, switching means operated from the accounting machine upon initiation of a cycle of operation thereof to complete a first one of the control circuit paths selected by said control circuit path selecting means in an initial columnar position of a control field of the program card corresponding to one of the carriage stop positions of the accounting machine, said path extending from a point connected to the other side of the potential supply source and through the electrical read-out device contained in the selected circuit path to the other side of one of said punch operating elements to initiate advancing of the detail card and the program card to the next columnar positions thereof and punching of the detail card, switching means operated thereafter from said card punch machine to complete following ones of the control circuit paths upon their sequential selection by said selecting means from the program card during the subsequent punching of succeeding columns of the detail card, and means controlled from said control indicia sensing means when the program card has been advanced to the second columnar position of a control field thereof preventing initiation of a subsequent cycle of operation of the accounting machine until the end of the control field in the program card.

4. The combination with a card punch machine for column by column punching of a detail card and including a potential supply source, a plurality of selectively energizable punching elements each connected to one side of said source, a program card having control indicia in columns corresponding to the columns of the detail card and regulating the punching of the detail card over data receiving fields therein controlled by corresponding control fields of the program card, means for sensing the control indicia in the columns of the program card, and means for advancing the detail card and the program card column by column past said punching elements and said sensing means, respectively, upon energization of any of said punching elements, and a cyclically operable accounting machine having a movable carriage, a plurality of differentially positionable data racks, an accumulator cooperating with said data racks, and a keyboard having a plurality of different denominational orders of data keys for entering variable data therein and means for initiating cyclical operations at different carriage stop positions thereof; of a plurality of electrical read-out means for sensing the data entered in the accounting machine, and control means connected between said machines providing a plurality of selectively operable control circuit paths from the other side of the potential supply source and through different ones of said read-out means to the other side of said selectively energizable punching elements and including selector means operated by said program card control indicia sensing means controlling the sequential selection of individual ones of said control circuit paths containing said read-out means, switching means operated from the accounting machine upon initiation of a cycle of operation thereof to complete a first one of the control circuit paths selected by said control circuit path selecting means in an initial columnar position of a control field of the program card corresponding to one of the carriage stop positions of the accounting machine, said path extending from a point connected to the other side of the potential supply source and through the electrical read-out device contained in the selected circuit path to the other side of one of said punch operating elements to initiate advancing of the detail card and the program card to the next columnar positions thereof and punching of the detail card, switching means operated thereafter from said card punch machine to complete following ones of the control circuit paths upon their sequential selection by said selecting means from the program card during the subsequent punching of succeeding columns of the detail card, means controlled from said control indicia sensing means when the program card has been advanced to the second columnar position of a control field thereof preventing initiation of a subsequent cycle of operation of the accounting machine, and means controlled from said control indicia sensing means to interrupt the selection of said control circuit paths by said selecting means and to release said accounting machine operation preventing means when the program card has been advanced to the last column of the control field thereof.

5. The combination with a card punch machine for columnar punching of a detail card and including a potential supply source, a plurality of selectively energizable punching elements each connected to one side of said source, a program card having control indicia in columns corresponding to the columns of the detail card and regulating the punching of the detail card over fields controlled by corresponding control fields of the program card, means sensing the control indicia in the columns of the program card, and means advancing the detail card and the program card column by column past said punching elements and said sensing means, respectively, upon energization of any of said punching elements, and a cyclically operable accounting machine having a movable carriage, a plurality of differentially positionable data racks, an accumulator cooperating with said data racks, and a keyboard having a plurality of different denominational orders of data keys for entering variable data therein and means for initiating cyclical operations at different carriage stop positions thereof; of a plurality of electrical read-out means for sensing the data entered in the accounting machine, and control means connected between said machines providing a plurality of selectively operable control circuit paths from the other side of the potential supply source and through different ones of said read-out means to the other side of said selectively energizable punching elements and including selector means operated by said program card control indicia sensing means controlling the sequential selection of individual ones of said read-out means contained in said control circuit paths in corresponding columns of a control field of the program card, switching means operated from both of said machines for completion of successive individual circuit paths of a group of control circuit paths selected by said selector means over a control field of the program card assigned to one of the carriage stop positions of the accounting machine and extending from the other side of said potential supply source through different ones of the read-out means contained in the successively selected paths to the other side of the punching elements in accordance with the data in the accounting machine in the said carriage stop position thereof, switching means operated from the accounting machine in one of the carriage stop positions thereof, switching means operated from control indicia provided in the first column of a control field of the program card in the card punch machine, and means operatively controlled from said last two mentioned switching means only in the event that one of the switching means is operated and not the other.

6. The combination with a card punch machine for columnar punching of a detail card and including a potential supply source, a plurality of selectively energizable punch operating elements each connected to one side of said source, a program card having control indicia in columns corresponding to the columns of the detail card and regulating the punching of the detail card over punching fields controlled by corresponding control fields of the program card, means for sensing the control indicia in the columns of the program card, and means for advancing the detail card and the program card column by column past said punching elements and said control indicia sensing means, respectively, upon energization of any of said punch operating elements, and a cyclically operable accounting machine having a movable carriage, a plurality of differentially positionable data racks, an accumulator cooperating with said data racks, and a keyboard having a plurality of different denominational orders of data keys for entering variable data therein and means for initiating cyclical operations at different carriage stop positions thereof; of a plurality of electrical read-out means for sensing the data entered in the accounting machine, each of said read-out means having an input terminal and a plurality of data output terminals connected to different ones of said selectively energizable punch operating elements, and control means connected between said machines including a plurality of matrix relays selectively energizable through said control indicia sensing means and having a plurality of contacts connected in a single input, plural output contact tree arrangement affording a selection of any one of said read-out means contained in different ones of a plurality of output circuits from the input thereof in accordance with the condition of energization of the matrix relays, switching means operated from the accounting machine upon initiation of a cycle of operation thereof to complete a control circuit path from a point connected to the other side of said potential supply source and extending through one of the matrix relay output circuit paths selected by the control indicia sensing means in an initial columnar position of the program card and through one of said read-out means to one of said punch operating elements for advancing of the cards and punching the detail card, and switching means operated from said card punch machine to complete subsequent control circuit paths over other output circuits of the matrix selected by the control indicia sensing means in subsequent columns of the program card and extending through different ones of said read-out means for punching of the detail card in subsequent columns thereof.

7. The combination in accordance with claim 6 above wherein the control indicia in the program card controlling the energization of the matrix relays are contained in a binary coded form thereon.

8. The combination with a card punch machine for columnar punching of a detail card and including a plurality of selectively energizable punch operating elements, a plurality of selectively energizable functional control means controlling automatic functional operations of the card punch machine, a program card having control indicia in columns corresponding to the columns of the detail card regulating the punching of the detail card over data receiving fields therein controlled by corresponding control fields of the program card, means for sensing the control indicia in the columns of the program card, means for advancing the detail card and the program card column by column past said punching elements and said sensing means, respectively, upon energization of any of said punching elements, and a potential supply source connected to one side of each of said punch operating elements and to said functional control means, and a cyclically operable accounting machine having a movable carriage, a plurality of differentially positionable data racks, an accumulator cooperating with said data racks, and a keyboard having a plurality of different denominational orders of data keys for entering variable data therein and means for initiating cyclical operations at different carriage stop positions thereof; of a plurality of electrical read-out means for sensing the data entered in the accounting machine, and control means connected between said machines providing a plurality of selectively operable data and functional control circuit paths from the other side of the potential supply source to the other side of said selectively energizable punch operating elements through different ones of said read-out means and to the other side of said functional control means, respectively, said control means including selector means operated by said program card control indicia sensing means controlling the sequential selection of individual ones of said control circuit paths containing different ones of said accounting machine read-out means and said card punch machine functional operation control means over a control field thereof designated for a stop position of the accounting machine, switching means actuated by movement of the carriage of the accounting machine to different ones of the carriage stop positions thereof and controlling the operation of the card punch machine from the accounting machine at different ones of said carriage stop positions and further switching means operated from both of said machines for completion of successive individual circuit paths of a group of control circuit paths selected by said selector means over a control field of the program card and extending from the other side of said potential supply source to the other side of said punch operating elements of said card punch machine through various ones of the electrical read-out means for the data to be read in one of the carriage stop positions of said accounting machine and also to said functional operation control means of the card punch machine.

9. The combination with a card punch machine for columnar punching of a detail card and including a plurality of selectively energizable punch operating elements, a plurality of selectively energizable functional control means controlling automatic functional operations of the card punch machine, a program card having control indicia in columns corresponding to the columns of the detail card regulating the punching of the detail card over data receiving fields therein controlled by corresponding control fields of the program card, means for sensing the control indicia in the columns of the program card, means for advancing the detail card and the program card column by column past said punching elements and said sensing means, respectively, upon energization of any of said punching elements, and a potential supply source connected to one side of each of said punch operating elements and to said functional control means, and a cyclically operable accounting machine having a movable carriage, a plurality of differentially positionable data racks, an accumulator cooperating with said data racks, and a keyboard having a plurality of different denominational orders of data keys for entering variable data therein and means for initiating cyclical operations at different carriage stop positions thereof; of a plurality of electrical read-out means for sensing the data entered in the accounting machine, and control means connected between said machines providing a plurality of selectively operable data and functional control circuit paths from the other side of the potential supply source to the other side of said selectively energizable punch operating elements through different ones of said read-out means and to the other side of said functional control means, respectively, said control means including selector means operated by said program card control indicia sensing means controlling the sequential selection of individual ones of said control circuit paths containing different ones of said accounting machine read-out means and said card punch machine functional operation control means over a control field thereof designated for a stop position of the accounting machine, switching means actuated by movement of the carriage of the accounting machine to different ones of the carriage stop positions thereof and controlling the operation of the card punch machine from the accounting machine at different ones of said carriage stop positions, further switching means operated from both of said machines for completion of successive individual circuit paths of a group of control circuit paths selected by said selector means over a control field of the program card and extending from the other side of said potential supply source to the other side of said punch operating elements of said card punch machine through various ones of the electrical read-out means for the data to be read in one of the carriage stop positions of said accounting machine and also to said functional operation control means of the card punch machine, and manually operable functional control means controlling operations of the card punch machine from the accounting machine independently of the operation of the accounting machine.

10. The combination with a card punch machine including a punching station having a plurality of selectively energizable punch operating elements, a reading station, means for feeding record cards in succession to the punching station and from the punching station to the reading station including means for advancing the cards at the punching station and the reading station in column by column synchronization past said punching station and said reading station, a program card having control indicia in columns thereof corresponding to the columns of the record cards, means for advancing the program card column by column in synchronism with the advancing of the record cards, means for sensing the control indicia in the columns of the program card, and selectively energizable functional control means controlling certain functional operations of the card punch machine, and a cyclically operable accounting machine having a movable carriage, a plurality of differentially positionable data racks, an accumulator cooperating with said data racks, and a keyboard having a plurality of different denominational orders of data keys for entering variable data therein and means for initiating cyclical operations at different carriage stop positions thereof; of an electrical power supply having one side connected to one side of each of said selectively energizable punch operating elements and said functional control means, a plurality of electrical read-out devices for sensing the data entered in the accounting machine, and control means connected between said machines providing a plurality of selectively operable data and functional operation control circuit paths from the other side of said power supply to the other side of said punch operating elements through different ones of said read-out devices and to the other side of said functional control means, respectively, said control means including selector means operated by said program card control indicia sensing means and controlling the selection of individual ones of said control circuit paths containing different ones of said accounting machine read-out devices and said card punch machine functional operation control means for effecting a predetermined operating sequence of the card punch machine for a predetermined carriage stop position of the accounting machine in accordance with the control indicia in a control field of the program card, switching means operated from the accounting machine to complete a first one of the control circuit paths selected by said selecting means in an initial columnar position of the program card to initiate an operation of the card punch machine in accordance with the control indicia in that column of the program card, further switching means operated from the card punch machine to complete following ones of said control circuit paths selected by said selecting means from the other side of said power supply to the other side of said punch operating elements of the card punch machine through various ones of the read-out devices to be read in one of the carriage stop positions of said accounting machine and also to said functional operation control means of the card punch machine, and additional control means operated from said program card control indicia selecting means at the end of the control field therein interrupting the selection of further control circuits therefrom and advancement of the cards from the card punch machine.

11. The combination with a card punch machine including a plurality of selectively energizable punch operating elements for columnar punching of a detail card and a plurality of selectively energizable control means controlling automatic functional operations of the card punch machine, a program card having control indicia in columns corresponding to the columns of the detail card regulating the punching of the detail card over data receiving fields controlled by corresponding control fields of the program card, means for sensing the control indicia in the columns of the program cards, means for advancing the detail card and the program card column by column past the punching elements and said sensing means, respectively, upon energization of any of said punch operating elements, a potential supply source connected to one side of each of said punch operating elements and said functional control means, and a cyclically operable accounting machine having a movable carriage, a plurality of differentially positionable data racks, and a keyboard having a plurality of different denominational orders of data keys for entering variable data therein and means for initiating cyclical operations at different carriage stop positions thereof; of a plurality of electrical read-out devices for sensing the data entered in the accounting machine, each of said read-out devices having an input terminal and a plurality of data output terminals connected to the other side of different ones of said selectively energizable punch operating elements, and control means connected between said machines and including a plurality of matrix relays selectively energizable through said control indicia sensing means and having a plurality of contacts connected in a single input, plural output contact tree arrangement affording a selection of any one of a plurality of output circuits containing different ones of said accounting machine read-out devices and said card punch machine functional operation control means from the input thereof in accordance with the condition of energization of the matrix relays, a programming plug board having a plurality of code exit terminals connected to different ones of the output circuits from said relay tree contacts, a plurality of data rack terminals connected to the input terminals of different ones of the electrical read-out devices, and a plurality of functional control terminals connected to different ones of the functional control means of the card punch machine, various ones of the code exit terminals of the plug board being program wired to the data rack terminals and other code exit terminals to the function control terminals thereof, switching means operated from the accounting machine upon initiation of a cycle of operation thereof to complete a control circuit path extending from a point connected to the other side of said potential supply source and through one of the output circuits of said matrix relays as selected by said control indicia sensing means in an initial columnar position of a control field of the program card to one of the code exit terminals of the plug board and from the exit terminal to one of the data rack or functional control terminals thereon depending on the programming thereof to initiate a corresponding operation of the card punch machine and advancement of the detail card and program card to the next columnar position thereof, and switching means operated thereafter from the card punch machine to complete subsequent control circuit paths from the other side of said potential supply source through subsequent output circuits of said matrix relays as selected by said control indicia sensing means in subsequent columnar positions of the said control field of the program card.

12. The combination in accordance with claim 11 above wherein said programming plug board includes at least one set of single entry, dual exit terminals thereon for connecting any one of the code exit terminals to two other terminals of the plug board.

13. The combination in accordance with claim 11 above wherein said control means includes at least one plug board selector relay having a set of Form C contact points connected to selector terminals provided on the plug board and program wired to two other terminals thereon to alter the function normally provided from a pulse exit terminal on the plug board when the selector relay is energized.

14. The combination in accordance with claim 11 above wherein said card punch machine includes a second program card controlling automatic functional operations of the card punch machine from control indicia distributed in control fields corresponding to the control and punch fields in the first mentioned program card and the detail card and alternate program control means for changing the automatic functional controls of the card punch machine from said second program card, and wherein said control means connected between said machines includes further means therein for activating said alternate program control means of the card punch machine independently of the card punch machine.

15. The combination with a card punch machine including a plurality of selectively energizable punching elements for columnar punching of a detail card and a plurality of selectively energizable control means controlling automatic functional operations of the card punch machine, a program card having control indicia in columns corresponding to the columns of the detail card regulating the punching of the detail card over data receiving fields controlled by corresponding control fields of the program card, means for sensing the control indicia in the columns of the program cards, means for advancing the detail card and the program card column by column past the punching elements and said sensing means, respectively, upon energization of any of said punching elements, a potential supply source connected to one side of each of said punch operating elements and said functional control means, and a cyclically operable accounting machine having a movable carriage, a plurality of differentially positionable data racks, an accumulator cooperating therewith, and a keyboard including a plurality of different denominational orders of data keys for entering variable data therein, functional control keys controlling functional operations thereof and motoring keys for initiating cyclical operations at different carriage stop positions thereof; of a plurality of electrical read-out devices for sensing the data entered in the accounting machine, each of said devices having an input terminal and a plurality of data output terminals connected to the other side of different ones of said punching elements, a plurality of electrical lane switches actuated by movement of the accounting machine carriage to different stop positions thereof, a plurality of electrical switches selectively actuated upon actuation of different ones of said functional control keys and motoring keys of the accounting machine, and control means connected between said machines and including a plurality of matrix relays selectively energizable through said control indicia sensing means and having a plurality of contacts connected in a single input, plural output contact tree arrangement affording a selection of any one of said accounting machine read-out devices and said card punch machine functional operation control means contained in different ones of a plurality of output circuits from the input thereof in accordance with the condition of energization of the relays, a programming plug board having a plurality of code exit terminals connected to the output circuits from said relay tree contacts, a plurality of data rack terminals connected to the input terminals of different ones of the electrical read-out devices, a plurality of electrical lane switch terminals connected to said electrical lane switches of the accounting machine, a plurality of accounting machine motoring and functional control terminals connected to said motoring key actuated and functional control key actuated switches of the accounting machine, and a plurality of functoinal control terminals connected to the functional control means of the card punch machine, first switching means operated from the accounting machine upon initiation of a cycle of operation thereof to test the condition of the aforesaid electrical lane switches and motoring switches of the accounting machine and to activate the corresponding terminals therefor on the plug board depending upon the settings, thereof, further switching means subsequently operated from both of said machine to complete control circuit paths through successive output circuits of said matrix relays as selected by said control indicia sensing means in successive columnar positions of a control field of the program card to successive ones of the code exit terminals of the plug board, and circuit connections between various terminals including the code exit terminals, data rack terminals and the card punch machine functional control terminals of the plug board in accordance with the sequence of punching and functional operations of the card punch machine desired over respective control fields of the program card.

16. The combination in accordance with claim 15 above including means for punching alphabetical character code punchings in the detail card in the card punch machine from the accounting machine.

17. The combination with a card punch machine for column by column punching of a detail card and including a potential supply source, a plurality of selectively energizable punching elements each connected to one side of said source, a program card having control indicia in columns corresponding to data receiving columns of the detail card and regulating the punching of the detail card over data receiving fields therein controlled by corresponding control fields of the program card, means for sensing the control indicia in the columns of the program card, and means for advancing the detail card and the program card column by column past said punching elements and said sensing means, respectively, upon energization of any of said punching elements, and a cyclically operable accounting machine having a movable carriage, drive means, a plurality of differentially positionable data racks, an accumulator cooperating with said data racks, and a keyboard having a plurality of different denominational orders of amount keys for entering variable data therein through said data racks and at least one motoring key for initiating cyclical operations at different carriage stop positions thereof through said drive means; of a plurality of electrical read-out means cooperating with said data racks for sensing the data entered in the accounting machine, and control means connected between said machines providing a plurality of selectively operable control circuits paths from the other side of the potential supply source and through different ones of said read-out means to the other side of said selectively energizable punching elements, said control means including matrix relay selector means differentially operated by different circuit selection control indicia in each column of the program card sensed by said sensing means and controlling the number of and the order of sequential selection of individual ones of said control circuit paths containing the read-out means in accordance with the columnar extent of and the different control indicia in each column of a control field of the program card over which data contained in the read-out means in one of the carriage stop positions of the accounting machine is to be punched in the corresponding data field of the detail card, switching means operated from the accounting machine upon initiation of a cycle of operation thereof to complete a first one of the control circuit paths selected by said control circuit path selecting means in an initial columnar position of a control field of the program card corresponding to one of the carriage stop positions of the accounting machine, said path extending from a point connected to the other side of the potential supply source and through the electrical read-out means contained in the selected circuit path to the other side of one of said punch operating elements to initiate advancing of the detail card and the program card to the next columnar positions thereof and punching of the detail card, and switching means operated thereafter from said card punch machine to complete following ones of the control circuit paths in their order of selection by said selecting means from different circuit selection control indicia in successive columns of the program card during the subsequent punching of succeeding columns of the data field of the detail card over the extent of the corresponding control field of the program card, said movable carriage being free to move from one stop position to another independently of control by the program card.

18. The combination with a card punch machine for column by column punching of a detail card and including a potential supply source, a plurality of selectively energizable punching elements each connected to one side of said source, a program card having control indicia in columns corresponding to data receiving columns of the detail card and regulating the punching of the detail card over data receiving fields therein controlled by corresponding control fields of the program card, means for sensing the control indicia in the columns of the program card, and means for advancing the detail card and the program card column by column past said punching elements and said sensing means, respectively, upon energization of any of said punching elements, and a cyclically operable accounting machine having a movable carriage, drive means, a plurality of differentially positionable data racks, an accumulator cooperating with said data racks, and a keyboard having a plurality of different denominational orders of amount keys for entering variable data therein through said data racks and at least one motoring key for initiating cyclical operations at different carriage stop positions thereof through said drive means; of a plurality of electrical read-out means cooperating with said data racks for sensing the data entered in the accounting machine, and control means connected between said machines providing a plurality of selectively operable control circuits paths from the other side of the potential supply source and through different ones of said read-out means to the other side of said selectively energizable punching elements, said control means including matrix relay selector means differentially operated by different circuit selection control indicia in each column of the program card sensed by said sensing means and providing with said program card a different number and order of sequential selection in different control fields of the program card of individual ones of said control circuit paths containing said read-out means, switching means operated from the accounting machine upon initiation of a cycle of operation thereof to complete a first one of the control circuit paths selected by said control circuit path selecting means in an initial columnar position of a control field of the program card corresponding to one of the carriage stop positions of the accounting machine, said path extending from a point connected to the other side of the potential supply source and through the electrical read-out means contained in the selected circuit path to the other side of one of said punch operating elements to initiate advancing of the detail card and the program card to the next columnar positions thereof and punching of the detail card, and switching means operated thereafter from said card punch machine to complete following ones of the control circuit paths in their order of selection by said selecting means from different circuit selection control indicia in successive columns of the program card during the subsequent punching of succeeding columns of the data field of the detail card over the extent of the corresponding control field of the program card for the aforesaid carriage stop position of the accounting machine, said movable carriage being free to move from one stop position to another independently of control by the program card.

19. The combination with a card punch machine for column by column punching of a detail card and including a potential supply source, a plurality of selectively energizable punching elements each connected to one side of said source, a program card having control indicia in columns corresponding to data receiving columns of the detail card and regulating the punching of the detail card over data receiving fields therein controlled by corresponding control fields of the program card, means for sensing the control indicia in the columns of the program card, and means for advancing the detail card and the program card column by column past said punching elements and said sensing means, respectively, upon energization of any of said punching elements, and a cyclically operable accounting machine having a movable carriage, drive means, a plurality of differentially positionable data racks, an accumulator cooperating with said data racks, and a keyboard having a plurality of amount keys for entering variable data therein through said data racks and a motoring key for initiating cyclical operations at different carriage stop positions thereof through said drive means; of a plurality of electrical read-out means cooperating with said data racks for sensing the data entered in the accounting machine, and control means connected between said machines providing a plurality of selectively operable control circuits paths from the other side of the potential supply source and through different ones of said read-out means to the other side of said selectively energizable punching elements, said control means including matrix relay selector means differentially operated by different circuit selection control indicia in each column of the program card sensed by said sensing means and controlling the number of and the order of sequential selection of individual ones of said control circuit paths containing the read-out means in accordance with the columnar extent of and the different control indicia in each column of a control field of the program card over which data contained in the read-out means in one of the carriage stop positions of the accounting machine is to be punched in the corresponding data field of the detail card, said program card containing a different number and pattern of control indicia in the various control fields thereof to provide different groupings and orders of selection of said control circuit paths over different control fields thereof in which variable data is to be read out of the accounting machine, switching means operated from the accounting machine upon initiation of a cycle of operation thereof to complete a first one of the control circuit paths selected by said control circuit path selecting means in an initial columnar position of a control field of the program card corresponding to one of the carriage stop positions of the accounting machine, said path extending from a point connected to the other side of the potential supply source and through the electrical read-out means contained in the selected circuit path to the other side of one of said punch operating elements to initiate advancing of the detail card and the program card to the next columnar positions thereof and punching of the detail card, and switching means operated thereafter from said card punch machine to complete following ones of the control circuit paths in the order of selection by said selecting means from different circuit selection control indicia in successive columns of the program card during the subsequent punching of succeeding columns of the data field of the detail card over the extent of the corresponding control field of the program card, said movable carriage being free to move from one stop position to another independently of control by the program card.

References Cited in the file of this patent

UNITED STATES PATENTS

| | | |
|---|---|---|
| 2,285,289 | Lake et al. | June 2, 1942 |
| 2,490,373 | Page et al. | Dec. 6, 1949 |
| 2,637,399 | Doty | May 5, 1953 |
| 2,647,581 | Gardinor et al. | Aug. 4, 1953 |
| 2,684,719 | Johnson et al. | July 27, 1954 |
| 2,812,902 | Runde et al. | Nov. 12, 1957 |
| 2,858,888 | McGayhey et al. | Nov. 4, 1958 |
| 2,861,739 | Chall et al. | Nov. 25, 1958 |